(12) United States Patent
Stanton et al.

(10) Patent No.: US 6,448,544 B1
(45) Date of Patent: Sep. 10, 2002

(54) LOW NOISE, HIGH RESOLUTION IMAGE DETECTION SYSTEM AND METHOD

(75) Inventors: Martin J. Stanton, Stow; Walter Phillips, Arlington; Alex Stuart, Waltham; Charles Ingersoll, Winthrop, all of MA (US)

(73) Assignee: Brandeis University, Waltham, MA (US)

(*) Notice: Subject to any disclaimer, the term of this patent is extended or adjusted under 35 U.S.C. 154(b) by 0 days.

(21) Appl. No.: 09/298,381

(22) Filed: Apr. 23, 1999

Related U.S. Application Data
(60) Provisional application No. 60/088,486, filed on Jun. 8, 1998.

(51) Int. Cl.[7] .............................................. H01L 27/00
(52) U.S. Cl. ........................... 250/208.1; 250/227.11; 250/239; 348/218; 348/359
(58) Field of Search .......................... 250/208.1, 216, 250/578.1, 227.11, 239; 348/218, 340, 359; 257/432; 385/120, 121, 115

(56) References Cited

U.S. PATENT DOCUMENTS

| | | | |
|---|---|---|---|
| 4,303,860 A | 12/1981 | Bjorkholm et al. ...... 250/363 S |
| 4,323,925 A | 4/1982 | Abell et al. ................. 358/213 |
| 4,445,117 A | 4/1984 | Gaalema et al. ....... 340/825.91 |
| 4,852,137 A | 7/1989 | Mackay ....................... 378/62 |
| 4,970,398 A | 11/1990 | Scheid ........................ 250/374 |
| 5,072,591 A | 12/1991 | Grange et al. ................ 62/50.7 |
| 5,142,557 A | 8/1992 | Toker et al. ................... 378/37 |
| 5,159,455 A | 10/1992 | Cox et al. ............. 358/213.11 |
| 5,197,294 A | 3/1993 | Galvan et al. ................ 62/3.62 |
| 5,216,250 A | 6/1993 | Pellegrino et al. ...... 250/370.09 |
| 5,235,184 A | 8/1993 | Paulson ....................... 250/238 |
| 5,533,087 A | 7/1996 | Snoeren ...................... 378/98.3 |
| 5,550,380 A | 8/1996 | Sugawara et al. ...... 250/370.11 |
| 5,550,386 A | 8/1996 | Kojima et al. ............... 250/588 |
| 5,551,244 A | 9/1996 | Bailey ......................... 62/51.2 |
| 5,596,200 A | 1/1997 | Sharma et al. ......... 250/370.14 |
| 5,604,781 A | 2/1997 | Suzuki et al. .................. 378/62 |
| 5,617,461 A | 4/1997 | Schreiner ................... 378/98.5 |
| 5,693,948 A | 12/1997 | Sayed et al. ........... 250/370.09 |
| 5,974,215 A | * 10/1999 | Bilbro et al. ................ 385/116 |

FOREIGN PATENT DOCUMENTS

| | | | |
|---|---|---|---|
| EP | 0 286 393 A2 | 10/1988 | ......... H04N/5/335 |
| EP | 0 597 725 A1 | 5/1994 | ............ G01V/5/00 |
| WO | WO 96/41212 | 12/1996 | ............ G01T/1/20 |

\* cited by examiner

*Primary Examiner*—Kevin Pyo
(74) *Attorney, Agent, or Firm*—Nutter, McClennen & Fish LLP

(57) ABSTRACT

A low noise, high spatial resolution, high dynamic range (high intensity resolution) image detection system for use in medical imaging applications such as x-ray mammography systems, scientific imaging systems such as x-ray crystallography and astronomy, industrial quality-control systems, etc.

6 Claims, 33 Drawing Sheets

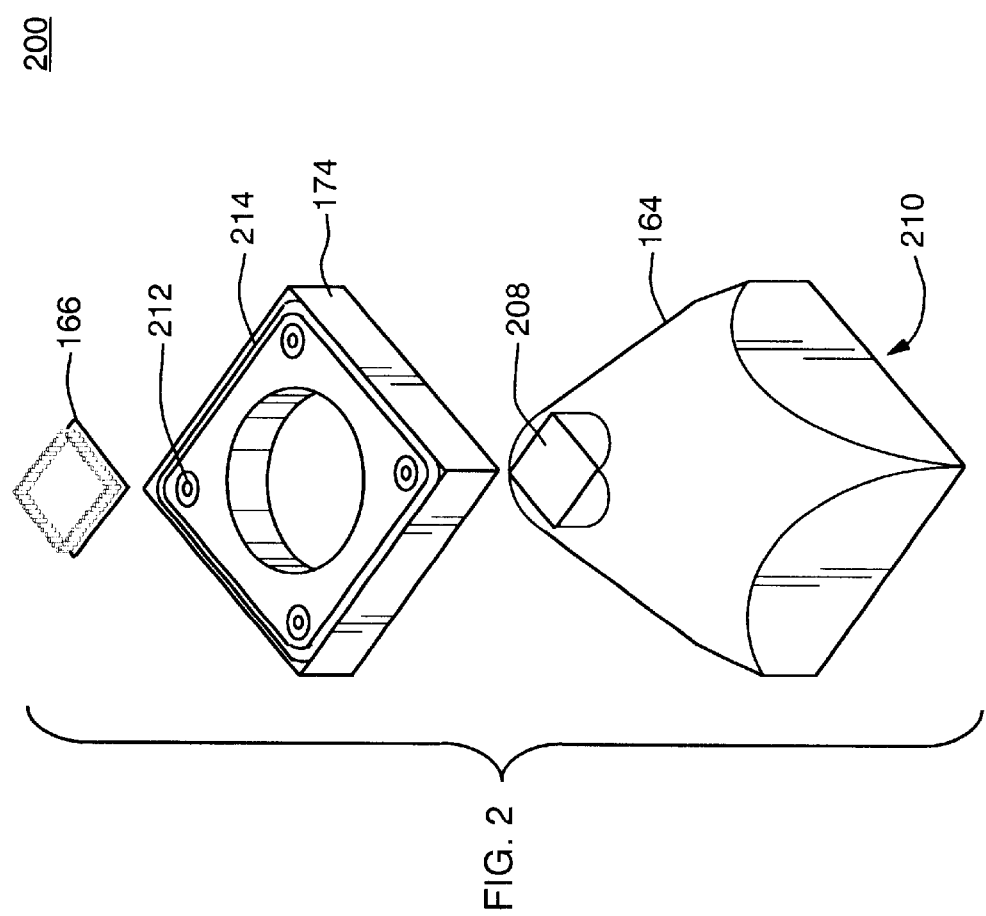

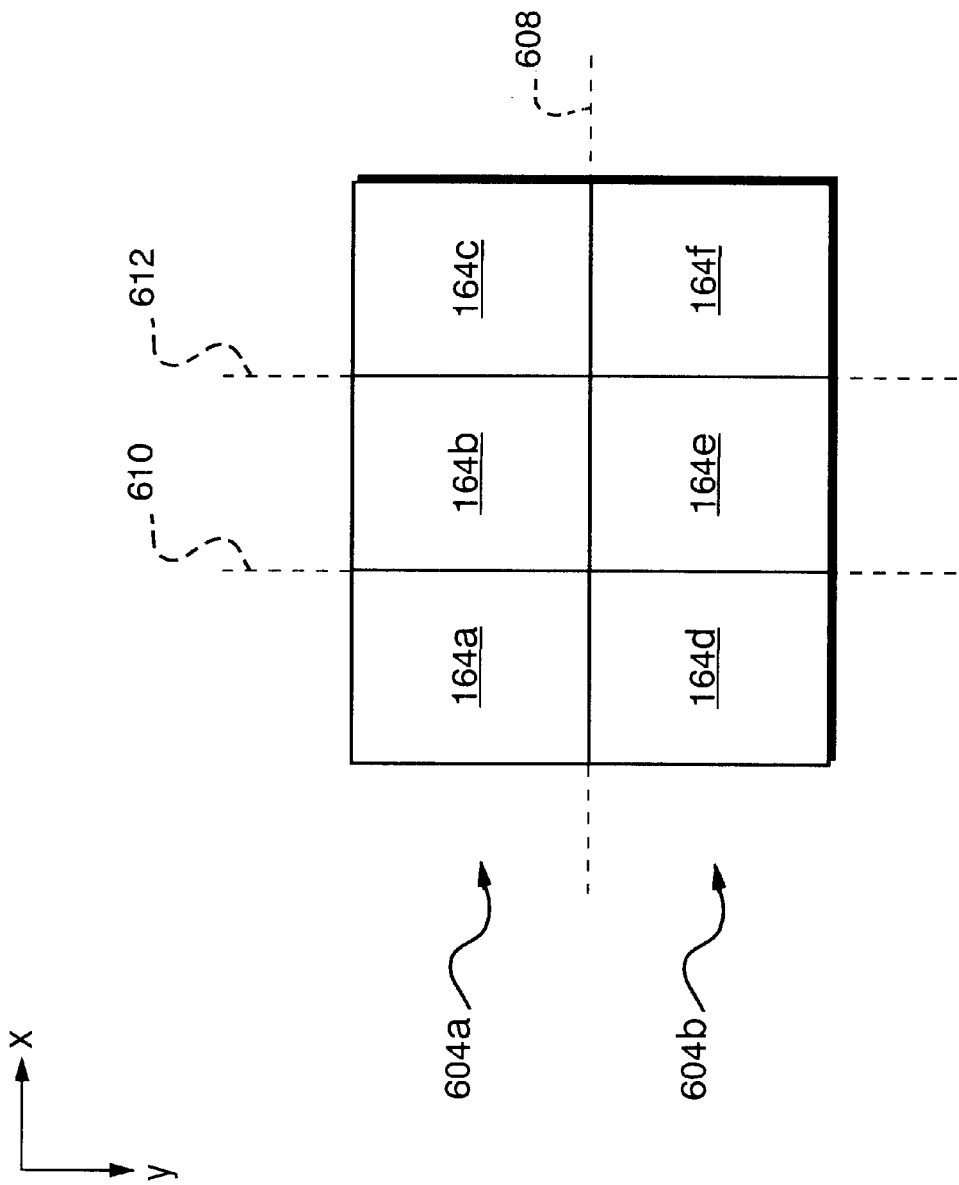

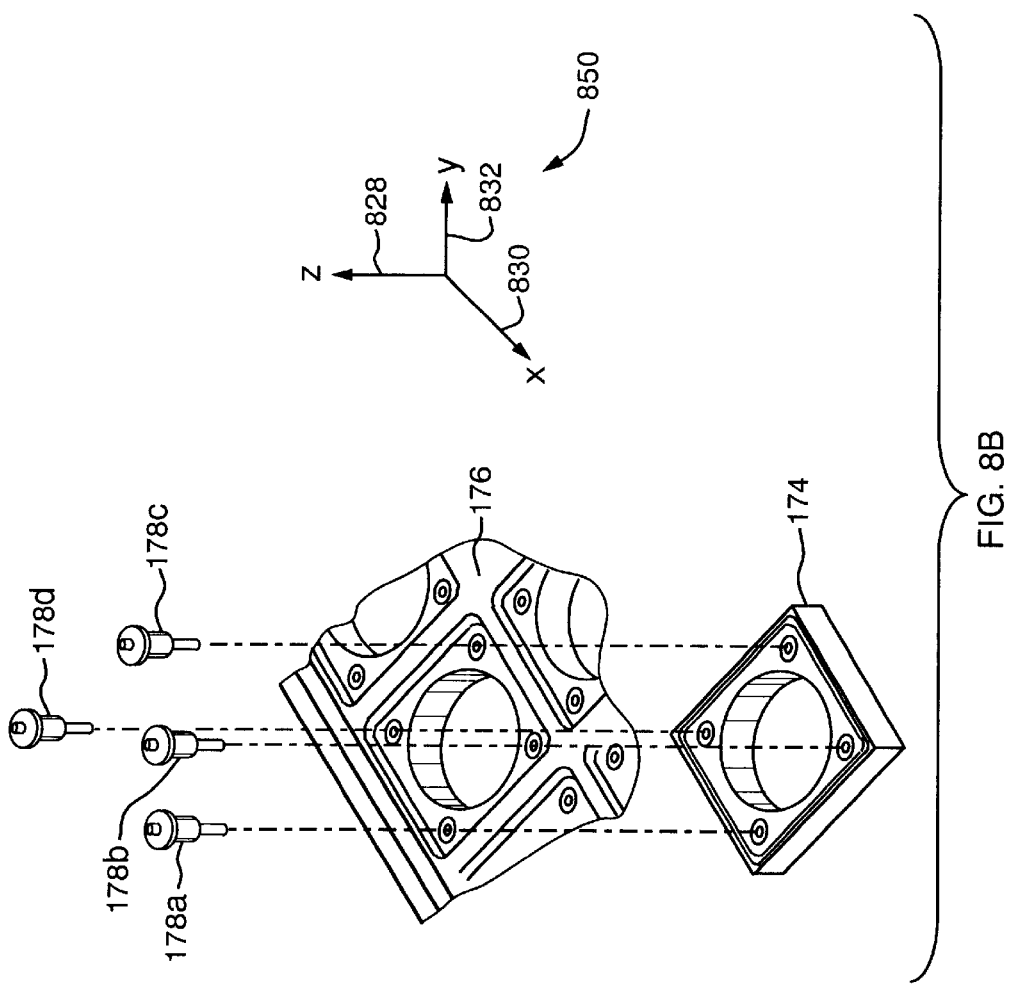

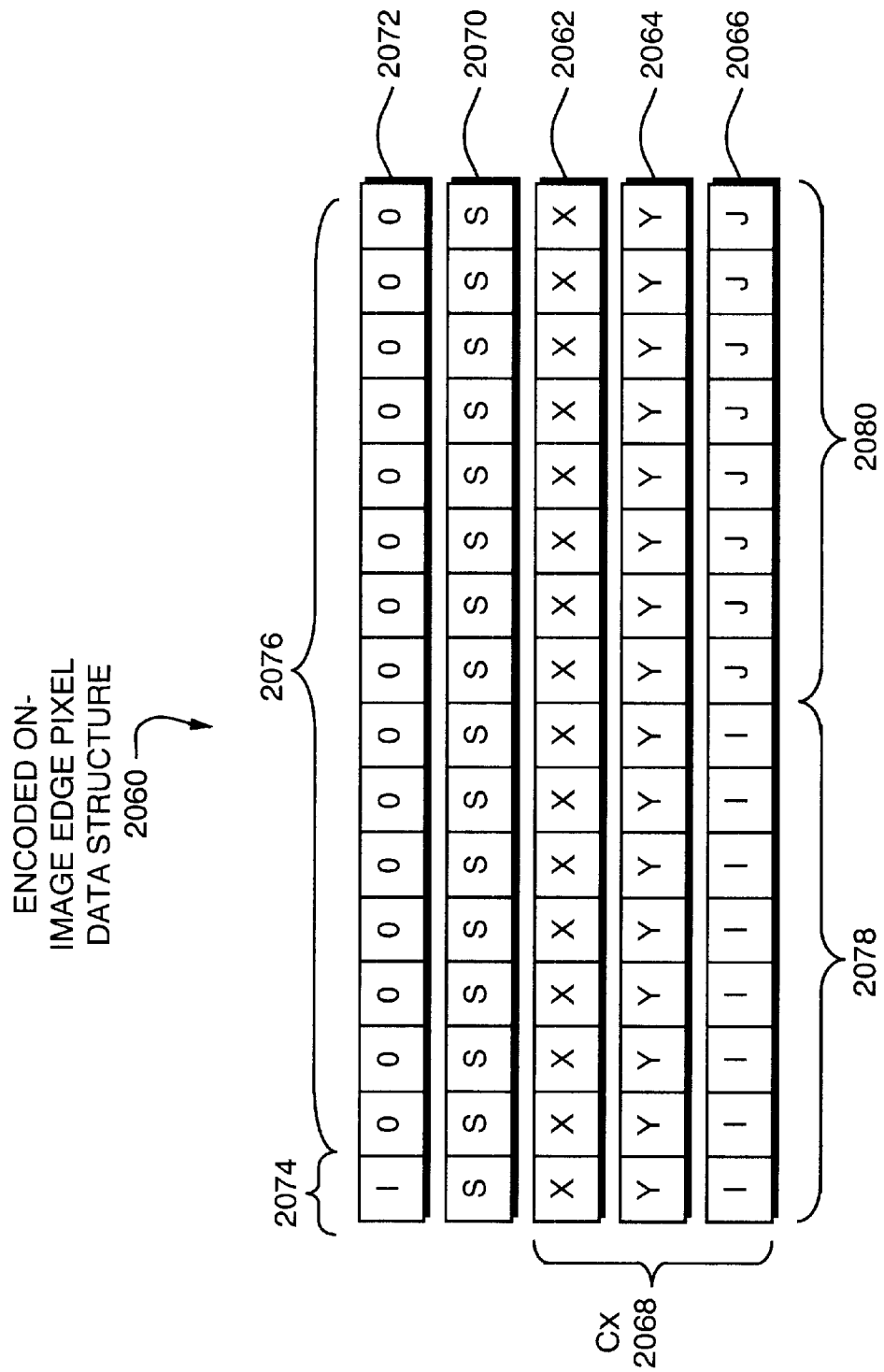

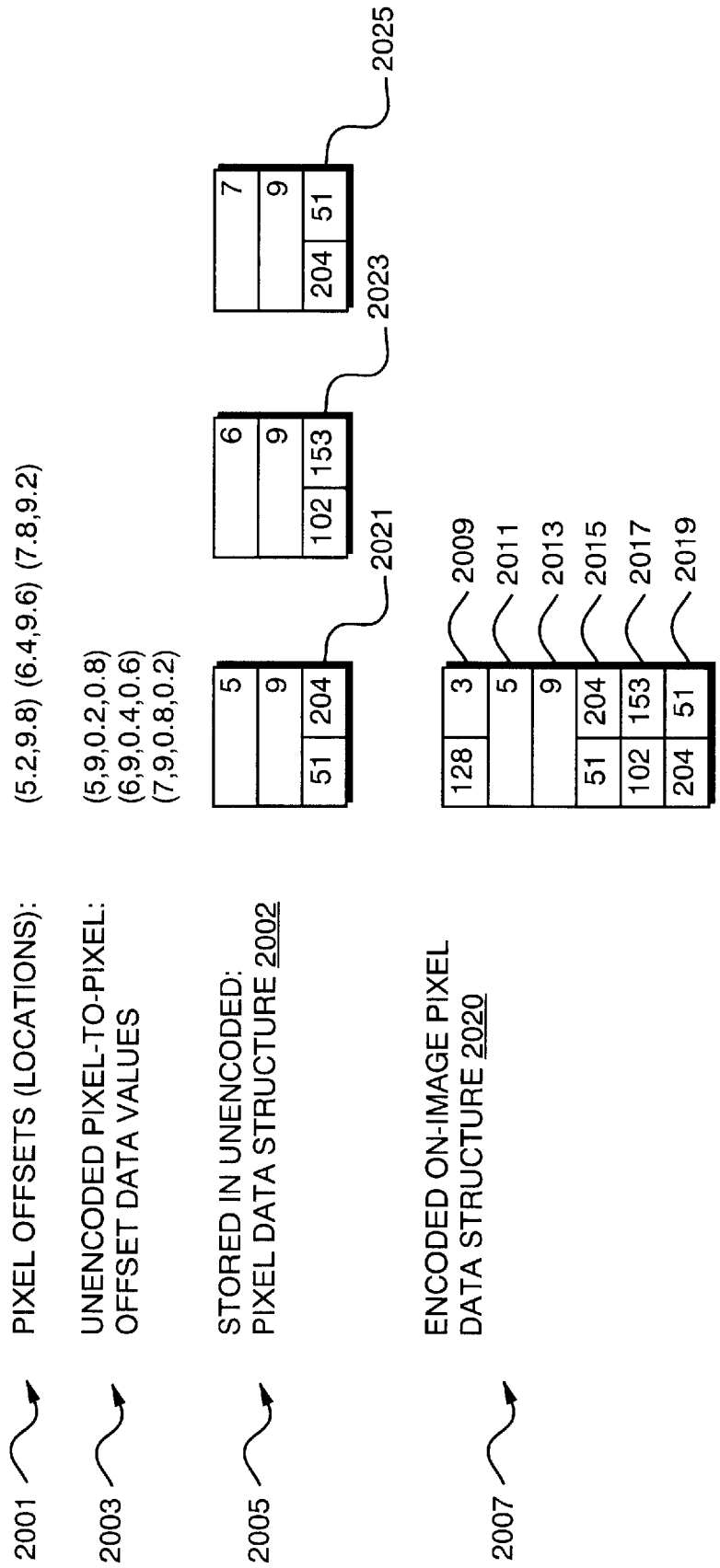

LOW NOISE, HIGH RESOLUTION IMAGE DETECTION SYSTEM AND METHOD

RELATED APPLICATIONS

This application claims the benefit of U.S. Provisional Patent Application No. 60/088,486 entitled "A CCD Mammography Apparatus" filed Jun. 8, 1998 and naming as inventors Martin J. Stanton et al.

BACKGROUND OF THE INVENTION

1. Field of the Invention

The present invention relates generally to optical detectors and, more particularly, to imaging sensors.

2. Related Art

Systems utilizing high energy radiation, such as x-radiation and gamma radiation, to examine the internal structure of a solid object are well known. Such systems typically irradiate an object under examination with high energy x-radiation or gamma radiation and utilize detection apparatus to measure the intensity of the radiation that is transmitted through the object.

Conventional detection systems, particularly those used for medical applications, use a film to record an image of x-rays that are passed through a human body. Such a film typically includes a screen of fluorescent material that fluoresces to produce visible light radiation in response to incident high energy x-rays. The light radiation from the screen passes to a photosensitive film that reacts to the emitted visible light to physically record an image. Such films are used to provide a radiograph of the irradiated region of the body, the radiograph having a spatial resolution of up to 15 line pairs per millimeter.

Although x-ray film produces a radiograph having a relatively high spatial resolution, the intensity resolution is relatively low. The intensity resolution, or dynamic range, of film is typically less than 50. In addition, the film necessarily requires a substantial amount of time to develop, and the film requires a relatively high level of exposure of x-rays to produce a satisfactory radiograph. Also, the film image is not in a form that readily lends itself to computer storage or analysis.

Accordingly, detection systems have been developed for more rapidly recording the intensity of x-rays or other high energy radiation that are transmitted through a target object. Such systems typically employ a scintillation plate to covert incident x-rays to corresponding visible light radiation. A photodetector is typically used to generate an electrical signal corresponding to the intensity of the visible light produced. The electrical signal from the photodetector may be readily converted to a digital representation suitable for use with a computer and stored in a memory device or electronically displayed, for example, on a cathode ray tube.

Conventional electronic radiation detection devices have been used to produce electronic radiographic images much more quickly than can be achieved with film. Such systems also typically have a somewhat larger dynamic range than x-ray film systems. However, the radiographic images produced with such prior art electronic radiation detectors have not had the high spatial resolution that is characteristic of radiographic images produced on film. Furthermore, such conventional detectors produce significant electronic noise resulting in a dynamic range (intensity resolution) that is insufficient for most imaging tasks. Therefore, electronic imaging systems have not heretofore been suitable for producing high resolution radiographic images.

SUMMARY OF THE INVENTION

The present application is directed to different inventive aspects of a low noise, high spatial resolution, high dynamic range (high intensity resolution) image detection system. The following aspects of the present invention may be utilized in different detection systems and such detection systems may be suitable for different applications. For example, the disclosed aspects of the present invention may be utilized in medical imaging applications such as x-ray mammography systems, scientific imaging systems such as x-ray crystallography and astronomy, industrial quality-control systems, etc.

One aspect of the present invention includes a sensor array in an image sensor that minimizes damage and performance degradation due to shock, vibration and thermal stresses. In one embodiment, a sensor array for implementation in an image sensor is disclosed. The sensor array includes a mounting frame and a plurality of sensor modules removably mounted in the mounting frame. Each sensor module includes a high demagnification fiberoptic taper having an input surface and an output surface. The sensor module also includes a photodetector array optically coupled to the fiberoptic taper output surface to receive light photons transferred through the fiberoptic taper. The photodetector array is rigidly attached to the fiberoptic taper such that movement of the fiberoptic taper does not interfere with photodetector array operation. The sensor module also includes a flange constructed and arranged to individually mount the fiberoptic taper to the mounting frame, the flange flexibly attached to the fiberoptic taper and rigidly attached to the mounting frame. The fiberoptic tapers of the sensor modules are mounted in a non-contact arrangement in the mounting frame. In one embodiment, the photodetector array is a CCD photodetector array. Alternatively, the photodetector array may be a CID or CMOS photodetector array. In addition, each flange mechanically supports a fiberoptic taper such that the orientation of the fiberoptic taper may be individually adjusted.

Significantly, this aspect of the present invention provides the benefits associated with a modular design such as functional compactness and individual replacement and adjustment while minimizing the space consumed by the composite sensor array.

Another aspect of the invention includes a sensor array including a plurality of sensor modules each including a high demagnification taper and a photodetector array. In one disclosed embodiment, a sensor array for implementation in an image sensor is disclosed. The sensor array includes a mounting frame and a plurality of sensor modules mounted in the mounting frame. Each sensor module includes a high demagnification fiberoptic taper having a demagnification ratio of at least 3:1 and an input surface and an output surface. A photodetector array optically coupled to the fiberoptic taper output surface to receive light photons transferred through the fiberoptic taper is also included.

In one embodiment, the fiberoptic tapers have a demagnification ratio of greater than 2.4:1. In another embodiment, between 3.5:1 and 4.5:1.; in a further embodiment, greater than 4:1; in a still further embodiment, greater than 3.1:1. The use of fewer high demagnification fiberoptic tapers provides for fewer sensor modules resulting in an image detection system which is less complex, less costly and easier to maintain, than conventional systems.

Another aspect of the present invention includes a technique for eliminating direct physical contact between neighboring fiberoptic tapers in an array of fiberoptic tapers while simultaneously minimizing the loss of data due to misalignment of such fiberoptic tapers. In one embodiment, a sensor array for implementation in an image sensor having a composite resolution is disclosed. The sensor array includes a mounting frame and a plurality of sensor modules. The sensor modules are individually mounted in the mounting frame such that the sensor modules are secured in a fixed relative position that provides a predetermined gap between neighboring fiberoptic input surfaces that is less or equal to the resolution of sensor module. In one embodiment, the gap is the minimum of the CCD pixel size or the distance associated with an modulation transfer function (MTF) of the sensor array of approximately 5%. In another embodiment, the resolution of each sensor module is substantially equal to a resolution of the photodetector array in the sensor module. In this embodiment, the gap may be a predetermined percentage of the photodetector array resolution, such as approximately 50%. In an implementation where, for example the size of individual elements of the photodetector array is 50 microns, the gap is approximately 25 microns.

Advantageously, this arrangement enables the input surfaces of the fiberoptic tapers to be mechanically aligned with each other so as to capture the entire image with minimal or no data loss overcoming problems typically associated with a mosaic of fiberoptic tapers, particularly, variations due to tolerances in the manufacturing process, inconsistency of materials, etc. Photons will be received by the fiberoptic tapers surrounding the region of gap at which photons are impinged. As such, not all information content is lost. Thus, information incident in gap will result in inefficiencies in that fewer electrons per photon will be produced. Importantly, however, there is no loss of data. This provides for opportunities to convolve the information in the surrounding region to approximate the lost information. In addition, the input surfaces of the fiberoptic tapers can be aligned so as to create a substantially flat optical surface.

In addition, because there is a small space, perhaps with elastic spacers, between adjacent fiberoptic tapers, there is a reduced likelihood that adjacent fiberoptic tapers will impact each other causing damage due to mechanical vibrations or stresses introduced by thermal expansion or contraction. This is a problem common to conventional image sensors that abut the fiberoptic tapers against each other.

Another aspect of the invention includes a sensor array in which a plurality of modular sensor modules are arranged so as to facilitate repair and maintenance of individual sensor modules. In one embodiment, a sensor array for implementation is an image sensor having an image sensor surface is disclosed. The sensor array includes a plurality of sensor modules each sensor module includes a demagnification fiberoptic taper having a substantially rectangular input surface and a substantially rectangular output surface. A photodetector array is optically coupled to the output surface. A mounting frame is also included. The mounting frame is constructed and arranged to removably secure the sensor modules in a fixed relative arrangement of no more than two substantially parallel tiers of sensor modules. Each tier includes one or more adjacent sensor modules having a side of the fiberoptic taper input surface substantially parallel with a single mating line between the tiers of sensor modules.

Importantly, this approach relegates any variations among the tapers in a direction perpendicular to the tiers to the periphery of the image sensor surface. Similarly, variations among the tapers in the opposing direction, which in the aggregate result in different lengths of the two tiers, are also relegated to the periphery of the image sensor surface. By relegating the variations in taper dimensions to the periphery of the image sensor, the present invention eliminates distracting artifacts which may appear in the broad middle region of the resulting image. Such discontinuities, which are common in conventional systems, are found to be extremely distracting to the technician interpreting the resulting image.

An additional benefit associated with this arrangement is that all sensor modules have a side that forms the periphery of sensor array. As such, sensor modules are physically accessible and can be replaced quickly and easily without exposing neighboring sensor modules to damage.

Another aspect of the present invention includes a mammography image sensor having an array of fiberoptic tapers and a scintillation plate that significantly increases the number of photons entering the fiberoptic tapers in response to a given radiation photon. In one embodiment, an image detector having a radiation source is disclosed. The image detector includes an array of sensor modules disposed in a light-tight box having an x-ray transparent front window through which radiation is received. Each sensor module includes a fiberoptic taper having a demagnification ratio, and a photodetector array optically coupled to the fiberoptic taper. The photodetector array has a plurality of photodetector elements. The image detector also includes a scintillation plate interposed between the transparent front window and the fiberoptic tapers. The scintillation plate includes a reflective substrate and a phosphor layer deposited on the reflective substrate such that the phosphor layer is distal to said reflective substrate relative to the radiation source. Preferably, the substrate has a low x-ray absorption cross-section. In one embodiment, for example, the substrate is aluminized MYLAR®.

The phosphor layer may be formed by depositing phosphor grains onto the reflective substrate. Preferably, the phosphor layer has a thickness sufficient to provide a spatial resolution that is approximately equal to that of the sensor modules. In one embodiment, the thickness of the phosphor layer is approximately the same or less than an effective pixel size of the sensor module. The effective pixel size of the sensor module is defined as the product of a demagnification ratio of the fiberoptic tapers and a pixel size of the photodetector array. In one implementation, the thickness of the phosphor layer is approximately 40 $\mu$m.

In another embodiment, the scintillation plate further includes a balloon having a low x-ray absorption cross-section interposed between the x-ray transparent front window and the phosphor reflective substrate. The balloon is inflated so as to retain the phosphor layer in contact with the fiberoptic tapers.

This aspect of the present invention provides advantages that have not been provided in conventional medical imaging systems. The inclusion of a reflective surface with a phosphor layer through which the x-rays are received to directly reflect the scattered photons toward the photodetectors has not been implemented in mammography systems due to the accepted understanding that such techniques adversely affect the spatial resolution of the implementing image sensor. The absence of such techniques has not been perceived as detrimental to traditional mammography detectors, however, since such detectors generally include a large number of fiberoptic tapers, reducing the requisite amount of photons needed to be generated by the phosphor layer. In this aspect of the present invention, the spatial distribution of the light produced is normally distributed about the location at which the x-ray photon impinges on the phosphor screen.

A still further aspect of the invention includes concentric screw pairs providing for independently adjusting attached members in full six degrees of freedom using a significantly small space and with a minimal quantity of components. In one embodiment, one or more concentric screw pairs are provided for adjusting the orientation and position of a proximal and distal member relative to each other. Each proximal member has a threaded passageway and each distal member has a threaded bore aligned with the threaded passageway. Each of the concentric screw pairs includes an outer screw threadably connected to the proximal member. The outer screw has a central lumen extending axially therethrough. In addition, the outer screw extends through the proximal member passageway to seat against the distal member. An inner screw is disposed freely within the central lumen such that a distal end of the inner screw extends through the proximal member to threadably mate with the bore of the distal member. The lumen has an inner diameter and the inner screw has an outer diameter that are sized and dimmensioned to provide a predetermined amount of relative lateral translation between the proximal and distal members.

In one implementation, four pairs of concentric adjustment screws are circumferentially arranged around a central pivot region of the proximal and distal members. Selectively adjusting individual concentric screw pairs causes a translation and/or a rotation of the proximal and distal members to achieve a desired relative orientation and position. Preferably, the inner and outer screws each have a control head for manual adjustment, although other control heads may be provided. Advantageously, the associated time to adjust the individual adjustment screws and the space necessary to support such an approach in conventional systems adversely affects the cost, complexity and ease of use of the implementing image sensor.

When implemented in the above-noted image detector many advantages can be achieved. For example, when implementing four such concentric screw pairs to secure each flange to the mounting frame, the imaging surface defined by the fiberoptic taper input surfaces can be maintained substantially flat by individually adjusting the orientation and position of each sensor module. This will contribute to insuring the fiberoptic tapers are appropriately spaced to avoid loss of data and to avoid image distortions and sensor module boundaries.

A further aspect of the invention includes thermoelectric cooling modules that maintain continually a constant thermodynamic connection between a heat generating element, a thermoelectric cooler and a heat sink. In one embodiment, a cooling apparatus for cooling a movable heat generating element and for transferring heat to a stationary heat sink is disclosed. The cooling apparatus includes a thermoelectric cooling device having a cold surface and a hot surface; and two thermal coupling devices. A first thermal coupling device is constructed and arranged to thermally couple the cold surface of the thermoelectric cooling device to the heat generating element. A second thermal coupling device is constructed and arranged to thermally couple the hot surface of the thermoelectric cooling device to the heat sink. At least one thermal coupling device allows for six-degree-of freedom relative movement between the thermally coupled elements.

In one application, the heat generating element is a photodetector array in one of a plurality of sensor modules also comprising a fiberoptic taper having an input surface and an output surface to which the photodetector array is optically coupled. Preferably, the photodetector array and cooling module are located in a hermetically sealed chamber. In such an embodiment, the thermoelectric cooler maintains the temperature of the photodetector array at between approximately 0° C. to −45° C.

In one embodiment, the first thermal coupling device freely thermally couples the thermoelectric cooling device and the photodetector array. The second thermal coupling device fixedly secures the hot surface of the thermoelectric cooling device to the heat sink. This provides a constant thermal coupling between the thermoelectric cooling device and the photodetector array while allowing six degree relative movement therebetween. The first thermal coupler includes a conductive block thermally coupled to the photodetector array so as to allow for relative lateral movement therebetween. A piston and a cylinder that are sized and dimensioned to enable the piston to move freely within the cylinder while maintaining thermal coupling therebetween is also included. The piston is mechanically and thermally coupled to the conductive block and the cylinder is mechanically and thermally coupled to the cold surface of the thermoelectric cooling device. The piston is biased to cause the conductive block to be held continuously against the photodetector array, and wherein the piston is coupled to the conductive block so as to allow for rotational movement between the conductive block and the photodetector array. Preferably, the piston is coupled to the conductive block via a ball joint interface.

In another embodiment, the first thermal coupling device fixedly secures and thermally couples the cold surface of the thermoelectric cooling device and the photodetector array. The second thermal coupling device freely secures the hot surface of the thermoelectric cooling device to the heat sink so as to provide constant thermal coupling between the thermoelectric cooling device and the heat sink while allowing six degree relative movement therebetween. In one particular embodiment, the second thermal coupling device includes a thermal block thermally and rigidly coupled to the hot side of the thermoelectric cooling device. The thermal block includes a passageway through which coolant travels. Coolant supply and return lines are coupled to opposing ends of the passageway in the thermal block. Each of the supply and return line includes a pair of concentric pipes arranged so as to prevent turbulence from being induced in the coolant flow. The supply and return lines each include a flexible exterior pipe, connected to the conductive block, having a flexible region along a portion of its length to provide a predetermined flexibility between the photodetector array and the heat sink, an internal lumen with a beveled region in which an interior diameter of the internal lumen decreases to a first diameter at a neck region of the exterior pipe adjacent to the thermally conductive block. The supply and return lines also include a rigid interior pipe connected to a stationary mounting plate and securely attached to the heat sink, the interior pipe extending through the lumen of the exterior pipe past the flexible region to the beveled region.

It is well known that photodetector arrays have an inherent electronic noise due to the presence of thermal noise, and that such thermal noise is a function of the ambient temperature. This aspect of the present invention reduces significantly such noise produced by the photodetector arrays. By increasing the signal-to-noise ratio of the photodetector array to be greater than that which is typically characteristic of conventional image detectors, an implementing image sensor has greater intensity and spatial resolution than conventional image sensors.

Furthermore, this aspect of the present invention overcomes the well known problems associated with flexible tubing of inevitable leakage over time due to use of microscopically porous materials or the creation of turbulence in the coolant flow that accelerates the deterioration of the tubing. In addition, the chamber prevents condensation from accumulating on photodetector arrays which, at the above-noted temperatures, will subsequently freeze and damage the photodetector arrays.

A still further aspect of the present invention includes an exposure control system that determines automatically and in real-time when a desired radiation dose is achieved. In one embodiment, a real-time automatic exposure control system for controlling a radiation source in an image sensor is disclosed. The image sensor includes a sensor array having a plurality of fiberoptic tapers each with an input surface for receiving light photons and an output surface optically coupled to a photodetector array. A portion of the light photons traveling through the fiberoptic tapers from the input surface to the output surface is detected by the photodetector array. The exposure control system includes one or more photo detectors connected to predetermined locations of an exterior surface of each of the plurality of fiberoptic tapers to detect escaping photons. Preferably, eight photo detectors concentrically are distributed around a periphery of each of the plurality of fiberoptic tapers.

In one embodiment, the exposure control system also includes an exposure control circuit lectrically coupled to said one or more photo detectors, said exposure control circuit constructed and arranged to integrate current generated by said one or more photo detectors to determine an accumulated radiation dose at predetermined locations across an image. Preferably, the exposure control circuit is further constructed and arranged to compare a voltage resulting from said integration with a preacquired characterization of the sensor array, said characterization associating a plurality of radiation doses with responsively-generated voltage values.

In another aspect of the invention the exposure control system includes electrified regions of neighboring plates of an anti-scatter grid interposed between the radiation source and the sensor array. In one embodiment, the plates are each divided into several independently electrified regions, with each region generating a separate current to provide spatial resolution of the exposure level in the direction of said plates. In certain implementations, the exposure control system also includes an exposure control circuit electrically coupled to said electrified regions of said anti-scatter grid constructed and arranged to integrate current generated by said one or more electrified regions to determine an accumulated radiation dose at predetermined locations across an image.

Advantageously, this aspect of the present invention enables an implementing detection system to generate a efficacious radiation dose to obtain an image with a single exposure that is limited in duration due to the spatial sampling provided by multiple photo detectors or electrified regions of the anti-scatter grid. In mammography systems, for example, this insures that the exposure of the region of the breast having the greatest density will be measured and considered in determining the exposure duration. Thus, the present invention minimizes patient exposure to radiation as well as the total time for performing the mammography procedure.

A still further aspect of the present invention includes a hybrid technique for transferring digital image data with minimal wires. In one embodiment, an apparatus for transmitting image data from an image sensor to a computer is disclosed. The apparatus includes a plurality of data transmission wires each for transmitting one of a plurality of bits of the image data; a ground wire for establishing a common reference potential for each of the plurality of data transmission wires. In addition, two wires for transmitting a data available (DAV) signal as a fully differential mode signal are included. The DAV signal controls the transmission of the image data. The plurality of data transmission wires may include, for example, sixteen data transmission wires for transmitting 16 bits of image data.

This aspect of the present invention minimizes the number of wires utilized while ensuring accurate and complete data transfer. For transferring image data, this aspect of the invention significantly reduces the likelihood of misregistration since the DAV signal has a high degree of integrity due to the 2 wire differential mode. The data lines are transmitted using a minimal lines that may result errors. However such errors have a minimal adverse impact on the integrity of the image data.

a still further aspect of the present invention includes An image processor having noise correction and intensity and spatial distortion correction. In one embodiment, an image processor for processing a plurality of uncorrected image data received from an imaging system is disclosed. The image processor includes a noise compensator configured to subtract from each of the plurality of uncorrected image data a corresponding pixel value in a dark image representing noise generated by the imaging system to generate a baseline corrected image data. The image processor also includes an intensity distortion correction system configured to apply to the baseline corrected image data an intensity correction value to generate intensity corrected image data, as well as a spatial distortion correction system configured to apply to the intensity corrected image data a spatial distortion correction value to generate corrected image data representing an intensity corrected and spatially undistorted image.

a further aspect of the present invention includes a method of generating intensity correction data using a flood and dark images. In one embodiment, a method of generating intensity correction data representing the intensity distortions of an image sensor is disclosed. The method includes the steps of: exposing the image sensor to an x-ray source having a known x-ray distribution with no target present between the x-ray source and the image sensor to generate a flood image; exposing the image sensor to the x-ray source producing no x-rays with no target present between the x-ray source and the image sensor to generate a dark image; calculating an ideal flood image that would be created by the x-ray source given its known x-ray distribution field; calculating a dark subtracted flood image by subtracting the dark image from the flood image; and dividing the ideal flood image by the dark-subtracted flood image to determine intensity correction values for each pixel of the image sensor.

a still further aspect of the present invention includes a method of spatially correcting a spatially distorted image using precalculated convolution kernel data. In one embodiment a method of correcting spatial distortions in a plurality of image data received from an image sensor is disclosed. The method includes the steps of: characterizing spatial distortions of the image sensor to generate a plurality of transformation data between pixel locations in a distorted and undistorted image; selecting a pixel in the undistorted image, the pixel having a pixel location; determining a corresponding pixel location in the distorted image using the transformation data; selecting precalculated convolution function, wherein the convolution function is represented by a data structure of precalculated convolution kernel data; determining an intensity of pixels in a neighborhood of the corresponding pixel based on the convolution function; and convolving the intensities of the pixels in the neighborhood of the corresponding pixel with the convolution function to determine the intensity of the corresponding pixel. Preferably, the transformation data is run length encoded.

Various embodiments of the present invention provide certain advantages and overcome certain drawbacks of the conventional techniques. Not all embodiments of the invention share the same advantages and those that do may not share them under all circumstances. This being said, the present invention provides numerous advantages including those noted above. Further features and advantages of the present invention as well as the structure and operation of various embodiments of the present invention are described in detail below with reference to the accompanying drawings. In the drawings, like reference numerals indicate identical or functionally similar elements. Additionally, the left-most one or two digits of a reference numeral identifies the drawing in which the reference numeral first appears.

BRIEF DESCRIPTION OF THE DRAWINGS

This invention is pointed out with particularity in the appended claims. The above and further features and advantages of this invention may be better understood by referring to the following description when taken in conjunction with the accompanying drawings, in which:

FIG. 2 is an exploded view of a sensor module implemented in the image sensor shown in FIG. 1B;

FIGS. 6A and 6B are top schematic views of six fiberoptic tapers illustrating their relative arrangement according to one aspect of the present invention;

FIG. 8B is a perspective view of a flange with four such alignment screw pairs;

FIG. 20D is a schematic view of a data structure for storing encoded on-image edge pixel data in accordance with one embodiment of the present invention;

FIG. 20E illustrates an example of run length encoding pixel data in accordance with one embodiment of the present invention;

DETAILED DESCRIPTION

Table of Contents

I. Exemplary System Environment
II. Image Sensor
   A. Sensor Array and Component Sensor Modules
   B. Sensor Module Positioning
   C. Scintillation Plate
   D. Sensor Module Alignment
   E. Thermal Electric Cooling System
III. Exposure Control System
IV. Image Processor
   A. Data Transmission and Storage
   B. Image Processing Pipeline
   C. Reordering of Image Data
   D. Noise Correction
   E. Intensity Correction
   F. Spatial Correction

I. Exemplary System Environment

The present application is directed to different inventive aspects of a low noise, high spatial resolution, high dynamic range (high intensity resolution) image detection system. To facilitate this description of the present invention, an exemplary system environment, an x-ray mammography system, will be first presented. It should become apparent from this disclosure that the disclosed aspects of the present invention may be utilized in different detection systems and that such detection systems may be suitable for different applications. For example, the disclosed aspects of the present invention may be utilized in other medical imaging applications, scientific imaging such as x-ray crystallography and astronomy, industrial quality-control, etc.

Figure 1A:
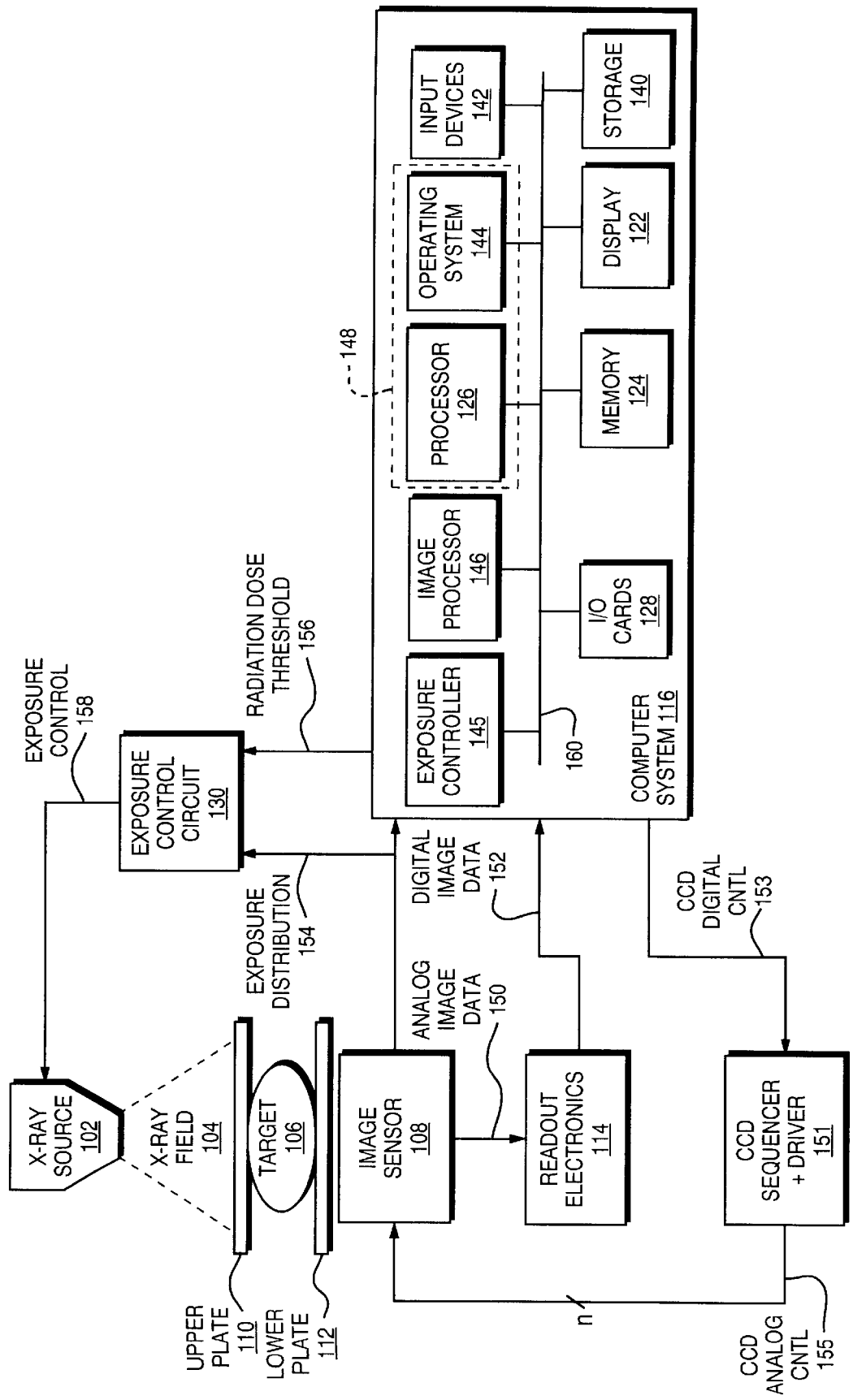
FIG. 1A is a block diagram of a x-ray mammography system suitable for implementation of the present invention.

One important medical application of x-ray imaging systems is mammography. For clinical diagnosis and routine screening of an asymptotic female population, the use of mammography to screen patients for breast cancer currently represents the state of the art for early detection of breast cancer. FIG. 1A is a block diagram of an exemplary x-ray mammography system suitable for implementing aspects of the present invention.

An x-ray source 102 generates a plurality of x-rays forming an x-ray field 104. A target 106, which is a patient's breast in the exemplary system 100, is temporarily held motionless between an upper compression plate 110 and a lower compression plate 112 or, alternatively, the top of an image sensor 108, while it is exposed to x-ray field 104.

An image sensor 108 receives the x-rays that have passed through target 106 and converts the incident x-rays to corresponding visible light radiation. An array of photodetectors converts the light radiation into an electric charge that is stored. Image sensor 108 generates analog image data 150 representing the measured intensity of the visible light. Analog image data 150 is received and converted into digital image data 152 by readout electronics 114 which includes, for example, one or more analog-to-digital converters ($ADC_s$).

In accordance with one aspect of the present invention, an exposure control system 130 controls automatically the exposure of target 106 to x-ray field 104. In the illustrative embodiment, image sensor 108 provides exposure control system 130 with an intensity distribution 154 while computer 116 provides a threshold intensity value 156 for exposing target 106. Exposure control system 130 monitors intensity distribution 154 and, when it exceeds exposure threshold 156, generates an exposure control signal 158 that causes x-ray source 102 to cease generating x-ray field 104. The exposure control techniques according to aspects of the present invention are described in detail below.

As noted, readout electronics 114 provides the digital image information to computer system 116. Digital image data 152 is processed by image processor 146 to generate digital mammogram images for subsequent display and storage. Image processor 146 is preferably an application program executing in computer system 116, although other implementations are possible. Computer system 116 is preferably a general purpose computer system, which is programmable using a high level computer programming language. Computer 116 includes a processor 126, memory 124, input/output (I/O) interface cards 128, input devices 142 such as a keyboard and pointing device and display 122. Memory 124 is used for storage of program instructions and for storage of results of calculations performed by processor 126. In a preferred embodiment, memory 124 includes random access memory (RAM). Display 122 is preferably a high resolution CRT and is logically or physically divided into an array of picture elements commonly referred to as (pixels). Input/output (I/O) interface cards 128 may be modem cards, network interface cards, sound cards, etc. Storage units 140 may include a hard disk drive, tape storage system, CD-ROM drives, floppy disk system and the like.

Processor 126 is typically a commercially available processor, such as the Pentium microprocessor, PowerPC microprocessor, SPARC processor, PA-RISC processor or 68000 series microprocessor. Many other processors are also available. Such a processor usually executes a program referred to as operating system 144, such as the various versions of the Windows, NetWare, and Unix operating systems, among others. Operating system 144 controls the execution of other computer programs such as a graphical user interface (not shown) and the image processor 146 included in aspects of the present invention, and provides scheduling, input-output control, file and data management, memory management, communication control and related services. Processor 126 and operating system 144 define a computer platform shown by dashes block 148, for which application programs in high level programming languages are written. The functional elements of the computer 116 communicate with each other via an interconnection means such as bus 160.

Image processor 146 controls the photodetectors in image sensor 108. In the illustrative embodiment illustrated in FIG. 1A the photodetectors are CCD detectors. In this embodiment, computer system 116 generates CCD digital control signals 153 which are received and processed by a CCD sequencer and driver 151. CCD sequencer and driver 151 are typically implemented in circuitry to generate CCD analog control signals 155 over N of number of control lines to image sensor 108. CCD sequencer and driver 151 perform well-known functions to control CCD detector operations in response to digital control data 153, including configuration, exposure control and data read out, among others.

II. Image Sensor

Figure 1B:
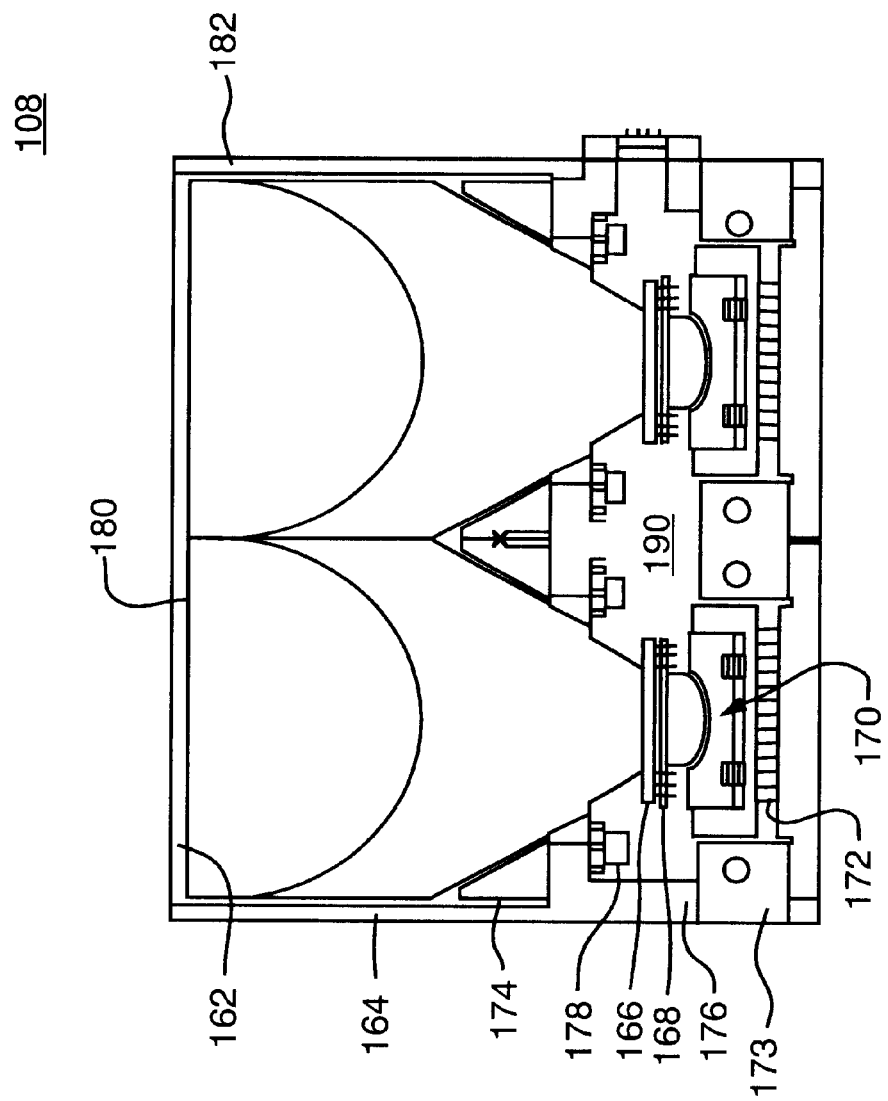
FIG. 1B is a side sectional view of an image sensor illustrated in FIG. 1A.

Image sensor 108 will now be described briefly with reference to FIG. 1B. FIG. 1B is a side sectional view of image sensor 108. X-ray source 102 (not shown) irradiates a target tissue 106 (also not shown). The radiation passing through target tissue 106 is converted by a scintillation plate or x-ray-to-phosphor converter that coverts x-ray radiation into light photons. Individual light photons pass through one of an array of fiberoptic tapers 164 and are sensed by a CCD detector 166 fixedly secured to an output surface of each of the fiberoptic tapers 164. Aspects of the array of fiberoptic tapers are described in detail below. A socket 168 securely holds CCD detector 166 and provides electrical connectivity to other components of image sensor 108. To reduce noise and provide the improved dynamic range and spatial resolution for early cancer detection, each CCD detector 166 is thermally coupled and cooled by a cooling module 170. Embodiments of cooling module 170 are described below. A cooling manifold 173 provides the necessary heat transfer to properly cool a thermoelectric cooling device 172 of cooling module 170. Fiberoptic taper 164 is structurally supported by a flange 174. Each flange 174 is connected to a mounting frame 176 via four concentric alignment screw pairs 178. The position and orientation of each flange 174 is adjusted with concentric screw pairs 178, described in detail below. Flanges 174, mounting frame 176, manifold 173 and cooling module 170 structurally interoperate to form an air-tight enclosure 190 that is preferably maintained with minimal moisture to create an optimal operational environment for CCD detector 166. The components of image sensor 108 are contained within a light-tight box 182.

Figure 3:
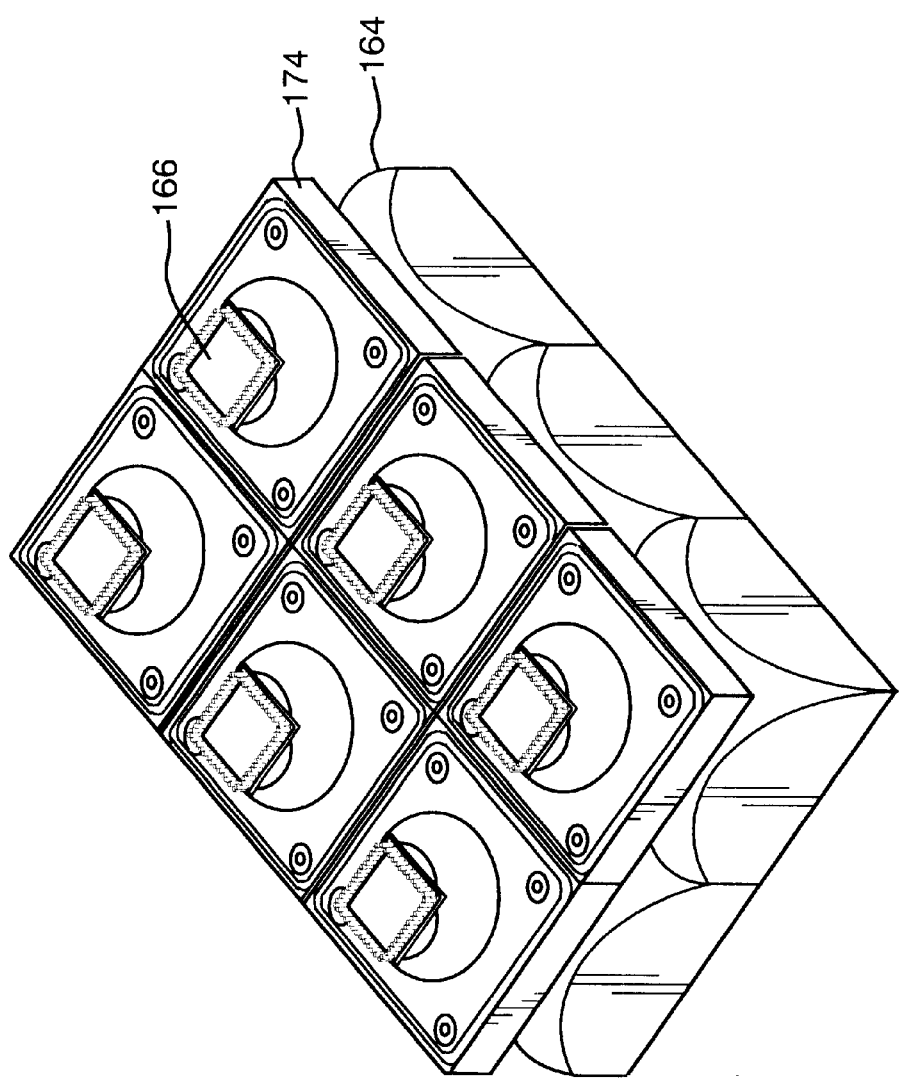
FIG. 3 is a perspective view of an array of sensor modules arranged to be installed in a sensor array.
Figure 4:
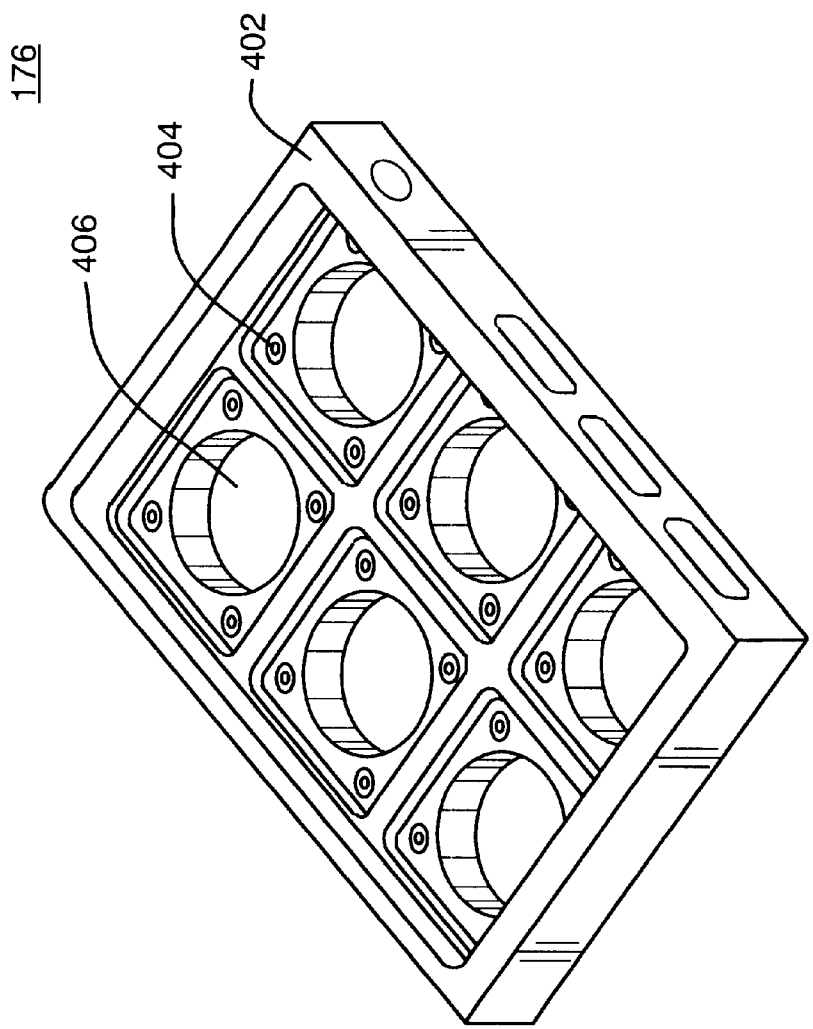
FIG. 4 is a perspective view of one embodiment of a mounting frame configured to receive the array of sensor modules illustrated in FIG. 3.
Figure 5:
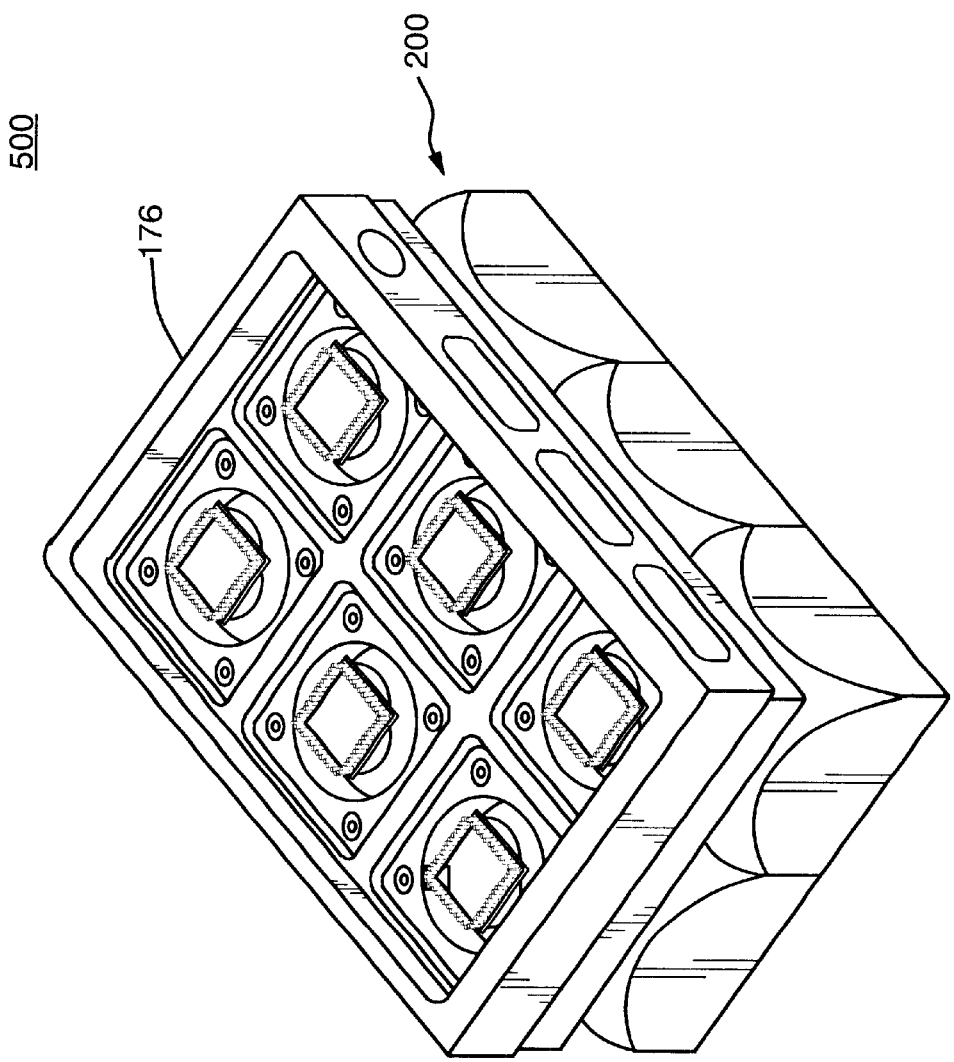
FIG. 5 is a perspective view of one embodiment of a sensor array implemented in the image sensor shown in FIG. 1B.

The primary component of image sensor 108, a sensor array, will be described in detail with reference to FIGS. 2 through 6B. FIG. 2 is an exploded view of a sensor module 200, a plurality of which comprise a sensor array. FIG. 3 is a perspective view of an exemplary arrangement of six such sensor modules 200 as they would be arranged when installed in a sensor array. FIG. 4 is a perspective view of a mounting frame 176 used to removably secure a plurality of sensor modules 200 in a fixed relative arrangement. FIG. 5 is a perspective view of one embodiment of a sensor array 500 incorporating sensor modules 200 shown in FIGS. 2 and 3 secured to mounting frame 176 shown in FIG. 4.

Briefly, sensor array 500 provides a modular arrangement of a minimal number of sensor modules 200 each having a high demagnification fiberoptic taper 164 coupled to a photodetector array such as CCD detector 166. As will be described in detail below, sensor modules 200 are optimally arranged in sensor array 500 so as to substantially minimize data loss typically associated with the implementation of a mosaic of fiberoptic tapers. Sensor modules 200 are removably secured within sensor array 500 to facilitate individual removal for repair and maintenance. In addition, when installed in sensor array 500, sensor modules 200 are individually suspended in a non-contact arrangement to minimize damage due to shock, vibration and thermal expansion. Thus, sensor array 500 advantageously provides a high resolution image sensor 108 that substantially eliminates the mechanical complexity typically associated with image sensors having an array of fiberoptic tapers. Sensor array 500 can be repaired and maintained quickly and inexpensively, and substantially withstands damage due to shocks and vibration experienced with normal use in the anticipated environment. Each of these aspects of sensor array 500 will be described in detail below.

A. Sensor Array and Component Sensor Modules

FIG. 2 is an exploded view of one embodiment of sensor module 200. Sensor module 200 primarily includes three components: a CCD detector 166, a flange 174 and a fiberoptic taper 164. CCD detector 166 is rigidly attached and optically coupled to output surface 208 of fiberoptic taper 164 to receive light transferred through fiberoptic taper 164 from input surface 210. As will be described in detail below, sensor modules 200 are constructed and arranged to minimize damage or performance degradation due to shock and vibration. To this end, CCD detector 166 is rigidly attached to fiberoptic taper 164 such that movement of fiberoptic taper 164 will not interfere with the operation of CCD detector 166. Preferably, an optical epoxy is used to attach CCD detector 166 to fiberoptic taper 164. In one particular embodiment, the optical epoxy TRA-CON F114 available from TraCon, Inc, Bedford, Mass., USA is used. Other types of optical epoxy may also be used. It should be appreciated by those of ordinary skill in the art that the disclosed embodiment of CCD detector 166 is illustrative only and that other photodetectors may be used. For example, in alternative embodiments, CID or CMOS photo detectors are utilized. In a preferred embodiment, however, CCD detector 166 is a THX7899 CCD available from Thomson CSF, Saint-Egreve, France, available through Thomson Components and Tubes Corp., Totana, N.J., USA.

Flange 174 structurally interconnects fiberoptic taper 164 (and CCD detector 166) to mounting frame 176 as shown in FIG. 1A and described in greater detail below. The use of flange 174 enables sensor modules 200 to be individually mounted on mounting frame 176, providing the benefits associated with a modular design such as functional compactness and individual replacement and adjustment. In addition, flange 174, when installed, provides a supporting reference platform through which the position and orientation of fiberoptic taper 164 is adjusted.

Flange 174 is attached to and mechanically supports fiberoptic taper 164. Flange 174 is constructed from a material that has sufficient strength and rigidity to prevent motion of optical surface 210 when fiberoptic taper 164 is installed in mounting frame 176. For example, in one preferred embodiment, flange 174 is comprised of aluminum or aluminum alloy. Alternatively, other metals or sufficiently rigid plastics or composite materials may be used, depending upon the mass of fiberoptic taper 164 and the intended environment in which sensor array 500 is to be implemented. Selection of such materials and structure is considered to be apparent to those of ordinary skill in the relevant art.

Flange 174 is attached to fiberoptic taper 164 using a flexible adhesive to dampen the transfer of thermally-induced stresses, mechanical vibrations and shocks between flange 174 and fiberoptic taper 164. In one embodiment, a commercially available silicon adhesive such as Dow Corning 732 or General Electric Silicone II is used. Such an attachment method minimizes transmission of external forces to fiberoptic taper 164 with minimal adverse effects to the optical integrity of fiberoptic taper 164.

Each flange 174 also includes a plurality of threaded bores 212 to be used for attaching flange 174 to mounting frame 176 (described below). As will become apparent from the following description, the cross-sectional area of flange 174 is smaller than the surface area of input surface 210. As such, flanges 174 may have any shape appropriate for mounting and which provides a surface sufficient to structurally support fiberoptic tapers 164. In the illustrative embodiment, flange 174 approximates a square. In this embodiment, four bores, one in each corner of flange 174, are provided to attach flange 174 to mounting frame 176, as well as to adjust the position and orientation of flange 174 relative to mounting frame 176. As will be described in detail below, concentric adjustment screw pairs 178 disposed in bores 212 are used in certain aspects of the invention to align fiberoptic tapers 164 so that input surfaces 210 of the array of fiberoptic tapers 164 form a substantially flat optical surface 180 (FIG. 1A). This will be described in greater detail below.

FIG. 3 illustrates 6 sensor modules 200 arranged as they would be arranged for mounting into mounting frame 176, shown in FIGS. 1A and 4. The resulting sensor array 500 is shown in FIG. 5. Mounting frame 176 includes a series of passageways 406 corresponding to the number of sensor modules 200 to be included in sensor array 500. Passageways 406 are sized and dimensioned to allow CCD detector 166 and a portion of fiberoptic taper 164 to extend therethrough, as shown in FIG. 5.

As noted, flanges 174 of sensor modules 200 are rigidly secured to mounting frame 176 via concentric mounting screw pairs 178 disposed through passageways 404 corresponding in size and location to bores 212 located in flanges 174. Mounting frame 176 must be of sufficient rigidity to support the selected array of sensor modules 200. Mounting frame 176 can be constructed from any rigid material sufficient to support sensor modules 200. Preferably, mounting frame 176 is made of a material that can be easily machined or formed into a desired configuration. Mounting frame 126 need not be thermally conductive; it can be, for example, a rigid plastic. In one preferred embodiment, mounting frame 176 is a unitary machined aluminum structure.

As noted, sensor array 500 provides a modular arrangement of a minimal number of sensor modules 200 each having a high demagnification fiberoptic taper 164 each coupled to a photodetector array such as CCD detector 166. To best understand the features and advantages of this aspect of the present invention, techniques implemented in conventional image detection systems will first be described. Then, once the limitations of such systems has been established, this aspect of the present invention will be described in detail.

Conventional imaging systems such as mammography imaging systems have commonly implemented a large, single imaging sensor. Such sensors are often formed from a single, large sheet of amorphous silicon. Although such systems are relatively inexpensive to manufacture, they provide relatively low spatial resolution, have a relatively low dynamic range and a high noise that makes them less than ideal for use in early detection of breast cancer. In addition, they are expensive to maintain; even simple repairs of a localized defect requires the removal of the entire sensor.

To overcome these drawbacks, systems utilizing multiple fiberoptic tapers have been developed. The fiberoptic tapers are typically arranged in a mosaic such that the individual input surfaces of the fiberoptic tapers form an image sensor surface. The tapers transfer photons impinging on the input surface to the associated output surface for conversion into an electrical signal by an array of photodetectors. It is well known in full field digital mammography systems using a mosaic of demagnification fiberoptic tapers coupled to CCDs that the imaging performance of a CCD/fiber optic detector decreases as the fiberoptic demagnification is increased. Specifically, the efficiency of a fiberoptic taper is inversely proportional to the ratio of input surface area to the corresponding output surface area. That is, for a fiberoptic taper having an input surface area, A1, and an output surface area, A2, the transfer efficiency of the fiberoptic taper is $1/(A1/A2)$. For the illustrative fiberoptic tapers 164 having a substantially square input surface 210 with a length of each side equal to X1, and a substantially square output surface 208 with a length of each side equal to X2, the transfer efficiency of the taper is $1/(X1^2/X2^2)$. The demagnification ration, D, is the ratio of the linear dimensions of the input surface to the corresponding output surface or, $D=X1/X2$. Thus, the transfer efficiency of fiberoptic tapers 164 in terms of the demagnification ratio is $1/D^2$. As such, conventional image sensors typically include fiberoptic tapers having a demagnification ratio of no greater than approximately 2:1.

To provide a sufficiently large image sensor surface, conventional image detection systems generally include a large number of low demagnification fiberoptic tapers. Typically, each fiberoptic taper is included in a mechanical structure, with multiple such structures secured together in some known manner, such as with straps or epoxy. Fixedly securing the fiberoptic tapers to each other results in mechanically complex systems that are typically large and bulky, making them impracticable for certain applications. To reduce the overall size of the detector, some conventional systems epoxy bond the fiberoptic tapers into a rigid enclosure. Although compact, such image detection systems cannot be repaired in a cost effective manner; a single defect in one fiberoptic taper requires the replacement of the entire detector.

In accordance with one aspect of the present invention, to form an image sensor surface, a smaller quantity of higher demagnification fiberoptic tapers 164 is utilized to reduce the mechanical complexity of image sensor 108. The fiberoptic tapers 164 are packaged with an associated CCD detector 166 into a single, replaceable unit, referred to herein as sensor module 200 introduced above with reference to FIG. 2.

The fiberoptic tapers 164 have a demagnification ratio of greater than 2:1 and preferably greater than 3:1. In one preferred embodiment, the demagnification ration is approximately 3.3:1. In one embodiment, the demagnification ratio is greater than 3.5:1. In another embodiment, the demagnification ratio is between 3.5:1 and 4.5:1. In a still further embodiment, the demagnification ratio is greater than 4:1. Such taper demagnification ratios have not been implemented in medical detection systems heretofore due to the associated inefficiency with which light is transferred through the taper.

The present invention compensates for the low transfer efficiency in a manner described below, enabling the present invention to provide significantly greater intensity and spatial resolution using a mechanically simple image sensor. A minimal number of large, high demagnification fiberoptic tapers 164 are all that is necessary to form an image sensor 108 sufficiently large for use in full field digital mammography system 100. In one embodiment, fiberoptic tapers each contain approximately 4 million fiberoptic light pipes. In the illustrative embodiments wherein fiberoptic tapers 164 have substantially square input and output surfaces 210 and 208, fiberoptic tapers 164 have approximately 2048×2048 pixels, with each side of input surface 210 having a length of approximately 94 mm. It should be understood that fiberoptic tapers 164 may have additional or fewer light pipes. For example, in one alternative embodiment, fiberoptic tapers 164 have greater than two million light pipes. In a still further embodiment, fiberoptic tapers 164 have greater than four million light pipes. In addition, it should be understood that fiberoptic tapers 164 may have different dimensions greater or lesser than the above-noted embodiment that provide the desired demagnification ratio.

The use of fewer sensor modules 200 each having a larger fiberoptic taper as in the present invention results in an imaging detection system which is less complex, less costly and easier to maintain, than conventional systems. The resulting sensor array 500 is less expensive to maintain due to the ability to repair and replace individual sensor modules 200. Also, the amount of space associated with each sensor module 200 is minimized, providing space saving advantages not achieved in a conventional maintainable, modular systems.

B. Sensor Module Positioning

In conventional systems, a significant problem associated with the implementation of a plurality of fiberoptic tapers is that the input surfaces of the fiberoptic tapers cannot easily be mechanically aligned with each other so as to capture the entire image with minimal data loss. Although the fiberoptic tapers are manufactured to have the same cross-sectional diameter, inevitably there are variations due to tolerances in the manufacturing process, inconsistency of materials, etc. The resulting dimensional variations, which may be on the order of 0.2 mm and greater, results in the loss of visual information occurring at the boundary between adjacent fiberoptic tapers. This lost image data is represented by a visual artifact. Thus, using large numbers of fiberoptic tapers as is typical in conventional systems can result in a large number of artifacts in the final image, significantly reducing the integrity of the image sensor. Significant adverse effects may result. For example, in mammographic imaging systems, the loss of data between neighboring fiberoptic tapers may result in the inadvertent misdiagnosis of the patient.

To prevent such a loss of data, conventional image sensors abut the fiberoptic tapers against each other. However, such an approach increases the likelihood of damage from thermal expansion, shock or vibration. In addition, due to the large number of fiberoptic tapers typically included in a sensor image array, many fiberoptic tapers 164 have neighboring tapers on opposing sides of the taper. As a result, variations in the space between neighboring fiberoptic tapers due to dimensional variations cannot be avoided by simply abutting one side of the taper against one of its neighbors.

Aspects of the present invention provides a unique and novel approach to eliminating the physical contact between neighboring fiberoptic tapers 174 while simultaneously minimizing the loss of data due to misalignment of the tapers. Specifically, aspects of the present invention include mounting sensor modules 200 in mounting frame 176 such that all sensor modules 200 are secured in a fixed relative position that provides a predetermined gap between neighboring fiberoptic input surfaces 210 of less than the resolution of image sensor 108.

In addition, aspects of the present invention include arranging sensor modules 200 in sensor array 500 such that there are only two rows of sensor modules 200 in a first direction, with each row having any number adjacent sensor modules 200 in an opposing second direction. Any variations among the tapers in the first direction are thus relegated to the periphery of the image sensor surface 180.

Similarly, variations among the tapers in the opposing direction, which in the aggregate result in different lengths of the two rows, are also relegated to the periphery of the image sensor surface. By relegating the variations in taper dimensions to the periphery of the image sensor, the present invention eliminates distracting artifacts which may appear in the broad middle region of the resulting image. Such discontinuities are found to be extremely distracting to the technician interpreting the resulting image. In addition, the present invention insures that there is no glass-to-glass contact between sensor modules 200, thereby minimizing the likelihood of damage. Finally, as will be described in greater detail below, an additional benefit associated with this arrangement is that all sensor modules 200 have a side that forms the periphery of sensor array 500. As such, sensor modules 200 are physically accessible and can be replaced quickly and easily without exposing neighboring sensor modules to damage.

Figure 6B:
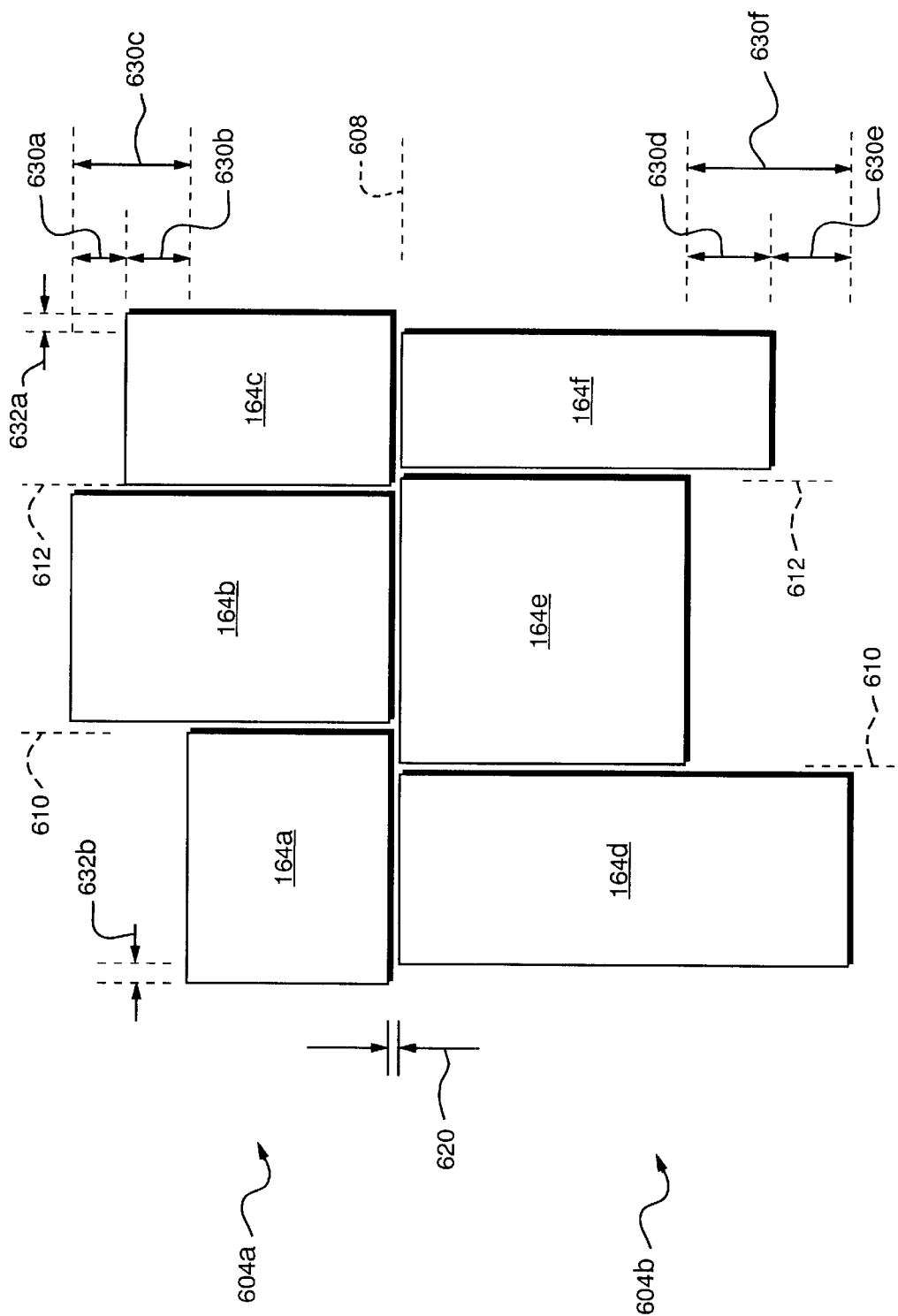

FIG. 6A is a top schematic view of rectangular input surfaces 210 of six fiberoptic tapers 164A–164F. As shown in FIG. 6A, the six fiberoptic tapers 164 are arranged in two rows of three fiberoptic tapers each. That is, a first row 604A includes fiberoptic tapers 164A, 164B and 164C while a second row 604B includes fiberoptic tapers 164D, 164E and 164F. FIG. 6B is a similar view with the variations in fiberoptic size enlarged for ease of description. As shown in FIG. 6B, the six fiberoptic tapers 164 have different dimensions. As noted, in conventional systems having many fiberoptic tapers completely surrounded by other fiberoptic tapers, the difference in dimensions will result in significant gaps appearing between neighboring fiberoptic tapers, resulting in a loss of data. To avoid such loss of data, in accordance with aspects of the present invention, sensor modules 200 are arranged in no more than two tiers in one direction; that is, two rows or columns, so that there is only one mating line in at least one axis. In the example shown in FIG. 6A, sensor array 500 includes 2 tiers: rows 604A and 604B of fiberoptic tapers 164 arranged along the x-axis. As a result, there is a single mating line 608 parallel to the x-axis between the 2 rows 604 of tapers 164. Referring to FIG. 6B, this results in a consistent, predetermined gap 620 between the two neighboring rows 604A, 604B of fiberoptic tapers 164. The size variations 630A–F along the y-axis result in large variations appearing at the perimeter of sensor array 500. However, such variations cause minimal distraction at the perimeter of sensor array 500.

The fiberoptic tapers 174 along each row 604 are similarly arranged with a predetermined gap between neighboring tapers. The rows 604A, 604B have a different aggregate length due to the variations of tapers 164 along the x-axis parallel to mating line 608. These variations 632A, 632B are also relegated to the periphery of the image surface 180. As a result, mating line 610 in row 604A is not aligned with mating line 610 in row 604B. As will be described in detail below, image processor 1246 does not require mating lines 610 and 612 to be linear (aligned across rows 604A, 604B) to efficiently process the image data.

Thus, sensor array 500 is constructed and arranged so as to minimize data loss due to variations in fiberoptic taper dimensions. In addition, this arrangement of fiberoptic tapers results in no one fiberoptic taper being completely surrounded by another fiberoptic taper. This, as noted, facilitates the replacement and alignment of the fiberoptic tapers. It should be understood that other two tier arrangements are included in this aspect of the present invention. For example, four fiberoptic tapers 164 arranged such that there are two tapers 164 in each row may be implemented in alternative embodiments of the present invention. In addition, eight or more tapers 164 arranged in two tiers may also be used. It should also be understood that the tiers are arranged in rows in FIGS. 6A and 6B for illustration only. The two tiers may be arranged in any orientation desired.

In accordance with one aspect of the present invention, neighboring fiberoptic tapers 164 are attached to mounting frame 176 so as not to touch each other. This prevents damage due to shock and vibrations. However, as noted, such gaps may lead to loss of data. To avoid such loss of data, in accordance with one aspect of the present invention, the distance between neighboring fiberoptic tapers 164 is limited to the resolution of sensor module 200; that is, gap 620 is less than or equal to the resolution of sensor module 200.

The resolution of optical sensors is commonly represented by the modulation transfer function (MTF) of the device. The MTF indicates the amount of contrast achieved at a given resolution. With regard to sensor module 200, contributing factors to the resolution of the sensor module include fiberoptic taper 164, the intensity distribution provided by scintillation plate 162, as well as the resolution of CCD detector 166. The resolution provided by CCD detector 166, as with all photodetector arrays, is limited to the physical spacing between photodetector elements or pixels (assuming a display with greater resolution); that is, the resolution of CCD detector 166 is no greater than one pixel.

In one preferred embodiment, gap 620 is less than the resolution of sensor module 200. In one particular embodiment, gap 620 is the minimum of the CCD pixel size or the distance associated with an MTF of approximately 5%. In another embodiment, fiberoptic taper 164 and scintillation plate 162 provide a resolution greater than that provided by CCD detector 166. In such an embodiment, then, the resolution of sensor module 200 is equal to approximately 1 pixel. In one particular embodiment, gap 620 is approximately 50% of the CCD detector resolution. For example, in the illustrative implementation, the pixel size of CCD detector 166 is 50 microns; gap 620, then, is approximately 25 microns. In an alternative embodiment, gap 620 is approximately 25%–75% of the pixel size. In another embodiment, gap 620 is the minimum of the CCD pixel size or the distance associated with an MTF of less than or equal to 20%. In a still further embodiment, gap 620 is the minimum of the CCD pixel size or the distance associated with an MTF of less than or equal to 10–20%.

In such embodiments, photons will be received by the fiberoptic tapers 164 surrounding the region of gap 620 at which photons are impinged. As such, not all information content is lost. Thus, information incident in gap 620 will result in inefficiencies in that fewer electrons per photon will be produced. Importantly, however, there is no loss of data. As will be described in detail below, aspects of the present invention convolve the information in the surrounding region to approximate the lost information. In addition, because there is a small space between adjacent fiberoptic tapers 164, there is a reduced likelihood that adjacent fiberoptic tapers will impact each other causing damage due to mechanical vibrations or stresses introduced by thermal expansion or contraction. In alternative embodiments, a material may be placed between the fiberoptic tapers to further ensure that they do not inadvertently contact each other directly. For example, in one particular embodiment, a 32 μm kapton tape or other elastic or cushioning material is wrapped around the periphery of each of the fiberoptic tapers 164 adjacent to input surface 210.

C. Scintillation Plate

Figure 7:
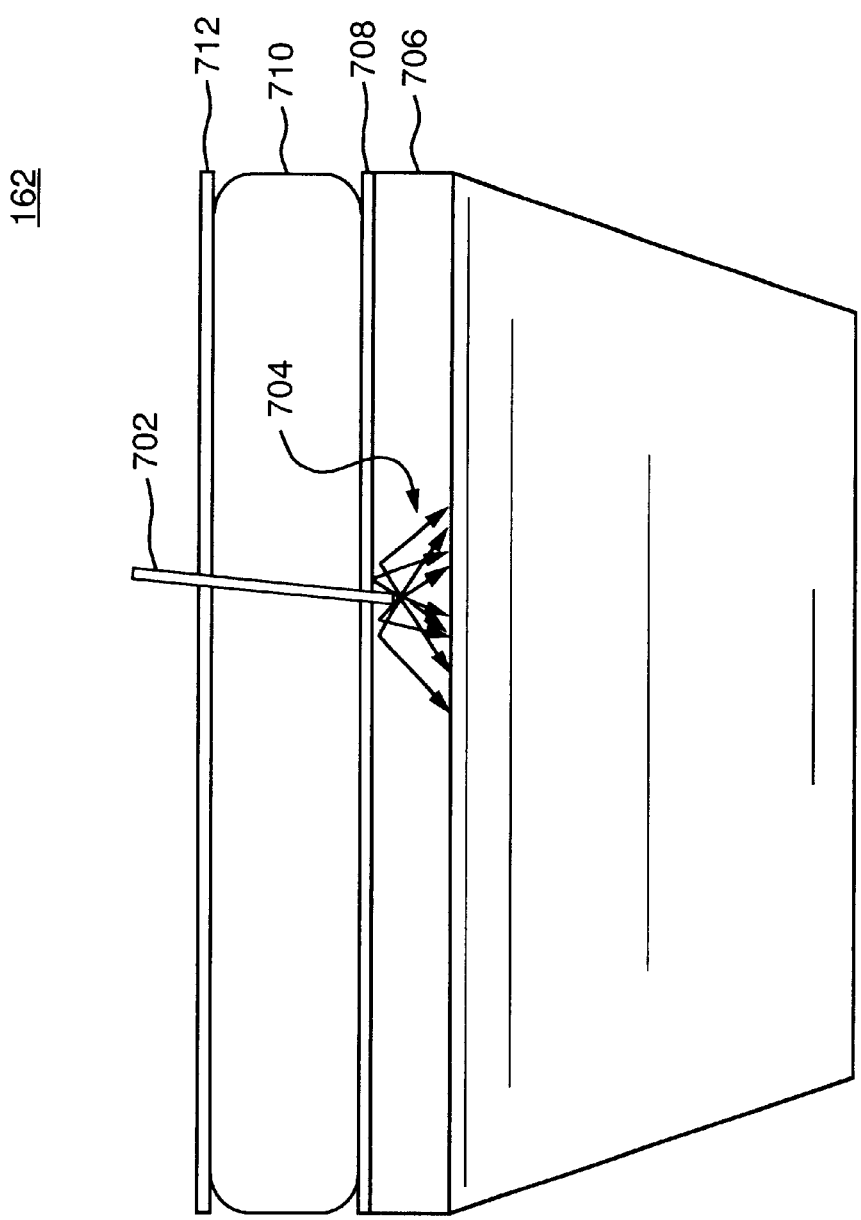
FIG. 7 is a perspective view of one embodiment of the scintillation plate shown in FIG. 1B.

FIG. 7 is a perspective view of one preferred embodiment of scintillation plate 162. Since x-rays are not a visible form of electromagnetic radiation, image sensor 108 requires the conversion of x-rays into photons after passing through target 106. Traditionally, this conversion is accomplished with a phosphor screen, as is well known in the art. Although the light photons released by such a phosphor screen in response to an impinging x-ray are dispersed in all directions, the inclusion of a reflective surface on the surface of the phosphor screen through which the x-rays are received to direct scattered photons toward the photodetectors have generally not been implemented in mammography detectors. The lack of such implementations is primarily due to the accepted understanding that such techniques adversely affect the spatial resolution of the implementing image sensor. The absence of such techniques has not proven detrimental to traditional mammography detectors, however, since such detectors generally include a large number of fiberoptic tapers, reducing the requisite amount of photons generated by the phosphor screen.

As noted, fiberoptic tapers 174 have a demagnification ratio that is significantly greater that those used in conventional systems and, therefore, have a lower transfer efficiency. In accordance with one aspect of the present invention, such transfer efficiency is compensated for through the use of a scintillation plate 162 that significantly increases the number of photons entering fiberoptic tapers 174 in response to a given x-ray photon.

Referring to FIG. 7, scintillation plate 162 includes a phosphor layer 706 formed, for example, by depositing phosphor grains onto a reflective substrate 708. In one preferred embodiment, phosphor layer 706 has a thickness that is approximately the same or less than the "effective pixel size" to provide a spatial resolution that is approximately equal to that of sensor module 200. The "effective pixel size" of sensor module 200 is defined herein as the product of the demagnification ratio of fiberoptic tapers 164 and the pixel size of CCD detectors 166. In one particular embodiment, the thickness of phosphor layer 706 is approximately 40 μm with a phosphor grain size of between 5 μm and 10 μm.

In one embodiment, substrate 708 is a polyester film that in general retains good physical properties over a wide temperature range, has a high tensile tear and impact strength, is inert to water, is moisture-vapor resistant and is unaffected by and does not transmit oils, greases, or volatile gases. In one preferred embodiment, substrate 708 is comprised of aluminized Mylar®.

An x-ray photon 702 is converted by phosphor layer 706 into several hundred light photons 704. Due to the low x-ray absorption cross-section of the aluminized Mylar®, there is a relatively low likelihood that x-ray photon 702 is absorbed as it passes through reflective substrate 708 to phosphor layer 706. Emitted photons 704 generally travel toward fiberoptic tapers 164 or are dispersed in the opposite direction toward x-ray source 102. These photons are reflected by aluminized Mylar® substrate 708 so as to travel towards fiberoptic taper 164, leading to a significant increase in the light input to fiberoptic taper 164.

In the illustrative embodiment, phosphor layer 706 is held in contact with fiberoptic taper 164 (not shown) with an inflated Mylar® balloon 710 located between an x-ray transparent front window 712 of light-tight box 182 and phosphor layer 706. In another embodiment, a thin foam sheet (not shown) can be used in place of Mylar® balloon 710. In one embodiment, the transparent front window 712 is constructed from Beryllium. In another embodiment a sheet of carbon fiber is used for the transparent front window 712. In one embodiment, x-ray transparent front window 712, Mylar® balloon 710 and Mylar® substrate 708 are constructed and arranged to transmit substantially all incident x-ray photons.

In operation, as an x-ray particle 702 enters phosphorous screen 706 it passes through reflective substrate 708 and interacts with the phosphor grains creating light photons 704. The x-ray photon 702 is not refracted and passes in a substantially straight path preserving its location information. Due to the aluminized Mylar® reflector 708 and any particular construction of the phosphorous screen approximately 450 light photons are generated for each 8 KeV x-ray particle entering the phosphorous screen. In addition to this amplification, the location of the x-ray photon is preserved because these photons are approximately distributed about the same location as the x-ray photon that entered the phosphorous screen.

It should be understood that reflective surface 708 may be formed of other reflective materials having similar x-ray absorption cross-section as substrate 708. It should also be understood that other x-ray-to-light photon converters may be used in other aspects of the present invention. For example, in one embodiment, CSI or ceramic converters may be used. It should also be understood that materials other than aluminized Mylar® may be used as reflector 708. For example, a polyethylene terephthalate (PE) film may be used.

D. Sensor Module Alignment

The imaging surface 180 defined by fiberoptic taper input surfaces 210 should be substantially flat. This will contribute to insuring fiberoptic tapers 164 are appropriately spaced to avoid loss of data and to avoid image distortions at sensor module boundaries. As noted, the individual sensor modules 200 are securely attached to mounting frame 176. To achieve the desired imaging surface 180 of sensor array 500, sensor modules 200 must be individually aligned; that is, the orientation and position of each sensor module 200 is to be adjusted when each sensor module 200 is initially installed or subsequently replaced. Many techniques are commonly available for making such adjustments. For example, separate adjustment screws for elevation and translation could be installed to adjust each flange 204. However, in sensor array 500 which includes multiple sensor modules 200, such an approach may result in a significant quantity of adjustment screws. The associated time to adjust the individual adjustment screws and the space necessary to support such an approach adversely affects the cost, complexity and ease of use of the implementing image sensor. Aspects of the present invention include a novel and unique approach to providing full six degrees of freedom for independently adjusting each sensor module 200 in a significantly small space and with a minimal quantity of components.

Figure 8A:
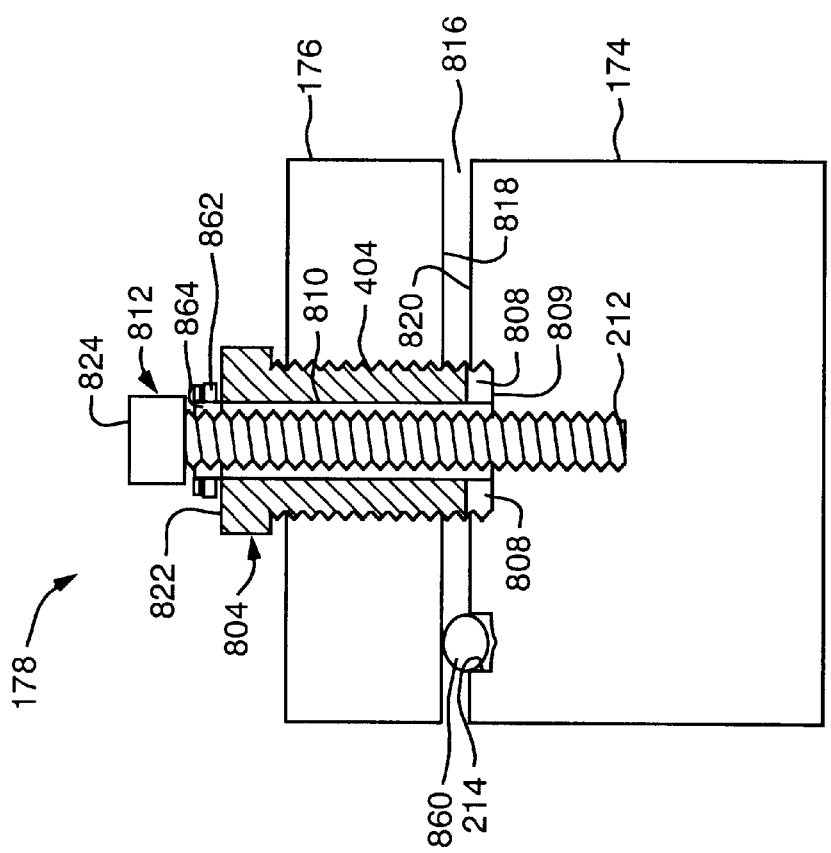
FIG. 8A is a cross-sectional view of a portion of a flange and mounting frame illustrating one alignment screw pair connecting the two.

In accordance with one aspect of the present invention, pairs of concentric adjustment screws 178 are provided to adjust flange 174 relative to mounting frame 176. FIG. 8A is a cross-sectional view of a portion of flange 174 and mounting frame 176 showing one embodiment of concentric adjustment screw pair 178. FIG. 8B is a perspective view of a flange 174 illustrating the use of four (4) such concentric adjustment screw pairs 178 to align each individual sensor module 200 in sensor array 500.

Referring to FIG. 8A, each concentric adjustment screw pair 178 includes an outer concentric screw 804 adjustably connected to mounting frame 176, and an inner concentric screw 812 adjustably connected to flange 174. In the illustrative embodiment, each of the screws 804, 812 have control heads 822, 824 for manual adjustment. Mounting frame 176 is positioned proximal to flange 174 relative to heads 822, 824. Passageway 404 extends through mounting frame 176 and is sized and dimensioned to threadably receive outer concentric screw 804. Similarly, bore 212, which is axially aligned with passageway 404, extends a predetermined distance into flange 174 and is sized and dimensioned to threadably receive inner concentric screw 812. Outer concentric screw 804 includes a central lumen 810 sized and dimensioned to receive freely inner concentric screw 812. That is, the inner diameter of central lumen 810 is larger than the outer diameter of inner concentric screw 812. The relative diameters are selected to achieve a desired degree of relative translation between the mounting frame 176 and flange 174. As shown in FIG. 8A, inner concentric screw 812 has a length that, when disposed within central lumen 810 of outer concentric screw 804, its distal end extends through mounting frame 176 to threadably mate with bore 212 of flange 174.

Outer concentric screw 804 has a length such that it extends through passageway 404 to seat against surface 820 of flange 174. In one embodiment, a washer 808 having a center orifice 809 is disposed within a slot 806 in flange surface 820 to provide a flexible surface against which outer concentric screw 804 seats. Washer orifice 809 is sized and dimensioned to freely receive inner concentric screw 812 to extend therethrough. An additional washer 862 is preferably disposed between control heads 822 and 824. Washer 862 has a center orifice 864 disposed so as to receive freely inner concentric screw 812 similar to central lumen 810 of outer concentric screw 804. Such a washer or spacer 862 provides for relative lateral movement between mounting frame 176 and flange 174.

In operation, rotation of outer concentric screw 804 adjusts flange 174 toward or away from mounting frame 176 to define a gap 816 between surface 818 of mounting frame 176 and flange surface 820. When drawn toward mounting frame 176, surface 820 of flange 174 abuts against outer concentric screw 804 such that screw 804 seats against washer 808. When inner concentric screw 812 is loosened, the distance between flange 174 and mounting frame 176 increases until flange 174 is able to be translated parallel to the x-y plane, as shown in FIG. 8B. When flange 174 is laterally translated so as to be located in a desired lateral position, inner concentric screw 812 is tightened, increasing the pressure of surface 820 against outer concentric screw 804 thereby securely maintaining flange 174 in its current position. The position of flange 174 along the z-axis 828 is determined by the distance that outer concentric screw 804 extends beyond surface 818 of mounting frame 176.

As noted, screws 804, 812 each have heads 822, 824 for manual adjustment. The heads 822, 824 should be externally accessible to enable the manual rotation thereof. It should be understood, however, that other types of control heads suitable for a particular application may be used. For example, head portion 824 may have a keyed recessed rather than extend beyond head portion 822.

The alignment of flange 174 relative to mounting frame 176 will now be described with reference to FIG. 8B. FIG. 8B illustrates one embodiment of flange 174 having four bores 212, one in each corner of flange 174, for receiving a concentric screw pair 178A–D, shown schematically in FIG. 8B. As noted, each concentric screw pair 178 enables the associated portion of flange 174 to be translated in x-axis 828, y-axis 830 and z-axis 832. This implementation of four such concentric screw pairs 178 enables flange 174 to be rotated about each of the three axes 828, 830 and 832 as well. Thus, in concert, the four concentric screw pairs 178 may be used to translate and rotate flange 174 to place it in a desired orientation and position relative to mounting frame 176.

To translate flange 174 along x-axis 830 or y-axis 832, each of the four concentric screw pairs 178 are loosened, adjusted, and secured as noted above. To change the orientation of flange 174, the concentric screw pairs 178 may be adjusted individually or in pairs. For example, to rotate about x-axis 830, concentric screw pairs 178A and 178D may be adjusted to change the position of the associated side of flange 174 in one direction along the z-axis while concentric screw pairs 178C and 178B may be adjusted to change the position of the opposing associated side of flange 174 in the opposite direction along the z-axis. Rotations about the y-axis are achieved in a similar manner. Rotation about the z-axis is achieved through the lateral translation of the four concentric adjustment screw pairs 178. In practice, inner concentric screw 812 is generally left loose while sensor modules 200 are translated into a desired position. Outer concentric screw 804 is used to adjust the depth between mounting frame 176 and flange 174. Once a desired alignment is achieved, inner concentric screw 804 is tightened.

It should be understood that the four concentric screw pairs 178 of the present invention may be utilized to adjust the orientation of any proximate and distal members relative to each other. It should also be understood that the number and location of such concentric screw pairs on such members may vary in number and location. It should be further understood that carefully machined components that enable fiberoptic taper 164 to be accurately mounted in flange 174 would eliminate the need for concentric screw pairs 178.

In an alternative embodiment, three tiers of sensor modules may be used with a center tier of sensor modules 200 having the same dimensions. In such an embodiment, the center tier, when aligned with a mating line on one side will still be capable of aligning the opposing sides of the fiberoptic tapers along a second mating line. In these circumstances, then, the center tier of sensor modules may be a common tier of sensor modules used in two different sets of 2-tier arrangements.

E. Thermoelectric Cooling System

As noted, sensor array 500 utilizes a simple mechanical design using fiberoptic tapers 164 that have a larger demagnification ratio and lower transfer efficiency than fiberoptic tapers traditionally used in conventional imaging sensors. Utilization of such fiberoptic tapers reduces the light available to CCD detectors 166, reducing the signal-to-noise ratio of image sensor 108. However, image sensor 108 of the present invention distinguishes smaller image details with greater dynamic range and spatial resolution than conventional image sensors. For example, in the exemplary x-ray mammography system 100, image sensor 108 has an intensity resolution of approximately 30,000 x-rays, providing sufficient contrast to identify breast cancer at an earlier stage than conventional mammography detectors. This requires a signal-to-noise ratio greater than that which is typically characteristic of conventional image detectors in general and mammography detectors in particular.

In accordance with one aspect of the present invention, noise produced by CCD detectors 166 is reduced significantly to compensate for the reduced efficiency of fiberoptic tapers 164. It is well known that CCD detectors have an inherent electronic noise due to the presence of thermal noise, and that such thermal noise is a function of the ambient temperature. In one aspect of the present invention, CCD detectors 166 are cooled with a thermoelectric (TE) or Peletier cooling device 172, as introduced above with reference to FIG. 1B. A thermoelectric cooler is an electric device in which applied electric power produces a temperature difference between two surfaces of the device. In the present invention, a cold surface of such a thermoelectric device is thermally coupled to CCD detector 166 while a hot surface is thermally coupled to a heat sink to dissipate the heat generated. In one preferred embodiment, TE cooler 172 maintains the temperature of CCD detector 166 at between 0° C. to −45° C. Experiments have found that this reduces the thermal noise of CCD detectors 166 by a factor of two for every 7° C. For example, reducing the temperature from room temperature to −45° C. would reduce the dark noise by a factor of approximately 1000. It should be understood that the temperature range at which the TE coolers 172 maintain CCD detectors 166 depends upon the application. For example, in the exemplary mammography system 100 described herein, a preferred range to maintain CCD detectors 166 is 0° C. to 0° C. In a crystallography imaging system, a desired temperature range at which TE coolers 172 maintain the temperature of CCD detectors 166 is from −30° C. to −45° C. It should also be understood that the temperature at which TE coolers 172 operate is a function of the type of CCD detector 166 implemented in image sensor 108. For example, for the Thomson CCD detector noted above, a preferred temperature at which the CCD detector is maintained to minimize inherent noise is −5° C. when implemented in mammography systems and −35° C. when implemented in crystallography systems. As one skilled in the relevant art should find apparent, then, the preferred temperature at which CCD detectors 166 are maintained is dependent upon the application of image sensor 108 and the type of CCD detector 166.

As noted, chamber 190 is a hermetically sealed chamber in which CCD detector 166 and cooling module 170 are located. In another embodiment, chamber 190 is filled with dry air or nitrogen. Alternatively, chamber 190 is evacuated to minimize heat transfer to other components of sensor module 200. Chamber 190 prevents condensation from accumulating on CCD detectors 166 which, at the above-noted temperatures, will subsequently freeze and damage CCD detectors 166. In one embodiment, chamber 190 is simply a sealed, air-tight chamber. There are many techniques which may be utilized to create the desired environment within chamber 190. Implementation of such techniques is considered to be within the purview of those of ordinary skill in the art and, therefore, are considered to be within the scope of the present invention. Referring to FIGS. 2 and 8A a channel 214 is formed within each flange 174 to receive an o-ring 860 to provide an air-tight coupling between the flange 174 and mounting frame 176. Although not shown in the figures, there are similar o-rings implemented to provide air-tight coupling between cooling manifold 173 and base 914 of cooling modules 170, as well as between cooling manifold 173 and mounting frame 176.

In the illustrative system environment shown in FIG. 1B, cooling manifold 173 is stationary while fiberoptic tapers 164 have an adjustable position and orientation. In addition, fiberoptic tapers 164 travel due to thermal gradients, shock and vibration. Thus, there is relative movement between the stationary manifold 173 and CCD detectors 166 which are secured to fiberoptic tapers 164. In accordance with aspects of the present invention, in addition to a TE device 172, cooling module 170 includes thermal couplers for coupling TE device 172 to stationary heat sink 914 and movable CCD detector 166, at least one of which allows for six-degree-of freedom relative movement between two of the thermally coupled elements. This enables cooling modules 170 to maintain continually a constant thermodynamic connection between CCD detector 166 and TE device 172 and cooling manifold 173, thereby reducing the noise generated by CCD detector 166. One embodiment of cooling module 170 is described below with reference to FIGS. 9A, 9B and 10. An alternate embodiment of the cooling module is described below with reference to FIG. 11.

Figure 9A:
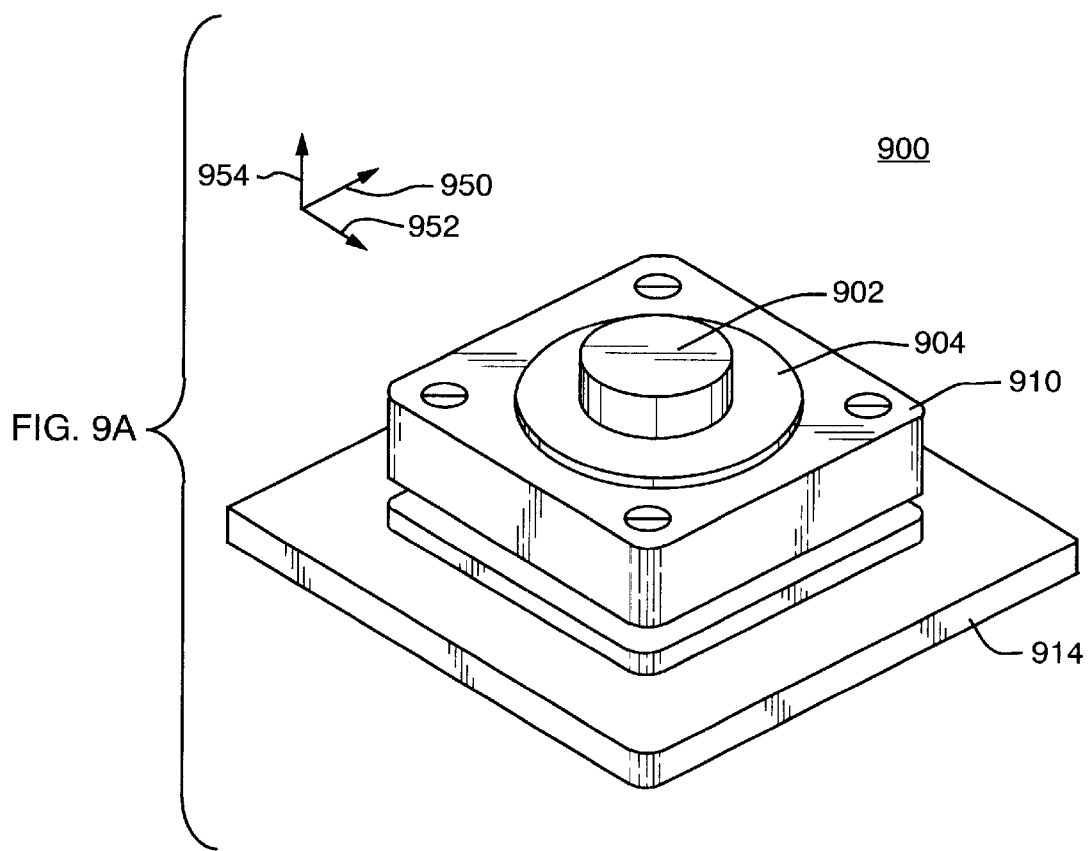
FIG. 9A is perspective view of one embodiment of a cooling module implemented in sensor module illustrated in FIG. 1B.
Figure 9B:
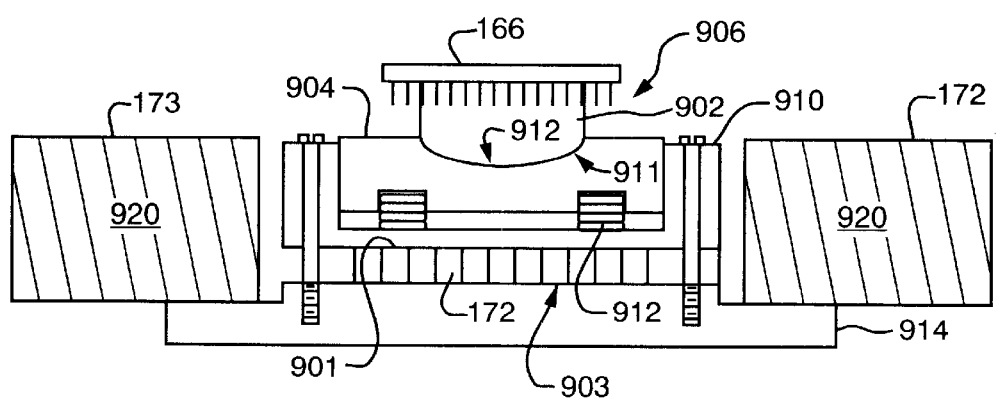
FIG. 9B is cross-sectional view of the cooling module illustrated in FIG. 9A.
Figure 10:
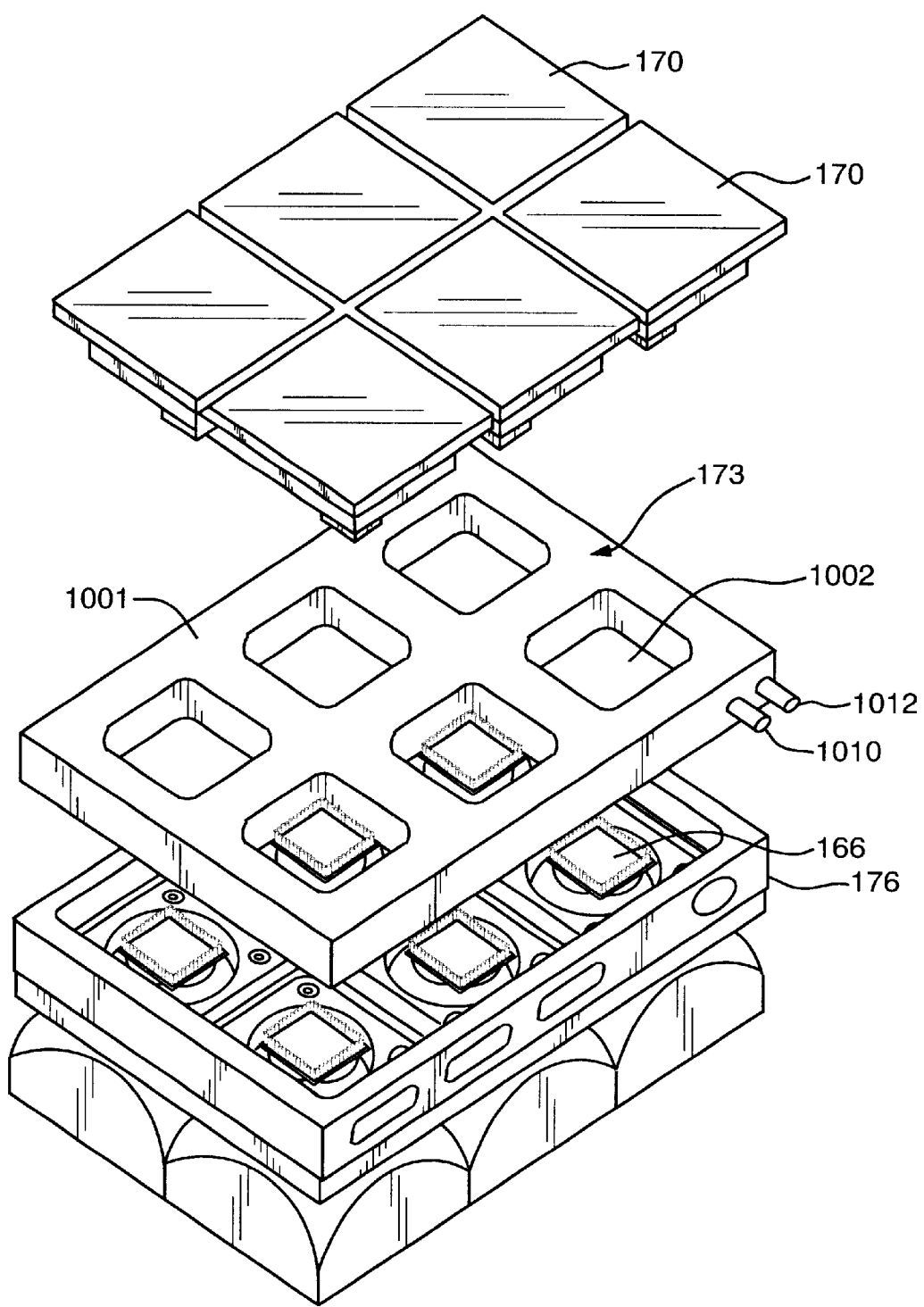
FIG. 10 is an exploded view of the image sensor shown in FIG. 1B illustrating the relative position of the cooling module shown in FIGS. 9A and 9B, the sensor modules shown in FIG. 2, and a cooling manifold.

FIG. 9A is a perspective view of one embodiment of cooling module 170 for cooling CCD detector 166. FIG. 9B is a cross-sectional view of cooling module 170 coupled to a cooling manifold 173 and CCD detector 166. FIG. 10 is an exploded perspective view of six such cooling modules 170 positioned so as to be thermally coupled to sensor modules 200. Stationary cooling manifold 173 is interposed between cooling modules 170 and sensor modules 200, although other arrangements to provide a heat transfer path are possible. A cross-sectional view of cooling manifold 173 is illustrated in FIG. 9B. In this embodiment, constant thermal coupling is provided by freely coupling TE device 172 and CCD detector 166 while fixedly securing TE device 172 to cooling manifold 173. In this configuration, cooling module 170 provides constant thermal coupling between TE device 172 and CCD detector 166 while allowing six degree relative movement therebetween.

TE device 172 includes a cold surface 901 and a hot surface 903. Cold surface 901 is thermally coupled to CCD detector 166 by a flexible thermal coupler 906. Flexible thermal coupler 906 includes a conductive block 902 thermally coupled to CCD detector 166. As described below, conductive block 902 is held continuously against CCD detector 166 when cooling module 170 is installed in image sensor 108. Conductive block 902 has a substantially flat upper surface for providing a sufficiently large contact area with CCD detector 166. A thermally conductive grease is provided between CCD detector 166 and thermally conductive block 902 to provide a constant thermal coupling between the two. As shown in FIG. 9A, in the illustrative embodiment, upper surface of conductive block 902 has a circular cross-section, with a surface area that is less than that of CCD detector 166, as shown best in FIG. 9B. This allows for relative lateral movement in the plane defined by axes 950 and 952 therebetween. However, it is sufficiently large so that heat transfer path is consistent across the surface area of CCD detector 166 to avoid thermal gradients. In alternative embodiments, the upper surface of conductive block 902 is machined so as to more closely maintain the shape of CCD detector 166 to ensure optimal thermal conduction between the two elements. Implementation of other cross-sectional shapes and configurations to achieve a desired thermal conductivity is considered to be apparent to those of ordinary skill in the relevant art.

Flexible thermal coupler 906 also includes a piston/cylinder that couples conductive block 902 to TE device 172. To prevent loss of thermal coupling between conductive block 902 and CCD detector 166 when there is relative movement between the two elements in vertical direction 954, a piston 904 is biased toward CCD detector 166 by springs 913 located within cylinder 910. The characteristics of springs 913 are such that a continual pressure is applied to conductive block 902 to maintain physical contact with CCD detector 166 without damaging CCD detector 166.

Thermally conductive block 902 is thermally and mechanically coupled to conductive piston 904. Piston 904 and cylinder 910 are sized and dimensioned to enable piston 904 to move freely along axis 954 within cylinder 910 while maintaining thermal coupling therebetween. Cylinder 910 is physically and thermally coupled to cold surface 901 of TE device 172. The coupling between the components in one embodiment is facilitated with thermal grease that also allows smooth movement to occur between components. In a preferred embodiment, the thermal grease is a low vapor pressure grease such as Dow Corning 340 thermal grease available from the Dow Corning Co. Thus, flexible thermal coupler 906 allows for the relative translation of CCD detector 166 and cooling module 170 along any of the three axes 950, 952 and 954.

To allow for rotational movement between CCD detector 166 and cooling module 170, a ball joint interface is provided between conductive block 902 and piston 904. Piston 904 has formed within a top surface thereof a substantially spherical recess 912. Conductive block 902 has a similarly shaped lower surface 912. This interface, under force provided by springs 913, insures thermally conductive block 902 is mechanically and thermally coupled to piston 904 while allowing CCD detector 166 to rotate smoothly in any direction, thereby providing three rotational degrees of freedom. Thus, the heat transfer between CCD detector 166, thermally conductive block 902, piston 904 and cylinder 910 is not impeded by either the orientation or position of CCD detector 166.

Hot surface 903 of TE device 172 is thermally coupled to a conductive back plate 914 which is securely attached and thermally coupled to cooling manifold 173. Cooling manifold 173 provides a thermal sink for removing excess heat generated by TE device 172. In one embodiment, cooling manifold 173 includes a continuous interior passageway 920 through which a coolant such as water flows to remove heat generated by TE device 172. Cooling manifold 173 is preferably a noncorrosive metal. Coolant is maintained entirely within cooling manifold 173 and is prevented from leaking into chamber 190 in which CCD detector 166 and TE device 172 are located. This ensures chamber 190 is maintained with minimal moisture, preventing freezing liquids from damaging CCD detector 166.

Referring to the exploded perspective view of FIG. 10, six cooling modules 170 are positioned so as to be thermally coupled to sensor modules 200. Stationary cooling manifold 173 is interposed between cooling modules 170 and sensor modules 200. Cooling manifold 173 includes a plurality of passageways 1002 through which a portion of each cooling module 170 extends to contact CCD detectors 166. This is also shown in the cross-sectional view of FIG. 9B. Back plates 914 are secured and hermetically sealed to cooling manifold 173. Similarly, cooling manifold 173 is securely attached and hermetically sealed to mounting frame 176. This prevents moisture from condensing on CCD detectors 166. In operation, coolant enters through input 1010, and flows through internal pathway (not shown) and exits cooling manifold 173 via outlet 1012. As one skilled in the art should find apparent, other types of heat sinks may be used. For example, in one alternative embodiment, back plate 914 is thermally coupled to an air cooled heat sink.

Figure 11:
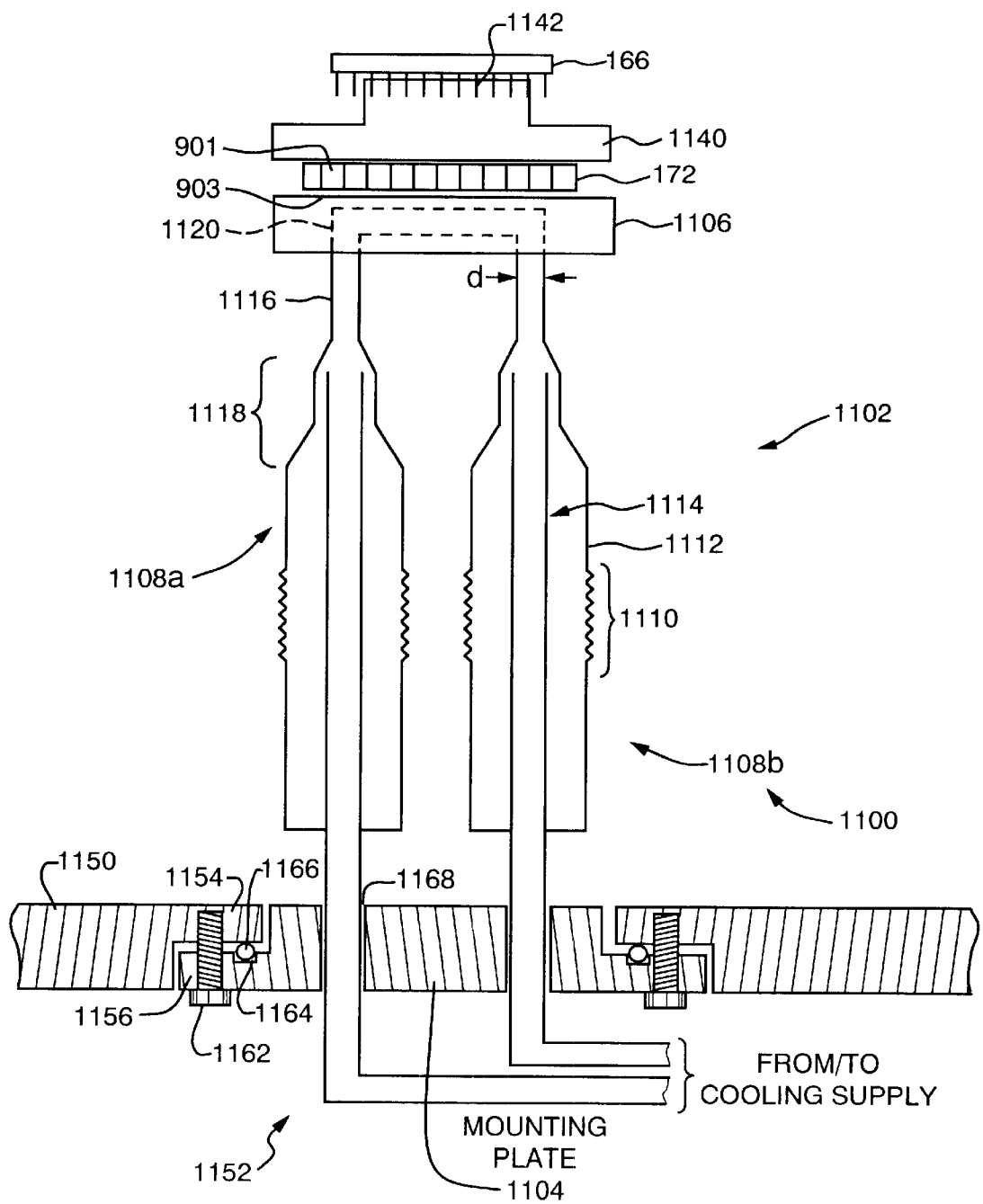
FIG. 11 is a side perspective view of an alternative embodiment of a cooling module implemented in the image sensor illustrated in FIG. 1B.

FIG. 11 is a side view of an alternative embodiment of a cooling module 1100 for cooling CCD detector 116 in accordance with the present invention by providing six degrees of freedom of movement between a stationary heat sink and CCD detector 166. In this illustrative embodiment, cold side 901 of TE cooler 172 is rigidly and thermally connected to CCD detector 166 so that TE cooler 172 and CCD detector 166 move as a single rigid body. In this configuration, cooling module 1100 provides flexible thermal coupler 1102 interposed between and thermally coupled to hot side 903 of TE cooler 172 and heat sink 1104 to provide six degrees relative movement therebetween.

A well known problem associated with flexible tubing is that it inevitably leaks over time. Polymeric tubing, for example, is microscopically porous and, as such, allows molecules to leak over long periods of time. In addition, the use of flexible tubing creates turbulence in the coolant flow that accelerates the deterioration of the tubing, whether the tubing is constructed of polymeric or metallic materials. Such leakage, over time, can have significant adverse effects in an environment such as chamber 190 wherein the temperature is maintained at a temperature significantly below zero degrees Celsius.

In accordance with this aspect of the present invention, a novel and unique cooling method is disclosed that provides the necessary heat transfer to heat sink 1104 while also providing six-degree of freedom relative movement between heat sink 1104 and CCD detector 166 that minimizes the likelihood of deterioration and leakage. Flexible thermal coupler 1102 includes a thermal block 1106 thermally and rigidly coupled to hot surface 903 of TE cooling unit 172. Thermal block 1106 includes passageway 1120 that receives coolant from, and returns to coolant a cooling supply (not shown) via a coolant supply line 1108A and a coolant return line 1108B. The supply and return lines 1108 each include a pair of concentric pipes arranged so as to prevent turbulence from being induced in the coolant flow due to the flexibility of the supply and return lines.

Specifically, supply and return lines 1108 each include two pipes: a flexible exterior pipe 1112 connected to conductive block 1106 and a rigid interior pipe 1114 connected to a mounting plate 1104 at the rear of detector enclosure 182. As shown in FIG. 11, a back plate 1150 of enclosure 182 has an opening 1152 through which interior pipes 1114 pass to be coupled to a cooling supply (not shown). The perimeter of back plate 1150 surrounding opening 1152 has formed therein a ledge 1154. Mounting plate 1104 has a corresponding L-shaped cross section forming a ledge 1156 that mates with ledge 1154 of back plate 1150. The ledges 1154 and 1156 have a threaded passageway 1158, 1160, respectively, in which a threaded bolt 1162 is disposed to secure mounting plate 1104 to back plate 1150.

A channel 1164 is formed in the upper surface of lower ledge 1156 which abuts against the lower surface of upper ledge 1154. Channel 1164 is configured to receive an o-ring 1166 to provide an air-tight coupling between mounting plate 1104 and back plate 1150. It should be understood that the opposing L-shaped configuration of mounting plate 1104 and back plate 1150 are just one of many different configurations that these two components can take to form an interlocking arrangement. It should also be understood that other arrangements may be utilized to achieve the desired air-tight coupling between mounting plate 1104 and back plate 1150. Interior pipes 1114 extend through passageways 1168 in mounting plate 1104 to reach the exterior of enclosure 182. To ensure chamber 190 is maintained at its desired environmental state, interior pipes 1114 are secured to mounting plate 1104 using epoxy or solder. It should be understood that other means for securely attaching interior pipes 1114 to mounting plate 1104 in a manner which provides an airtight seal therebetween may be used.

Flexible exterior pipe 1112 has a flexible region 1110 along a suitable portion of its length to provide the desired flexibility between CCD detector 166 and heat sink 1104. Flexible exterior pipe 1112 also includes a beveled region 1118 in which the interior diameter of the internal lumen decreases to a diameter, d, at neck region 1116 adjacent to block 1106. Rigid interior pipe 1114 is securely attached to heat sink 1104 and extends through the lumen of exterior pipe 1112 past flexible region 1110 to beveled region 1118. Interior pipe 1112 has a diameter approximately the same as neck region 1116.

Coolant travels through interior pipe 1114 and neck region 1116 of exterior pipe 1112 to/from thermal block 1106 and heat sink 1104. This arrangement isolates the coolant flow from perturbations caused by flexible region 1110, allowing coolant flow to occur relatively undisturbed through interior pipe 1114 and neck 1116 of exterior pipe 1112. This advantageously prevents coolant from coming into contact with flexible region 1110 of exterior pipe 1112. As relative movement between CCD detector 166 and mounting plate 1104 occurs, exterior pipes 1112 flex and rigid interior pipes 1114 translate laterally within the lumen of exterior pipes 1112. The beveled region 1118 assists in the even flow of coolant through neck 1116 as the supply line 1108 is flexed.

The opposing cold surface 901 of TE device 172 is rigidly coupled to CCD detector 166 via thermally conductive block 1140. As with thermal block 902 of the embodiment shown in FIGS. 9A and 9B, thermal block 1140 has an upper surface 1142 that has an area that is smaller than the surface area of CCD detector 166 to allow lateral movement therebetween in the plane defined by axes 950 and 952. Thermal grease such as that noted above is preferably used to thermally couple CCD detector 166 and conductive block 1140. Lateral movement along axis 954 is provided by compression and extension of flexible region 1110 of exterior pipe 1112. Thus, flexible thermal coupler 1102 provides six degrees of relative movement between heat sink 1104 and TE cooling device 172.

II. Exposure Control System

In mammography systems exposure control is a primary consideration. Conventional systems typically monitor the accumulated amount of radiation with a single x-ray sensor to ensure that the resulting image has sufficient contrast for proper interpretation. Generally, the technician places the sensor behind the detector, which in such conventional systems typically is a silver halide film in a film cassette. During an exposure, some x-rays pass through the film and cassette and are detected by the sensor. When the sensor indicates that the total exposure exceeds a predetermined threshold value, it causes the x-ray source to cease generating x-rays.

The sensor must be located behind the region of the breast with the greatest density to obtain a correct exposure. However, it is often difficult to determine the most appropriate location at which to place the sensor. Incorrectly exposed images are, therefore, not uncommon. As a result, patients are often subjected to subsequent exposures which increase the time the patient is positioned in the uncomfortable and, at times, painful position necessary to perform the mammography. In addition, any repetition of the procedure subjects the patient to greater exposure to x-ray radiation. Furthermore, the use of a single x-ray sensor, even if properly located by the technician, measures x-rays only over a very limited area of the overall image and can yield inaccurate data due to localized anomalies in the target and x-ray source.

In conventional mammography systems in which fiberoptic tapers are utilized, a short exposure is generally performed to create a test image that is examined by the administering technician or a computer program. Based on the quality of the test image and the measured x-ray exposure, the exposure control software determines the appropriate x-ray level that should produce an acceptable image. However, such estimations are difficult to make accurately, resulting in an inappropriate exposure being used for the second image. Subsequent exposures are often required to obtain an image with the desired quality. As noted, multiple exposures not only increase the x-ray dose received by the patient, but also the time the patient must maintain the uncomfortable or painful position needed for the procedure. Furthermore, this latter drawback applies even when the procedure proceeds as anticipated due to the time required to evaluate the results of the first test exposure and to program the mammography system to obtain the second exposure.

In accordance with one aspect of the present invention, a real-time automatic exposure control system 145 and method is implemented in mammography system 100. As noted, it is difficult to estimate the time at which a desired accumulated radiation dose is going to be achieved at a current x-ray source intensity level due to unpredictable variations in target 106 and source 102. The present invention determines automatically and in real-time when a desired radiation dose is achieved without the traditional techniques of estimating the region of the breast having the greatest density as well as without the performance of preparatory exposures.

The real-time automatic exposure control system of the present invention determines when a predetermined radiation dose is achieved by measuring current generated by one or more sensors in response to an exposure level. In one preferred embodiment, the sensors include one or more photodetectors attached to an exterior surface of fiberoptic tapers 164 to measure escaping light photons. In an alternative embodiment, the sensors include independently electrified regions of an anti-scatter or Buckey grid. In both embodiments, the measured current is integrated and compared to a preacquired characterization of sensor array 500 for which various x-ray doses have been associated with responsively-generated voltage values. During a given exposure procedure, the exposure control system integrates the current generated by the sensors to determine an accumulated radiation dose at predetermined locations across the image. The exposure control system controls x-ray source 102, causing it to cease generating x-rays when a predetermined radiation dose threshold 156 is achieved.

Figure 12:
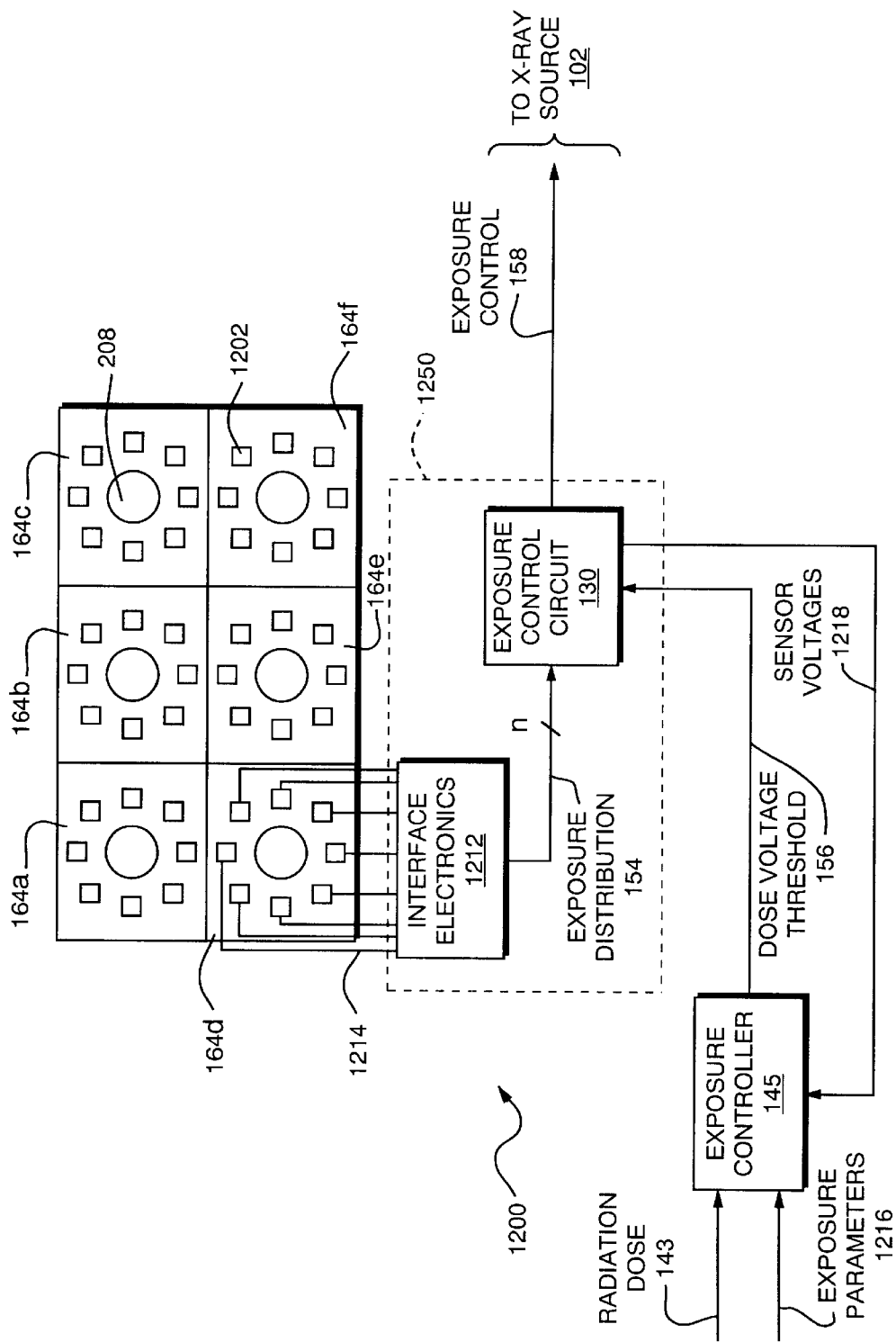
FIG. 12 is a block diagram of one embodiment of the automatic exposure control system of the present invention with a top view of and array of fiberoptic tapers illustrating the position of a plurality of photodetectors attached thereto in accordance with one embodiment of the present invention.
Figure 13:
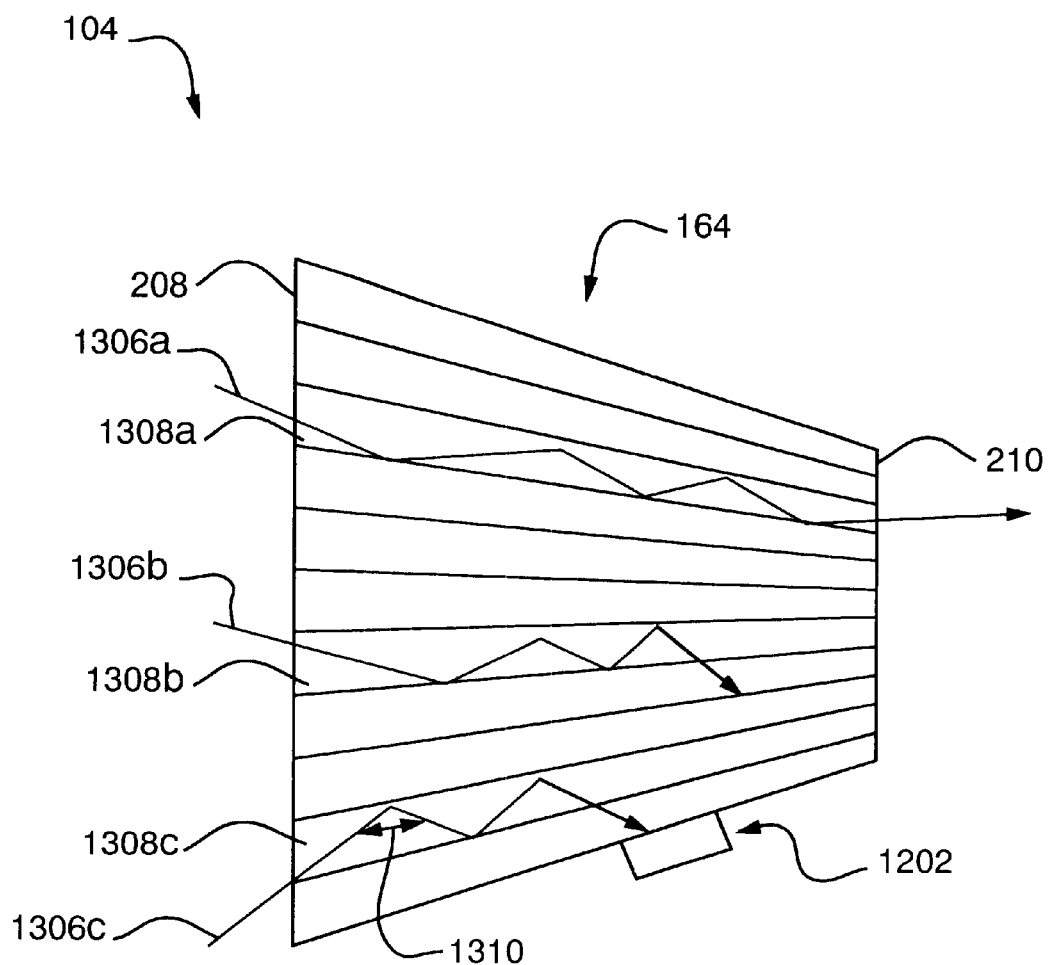
FIG. 13 is a cross-sectional view of a fiberoptic taper with light photons traveling therethrough, illustrating a photodetector connected to the fiberoptic taper to detect escaping photons in accordance with one embodiment of the present invention.

One embodiment of the automatic control system of the present invention is shown in FIGS. 12 and 13. FIG. 12 is a block diagram of an automatic exposure control system with a top view of an array of fiberoptic tapers 164 illustrating the position of a plurality of photodetectors 1202 attached thereto. FIG. 13 is a cross-sectional view of one such fiberoptic taper 164 illustrating light photons traveling therethrough. A single photodetector 1202 is connected to the illustrated fiberoptic taper 164 to detect escaping photons in accordance with this embodiment of the present invention.

The system, generally shown as system 1200 in FIG. 12, includes at least one, and preferably a plurality, of photodetectors 1202 connected to the exterior surface of fiberoptic tapers 164A–164F. As light travels through fiberoptic tapers 164, a portion of the light photons escapes fiberoptic tapers 164 prior to reaching output surface 210 and CCD detector 166 attached thereto. It is a well known phenomenon that as light photons 106 travel through a fiber 1308 of a fiberoptic taper 164, it is reflected at angles such as angle 1310. This angle 1310 may eventually exceed the critical angle of fiber 1308, causing the light photon to escape; that is, to pass through the side of the fiberoptic taper rather than continuing to travel therethrough. As shown by the exemplary embodiment in FIG. 13, three light photons 1306A, 1306B and 1306C enter input surface 208 of fiberoptic tapers 164. One light photon 1306A exits through output surface 210 while two photons 1306B and 1306C escape their respective fibers 1308B and 1308C. One such escaping light photon 1306C is detected by photodetector 1302. In the illustrative embodiment, a plurality of photodetectors 1302 are placed at predetermined locations on the exterior surface of fiberoptic taper 164 to detect such escaping photons 1306C.

It should be understood by those of ordinary skill in the art that photodetectors 1202 can be placed anywhere on the exterior surface of fiberoptic taper 164. However, it is preferable that photodetectors 1202 are placed at locations at which the greatest number of light photons 1306 will likely escape to increase the likelihood of the generation of a statistically significant current signal 1214. However, it is preferable to locate photodetectors 1202 at a location external to chamber 190. This minimizes the number of wires passing into chamber 190, increasing the likelihood that chamber 190 will be maintained at the desired conditions.

As shown in FIG. 12, there are eight photodetectors 1202 concentrically distributed around fiberoptic tapers 164. In this embodiment, there are a sufficient number of photodetectors 1202 to generate an accurate indication of a current exposure across the image. It should be understood, however, than any number of photodetectors may be used and may be positioned at other locations on fiberoptic tapers 164. Exposure control system 1200 precharacterizes a given fiberoptic taper and photodetector distribution. As such, any number and location of photodetectors 1202 can be used that generates detectable signals indicative of a current exposure level. Preferably, photodetectors 1202 have low noise and high gain characteristics. In one preferred embodiment, photodetectors 1202 are avalanche photodiodes manufactured by Hamamatsu, Bridgewater, N.J., USA. It should be understood that other photodetectors may also be used.

The plurality of photodetectors 1202 are electrically connected to exposure control circuit 130 through interface electronics module 1212. The connection of photodetectors 1202 associated with only a single fiberoptic taper 164D are shown in FIG. 12 for clarity. Interface electronics module 1212 performs well known signal conditioning operations to generate exposure distribution signal(s) 154 representing an instantaneous measured current generated by photodetectors 1202 in response to a current exposure level.

To provide an accurate determination of the x-ray exposure based on the signals from photodetectors 1202, a characterization of sensor array 500 is performed prior to real-time operations to calibrate the system. The characterization includes providing x-ray exposures at known exposure levels and measuring the current signals produced by photodetectors 1202. In this aspect of the invention, such precharacterization defines a relationship, for a series of exposure levels, between light photons 1306 entering input surface 210 of a fiberoptic taper 164 and the amount of light photons 1306 escaping that fiberoptic taper 164. In accordance with one embodiment of the present invention, exposure parameters 1216 including intensity and time (or, alternatively, radiation dose) of an exposure are provided to exposure controller 145 which correlates these values with sensor voltages 1218 generated in response to the exposure. This information is stored in memory 124 or storage unit 140 of computer system 116 for access by exposure controller 145. This information is stored in memory 124 or storage unit 140 of computer system 116 for access by exposure controller 145.

The precharacterization data is processed by exposure controller 145. It would be obvious to one of ordinary skill in the art that the precharacterization data can be analyzed using any number of techniques. For example, the data can be simply stored in a look-up table, linked list or the like. Alternatively, a mathematical function can be derived that approximates the current data using spline, b-spline, or local polynomial functions. Whichever technique is implemented, exposure controller 145 determines and generates a dose voltage threshold value 156 associated with a desired radiation dose 143.

Prior to performing an exposure, a technician enters the required x-ray dose 143 into exposure controller 145 in computer system 116 using well known data entry techniques. A voltage value associated with a desired radiation dose 143 is forwarded to exposure control circuit 130 via dose voltage threshold 156.

Exposure control circuit 130 integrates and processes current information 1214 in real time to determine an accumulated radiation dose. During each of a series of exposures, exposure control circuit 130 integrates current values 1214, converting the currents to voltages. The voltage is compared to the dose voltage threshold 156. The series of exposures continues until the desired radiation dose 156 is achieved. When this voltage value is accumulated, exposure control circuit 130 causes x-ray source 102 to cease generating x-ray field 104.

In one embodiment, exposure control circuit 130 separately integrates and compares the current generated by each of the sensor detectors 1202 and compares the integrated values to current associated with the selected or desired radiation dose is represented by the associated voltage values provided by computer 116. In such an embodiment, a desired radiation dose is considered to be achieved when the photodetector having the slowest rate of accumulation reaches dose voltage threshold 156. Due to the distribution of multiple photodetectors 1202, a low resolution image is thereby produced that enables exposure control system 1200 to accurately determine the distribution of the accumulated radiation dose across the image. Alterative arrangements may also be implemented, such as including a time limit beyond which the exposure procedure is considered to be completed, a predetermined number of sensors that must reach the dose voltage threshold value 156 or some percentage thereof, selection of specific photodetectors that must reach some individual or composite value, etc. Thus, the present invention determines in real-time the distribution of a total radiation dose over predetermined regions of the image during a single exposure, determining the appropriate radiation dose in real-time by comparing an accumulated radiation distribution with a predetermined characterization.

It should be understood that exposure control circuit 130 may be implemented in any well known manner, and may be combined with interface electronics 1212 as shown by dashed box 1250. For example, exposure control circuit 130 may be an analog system in which the current signals 1214 are integrated using a capacitor. The capacitor voltage is subsequently compared to a precharacterization threshold using one or more comparators. Alternatively, once current signals 1214 are conditioned, they may be converted to a digital representation using an analog-to-digital converter and provided to a digital circuit embodiment of exposure control circuit 130 for analysis.

Figure 14A:
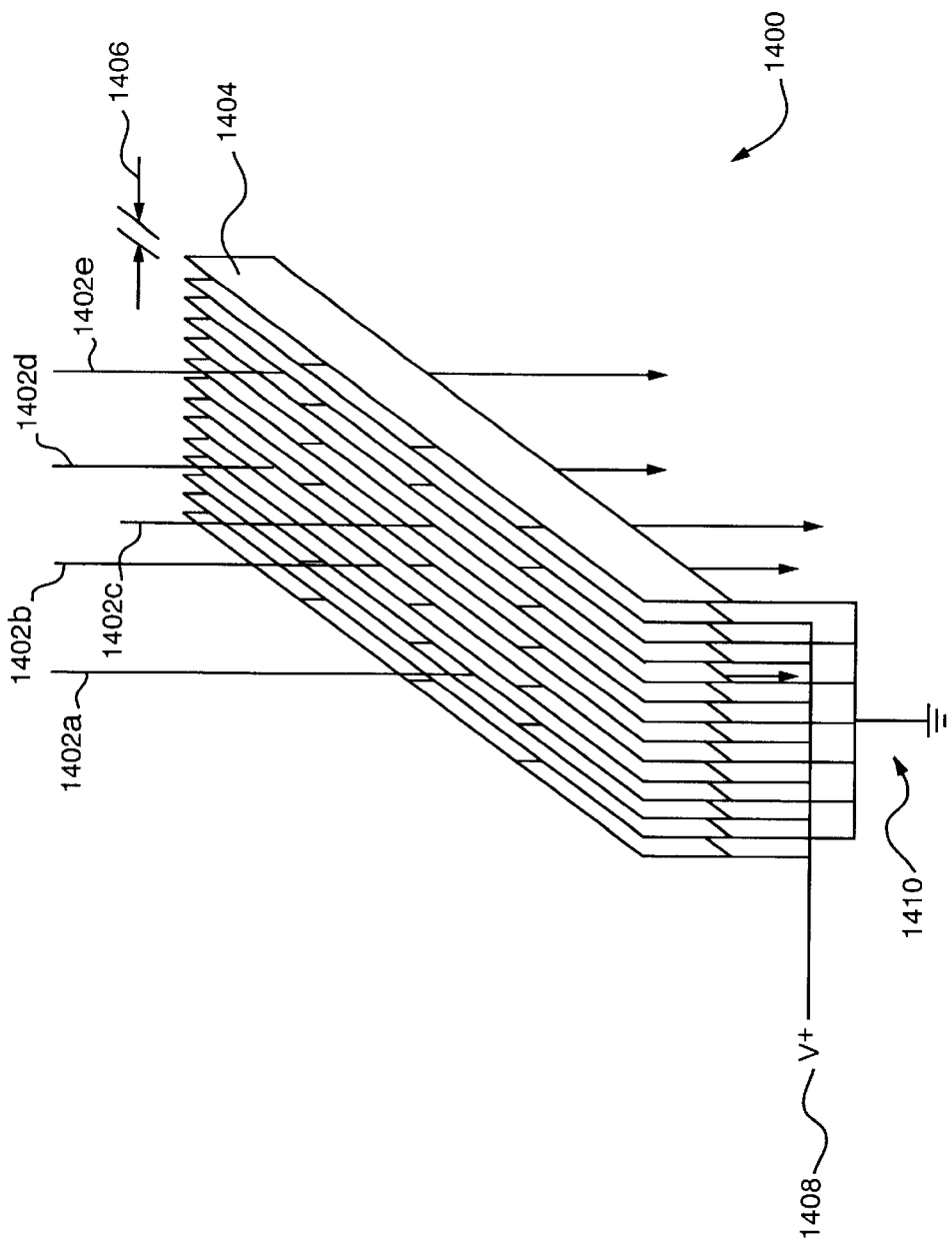
FIG. 14A is a perspective view of an anti-scattering grid connected to a power source to create a potential between neighboring plates of the grid.
Figure 14B:
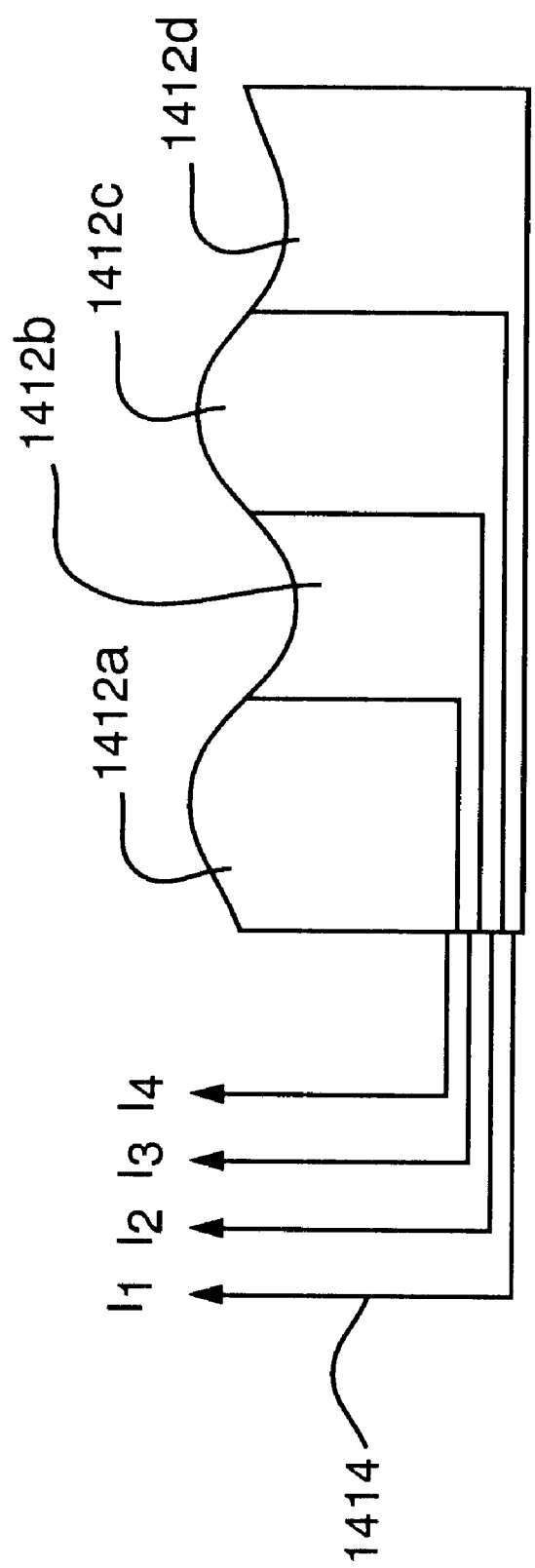
FIG. 14B is a side view of a anti-scattering grid plate illustrating one embodiment wherein the plate is divided into separately charged regions.

Referring to FIGS. 14A and 14B, in an alternative embodiment the radiation dose distribution is determined by establishing a charge between regions of neighboring plates of an anti-scatter grid also commonly referred to as a Buckey grid and by measuring the x-ray photons that pass therethrough. Thus, in this embodiment, exposure control and scatter rejection are combined. Scatter rejection is commonly implemented to ensure the quality of mammographic images and is generally accomplished through the implementation of a Buckey grid. As x-ray photons 1402 pass through Buckey grid 1400 the air will be ionized thereby creating charged particles. By applying an electric field across parallel plates 1404 of Buckey grid 1400 and recording the resulting change in potential across those plates due to the creation of the charged particles, the exposure level is determined to a high degree of accuracy. Preferably, the current exposure is measured at numerous places across the image, to provide a current exposure distribution.

X-ray photons 1404A-E are shown traveling through an anti-scatter grid 1402, placed between target 106 (not shown) and scintillation plate 162 (also not shown). Anti-scatter grid 1402 is an array of parallel plates 1404 that absorb scattered radiation by absorbing x-ray photons that are not traveling substantially parallel to plates 1404. A voltage potential is established across gaps 1406 defined by adjacent plates 1404, such as by connecting one plate to a positive or negative voltage source 1408 and the adjacent blade to ground potential 1410. An x-ray photon 1402 traveling between two such plates 1404 ionizes some of the gas molecules, causing current to flow between the plates due to the electromotive force provided by voltage 1408. The resulting current is proportional to the number of x-ray photons 1402 passing between grid plates 1404 that are energized with voltage 1408. In one embodiment, the current measured between groups of adjacent plates are used to determine the x-ray flux flowing between plates 1404. In a particular embodiment, the plates 1404 are each divided into several independently electrified regions 1412. Each region 1412 generates a separate current 1414 to provide spatial resolution of the exposure level in the direction of plates 1404.

It should be understood that any number of regions may be electrified to provide a desired spatial resolution. It should also be understood that such regions may be the same of different lengths. It should also be understood that other arrangements may be used to generate a charge in response to a passing x-ray photon 1402. For example, in one alternative embodiment of the present invention, a silicon or other semi-conductor material is located between adjacent plates of the anti-scatter grid. The remaining components of this embodiment of the exposure system are constructed and arranged, and operate the same as described above.

III. Image Processor

As noted, image processor 146 is preferably implemented in software. The software routines for performing the image processing methodology in accordance with aspects of the present invention typically reside in memory 124 and/or disk storage devices 140, and may be stored on a computer-readable medium such as, for example, magnetic disk, compact disc or magnetic tape and may be loaded into computer system 116 using an appropriate peripheral device as known in the art.

Preferably, image processor 146 is implemented in any well-known programming language such as C or C++. Those skilled in the art will appreciate that different implementations, including different function names, programming languages, data structures, and/or algorithms may also be used in embodiments of the present invention other than those described herein. It should be further understood that the present invention is not limited to a particular computer platform, particular operating system, particular processor, or particular high level programming language, and that the hardware components identified above are given by way of example only. Image processor 146 may be implemented, for example, in dedicated hardware, firmware, or any combination of hardware, firmware and software.

As noted, image processor 146 processes digital image data 152 to generate a digital mammograph suitable for use by computer system 116. CCD detectors of the type commonly used in image detectors have characteristics that vary slightly from one CCD detector to another. For example, different CCD detectors will have slightly different dark current, spatial irregularities within the CCD detector, and different output electrical responses to the same level of input radiation. In addition, each individual CCD detector may operate within a slightly different ambient temperature resulting in different noise levels. Accordingly, without further image processing, the quality of the output image produced by sensor array 500 may be limited and unacceptable for medical diagnostic imaging. As such, the exemplary embodiment of the present invention as shown in FIG. 1A includes an image processor 146 for processing the image data obtained from CCD detectors 166.

Image processor 146 will now be described with reference to FIGS. 15–24. First, the manner in which digital image data 152 is transferred and stored within computer system 116 for subsequent processing by image processor 146 is disclosed. This is followed by a description of reordering operations performed on digital image data 152 stored in local memory in certain embodiments of the present invention. These data transfer and preprocessing operations result in image pixel data suitable for processing image processor 146. Specifically, image processor 146 corrects for noise in the image pixel data. Compensation for intensity and spatial distortions inherent in image sensor 108 are then performed to generate a corrected image. Each of these operations is described in detail below.

A. Data Transmission and Storage

Figure 15:
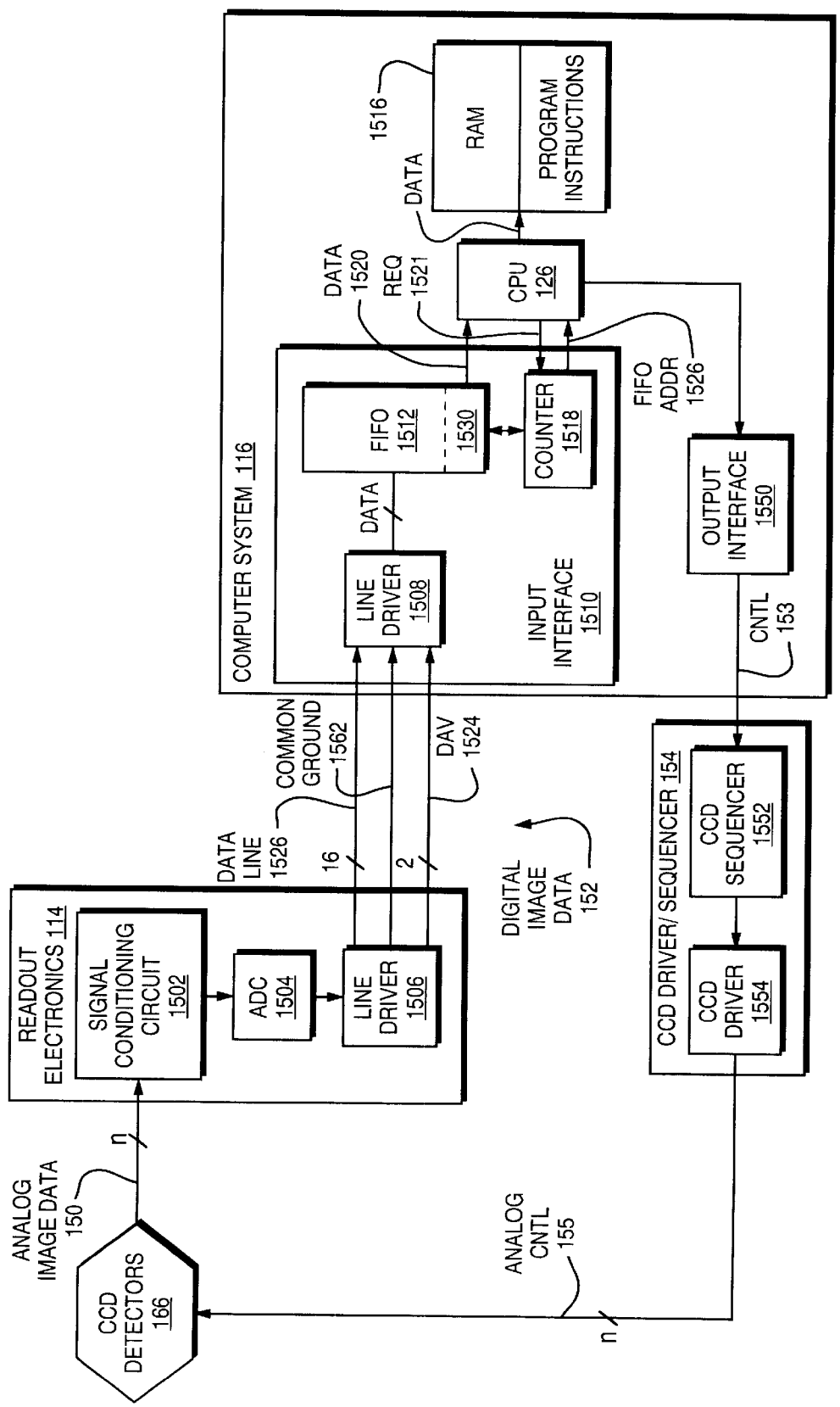
FIG. 15 is a block diagram of components of one embodiment of the system illustrated at FIG. 1A involved with the transfer of data between the image sensor and computer system.

FIG. 15 is a block diagram of components of system 100 involved with the transfer of data between CCD detectors 166 and computer system 116 in accordance with one embodiment of the present invention. Data transferred from CCD detectors 166 is conditioned by signal conditioning circuitry 1502 and digitized by ADC 1504 in readout electronics 114. A line driver 1506, also preferably included in readout electronics 114, transfers digital image data 152 to computer system 116. A line driver 1508 in a computer interface 1510 transfers the received digital image data 152 to a FIFO 1512 so as to buffer the flow of data. Image data is subsequently transferred by CPU 126 to RAM 1516 for subsequent processing by image processor 146.

Image sensor 108 transfers digital image data 152 across a number of wires to computer system 116. A common concern when transmitting image data is the loss or corruption of data. The loss of a single pixel from an image, for example, can result in misregistration of the resulting image data. Misregistration may result in lines appearing in the image where image data has been lost, and discontinuities appearing in the image where image data has been shifted to an incorrect location. Thus, the integrity of the resulting image is dependent on the ability to transfer the pixel data accurately and completely.

As is well known in the art, two techniques are commonly used to transmit data. One common technique is to transmit data using 2 wires per bit. Another common technique is to transmit data using a single wire per bit with an additional wire for carrying a common ground signal. When transmitting data using the former approach (referred to as "differential mode"), the wires of a single wire pair are driven so as to have an opposing phase relationship. The differential mode is often desired because of its ability to attenuate noise that is a common to both wires of the wire pair, resulting in a high signal-to-noise ratio. For example, the differential mode is often used to transfer data over long spans. On the other hand, since there is no attenuation of noise on the individual wires, the signal-to-noise ratio of a single wire system typically is lower than that experienced in differential mode communications, system, making the single wire system more susceptible to transmission errors.

Referring to FIG. 1A, image data 152 may be transferred from readout electronics 114 over a cable of significant length. For example, in one implementation of mammography system 100, computer system 116 is located approximately 50 feet from readout electronics 114. Thus, the transmission path is a potential source of errors in the data transmission. Such circumstances would suggest transferring image data differentially, that is, two wires per bit, to increase the likelihood of error-free transmission. However, the greater the number of wires that pass into chamber 190, the greater the complexity of the connectors and electronics. Accordingly, it is desirable to minimize the number of wires used to transfer image data 152. In one particular application, the transfer of image data 152 includes the generation of 16 bits per pixel as well as a data available (DAV) signal identifying when the information appearing on the data lines represents data for receipt and storage. Thus, full differential transmission requires the implementation of 34 wires ((16 bits +1 DAV)×2)) while the latter approach requires the implementation of 18 wires (16 bits +1 DAV +1 ground).

A hybrid technique for transferring digital image data 152 that minimizes the number of wires utilized while ensuring accurate and complete data transfer is implemented in accordance with one embodiment of the present invention. In accordance with one such embodiment, DAV signal 1524 is sent in a fully differential mode as shown by the indication in FIG. 15 that two wires are included in DAV signal lines 1524. The 16 individual bits are transmitted using a single wire per bit as shown by data lines 1520 with a common ground as shown by ground line 1522. Thus, in accordance with this aspect of the invention, digital image data 152 is transmitted with 19 wires (16 data+1 ground+2 DAV). This approach significantly reduces the likelihood of misregistration as DAV signal 1524 has a high degree of integrity due to the 2 wire differential mode. The data lines 1520 are transmitted using a technique that, as noted, may result in the loss of data. However, in the present invention, occasional loss of a bit or two of data does not adversely affect image integrity. In contrast to the misregistration of pixel data, bit errors in the image data does not introduce errors due to the large amount of data generally contained within an image. That is, a bit error for one pixel will be insignificant and unnoticeable in the overall image while the loss of an entire pixel can adversely affect image integrity. Thus, in one embodiment pixel data is sent using 16 individual wires 1520 and a common ground line 1522. In this manner, image integrity is maintained while minimizing the number of wires.

Referring again to FIG. 15, in accordance with one embodiment of the present invention, block transfers of data from FIFO 1512 to RAM 1516 are achieved from a single location of FIFO 1512. This provides for the use of a commonly available FIFO and other simple electronics to transfer large amounts of image data 152 into computer system 116. In response to a request 1521 from CPU 126 to transfer a block of data from a range of addresses in FIFO 1512, counter 1518 provides CPU 126 a FIFO address 1526, which is incremented to identify the data 1528 read out of a single location 1530 as data stored in sequential FIFO addresses. Data stored in FIFO 1512 is advanced sequentially into those memory locations vacated by a recent transfer of data to RAM 1516. Additional data subsequently received from readout electronics 114 is then stored in the available locations in FIFO 1512. Thus, the present invention avoids the implementation of an expensive, customized and dedicated frame grabber electronics board or other electronics to transfer image data 152 at a high data transfer rate.

It should be understood that the above described interface components illustrated in FIG. 15 are exemplary only. For example, in an alternative embodiment, input interface 1510 is a DIO32 interface board available from National Instruments, Inc., Austin, Tex., USA. Alternatively, other well-known techniques are available to interface computer system 116 with readout electronics 115 and CCD detectors 166.

As noted, computer system 116 generates digital CCD control signals 153 which are received and processed by CCD sequencer and driver 151 to generate analog control signals 155 which control the operations of CCD detectors 166. CCD sequencer and driver 151 includes a CCD sequencer 1552 and a CCD driver 1554. CCD sequencer 1552 manages the timing and operation of CCD detectors 166 based on digital control signals 153, insuring that CCD detectors 166 are properly controlled to perform exposures, generate analog image data 150, assume a particular configuration, etc. CCD sequencer 1552 may be implemented in any well known manner depending upon the type of CCD detectors 166 implemented in system 100. Similarly, CCD driver 1554 is considered to be well-known. Accordingly, computer system 116 typically includes an output interface 1550 to generate digital control signals 153. It should be understood, however, that the illustrated CCD sequencer and driver 151 are exemplary only. For example, CCD sequencer 1552 may be implemented as hardware, software, firmware or a combination thereof in CCD sequencer/driver 151 or computer system 116.

B. Image Processing Pipeline

Figure 16:
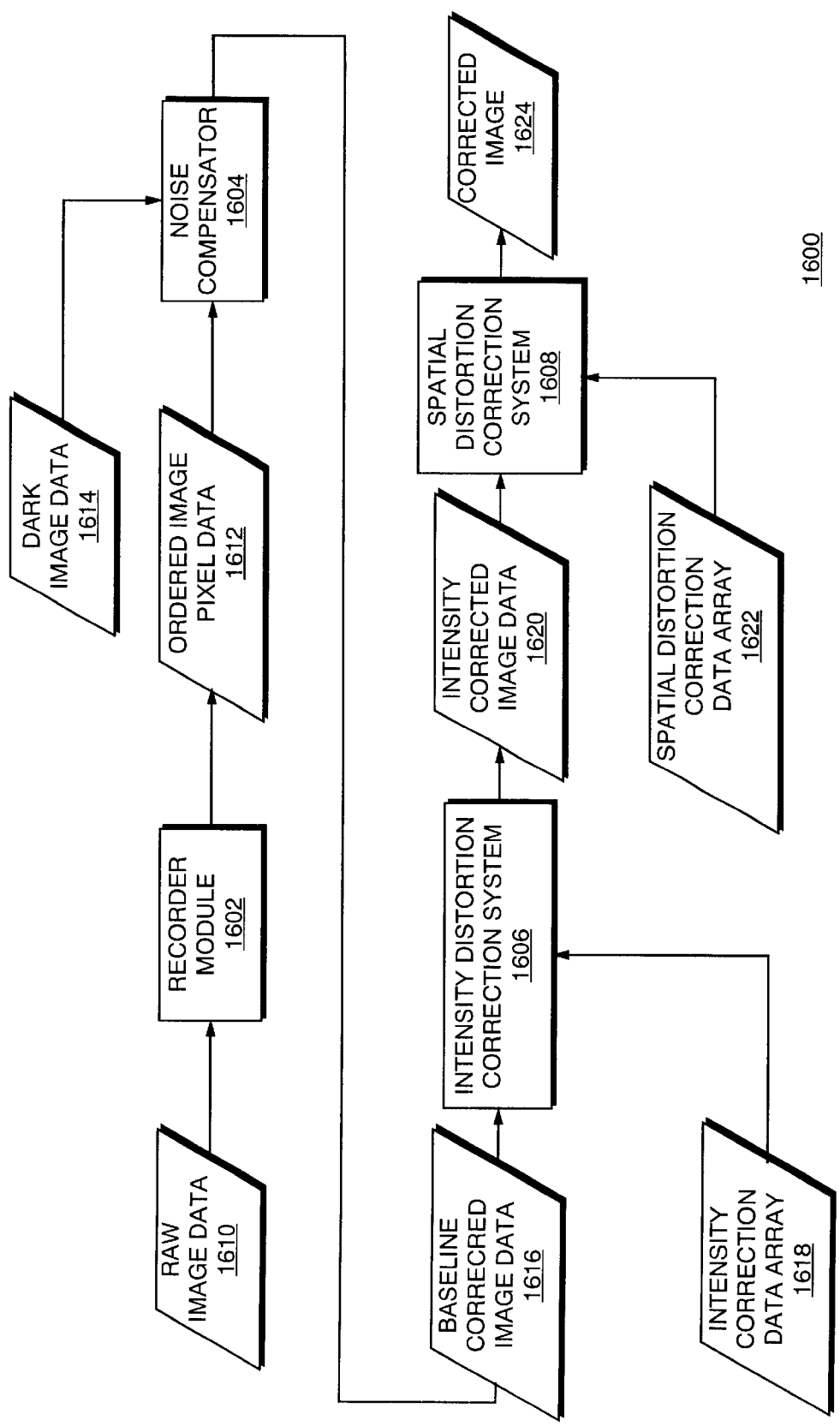
FIG. 16 is a block diagram of an image processing pipeline implemented in the mammography system illustrated in FIG. 1A in accordance with one embodiment of the present invention.

FIG. 16 is a block diagram of an image processing pipeline 1600 implemented in mammography system 100 in accordance with one embodiment of the present invention. Raw image data 1610 stored in RAM 1516 may not be in a format or arrangement suitable or optimal for processing by image processor 146. In such embodiments, image processor 146 includes a reorder module 1602 for reordering raw image data 1610. The results of this preprocessing operation is referred to as ordered image pixel data 1612. A noise compensator 1604 processes ordered image pixel data 1612 to remove noise inherent in system 100. Such noise is represented by dark image data array 1614. The removal of the noise component from ordered image pixel data 1612 results in the generation of what is referred to herein as a baseline corrected image data 1616.

Intensity distortions are corrected by intensity distortion correction system 1606. System 1606 receives baseline corrected image data 1616 and applies an intensity correction data array 1618 as described below to generate an intensity corrected image data 1620. Similarly, spatial distortions are corrected by spatial distortion correction system 1608. System 1608 receives intensity corrected image data 1620 and applies an spatial distortion correction data array 1622 as described below to correct for spatial distortions and resulting in a final corrected image 1624. Each of these component modules of image processor 146 are described in detail below.

C. Reordering of Image Data

CCD detectors 166 are typically read out at speeds of 0.1 to 4 MHZ. It is well-known that the noise associated with the read out of CCD detectors increases with the read out speed. Thus, to maintain the noise generated by this operation to a minimal level, each CCD detector 166 is read out at a rate of 1 MHZ. As noted, in the illustrative embodiment, each CCD detector 166 is read out at a rate of 1 MHZ and includes approximately 4 million photodetector elements. Thus, it takes approximately 4 seconds to transfer data from a single CCD detector 166. Since sensor array 500 includes six such CCD detectors, a total of approximately 24 seconds would be required to read sequentially the image data from sensor array 500.

Thus, one approach is to read the pixel data from CCD detectors 166 in parallel; that is, the pixel data is read from six CCD detectors 166 simultaneously. At 2 bytes per pixel, this will result in the transfer of data from sensor array 500 in 4 seconds; a transfer rate of approximately 6 MHZ or 12 Mbytes per second. The data is buffered and subsequently stored in memory 124 as described above. As shown in FIG. 16, the image data initially stored in RAM 1516 from CCD detectors 166 is referred to as raw image data 1610.

To accommodate the high data transfer rate, raw image data 1610 is arranged in RAM 1520 in the order in which it was read from CCD detectors 166; that is, the data for the first pixel of each of the six sensor modules 200 are stored sequentially, followed by the data for the second pixel of each sensor module 200 since, as noted, this was the manner in which the data was retrieved from CCD detectors 166 and transferred to computer system 166. In this embodiment, then, raw image data 1610 contains interleaved pixel data for the six CCD detectors 166. Raw image data 1610 is reordered by reorder module 1602 such that the pixel data for a given sensor module 200 is arranged sequentially in RAM 1516. As noted, this rearranged data is referred to as ordered image pixel data 1612.

Reorder module 1602 implements a data manipulation algorithm to rearrange the pixel data. Any such algorithm now or later developed may be utilized. It should be understood that other reorder techniques, or none at all, may be implemented to accommodate the order in which pixel data is retrieved from CCD detectors 166. Such alternative approaches are also considered to be well-known and to be within the scope of the present invention.

D. Noise Correction

Noise compensator 1604 adjusts ordered image pixel data 1612 to remove any noise component attributed to image sensor 108. As noted, this noise component is represented by dark image data 614. Dark image data 1614 is generated by taking an image during a time when x-ray source 102 is not emitting x-ray radiation. The resulting image is attributed to the noise generated by the system 100, and not due to the receipt of x-rays. Dark image 1614 is subtracted from ordered pixel image data 1612, resulting in baseline corrected image data 1616. Dark image data 1614 is an array of values each associated with a pixel in sensor array 500. Dark image data 1614 is substrate from ordered image pixel data 1612 using any well known technique now or later developed.

In one preferred embodiment of the present invention, multiple dark images are acquired and the median of the obtained dark images is calculated for use as dark image data 1614. Such an approach eliminates artifacts that may occur in any single dark image and simultaneously increases the statistical precision of dark image data 1614. In one particular embodiment, four dark images are processed to form dark image data 1614.

The above reordering and noise correction operations have been described as being performed as in image pipeline 1600. However, it should be understood that these operations may be performed in real time as digital image data 152 is being received by computer system 116.

E. Intensity Correction

Figure 17:
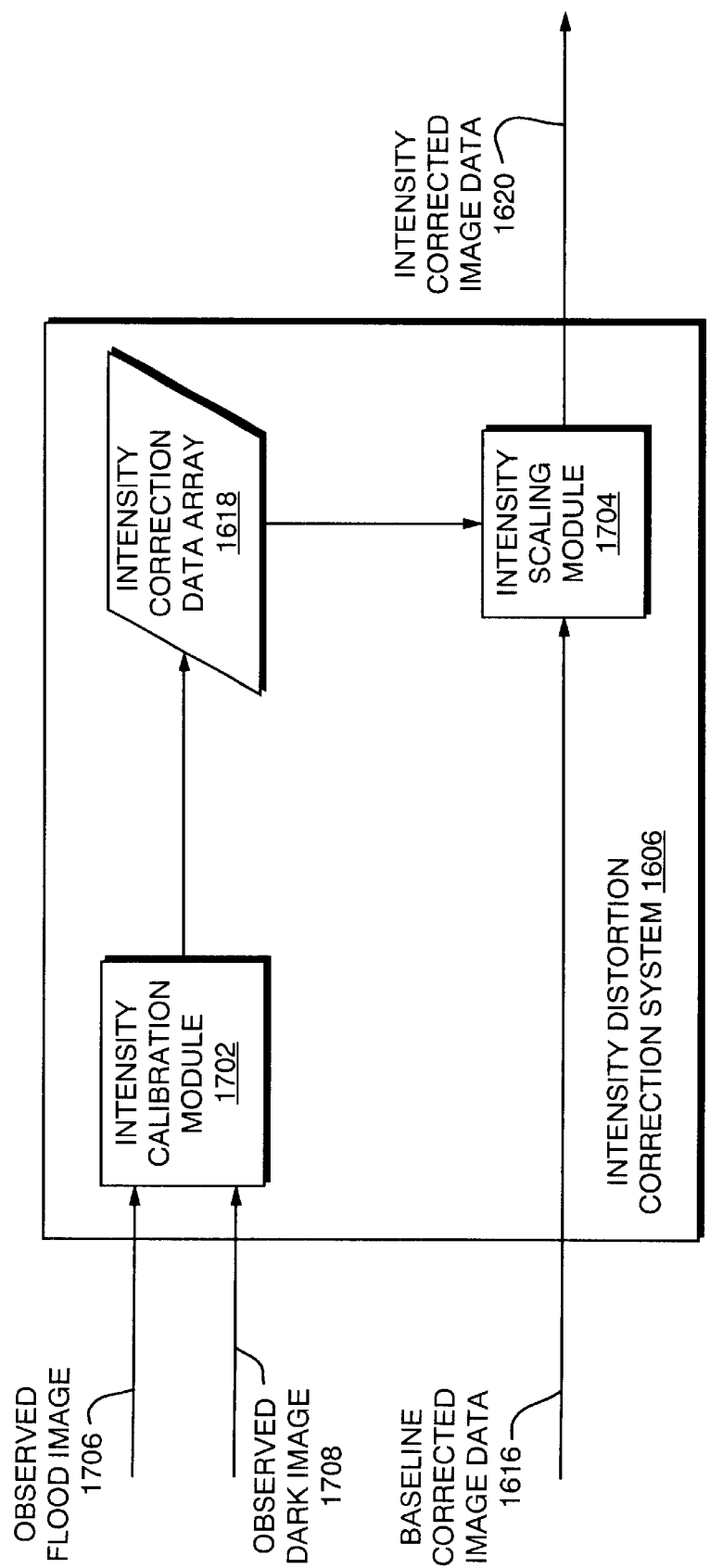
FIG. 17 is a functional block diagram of one embodiment of an intensity distortion correction system illustrated in FIG. 16.

As noted, intensity distortion correction system 1606 compensates for non-uniform intensity distortions within CCD detectors 166. FIG. 17 is a functional block diagram of one embodiment of intensity distortion correction system 1606 of the present invention. Referring to FIG. 17, the illustrative embodiment of intensity distortion correction system 1606 scales baseline corrected image data 1616 with previously generated intensity correction data array 1618.

Intensity distortion correction system 1606 includes an intensity calibration module 1702 that generates predetermined intensity correction data 1618 for use by intensity correction module 1702. Intensity correction data array 1618 is generated when image sensor 108 is first assembled and when a sensor modules 200 in image sensor 108 is replaced or repaired. Intensity correction data 1618 is stored as an array of values, each associated with a pixel in CCD detectors 166. Intensity correction array 1618 is defined as Intensity correction array=Ideal flood image/(flood image−dark image).

Figure 18:
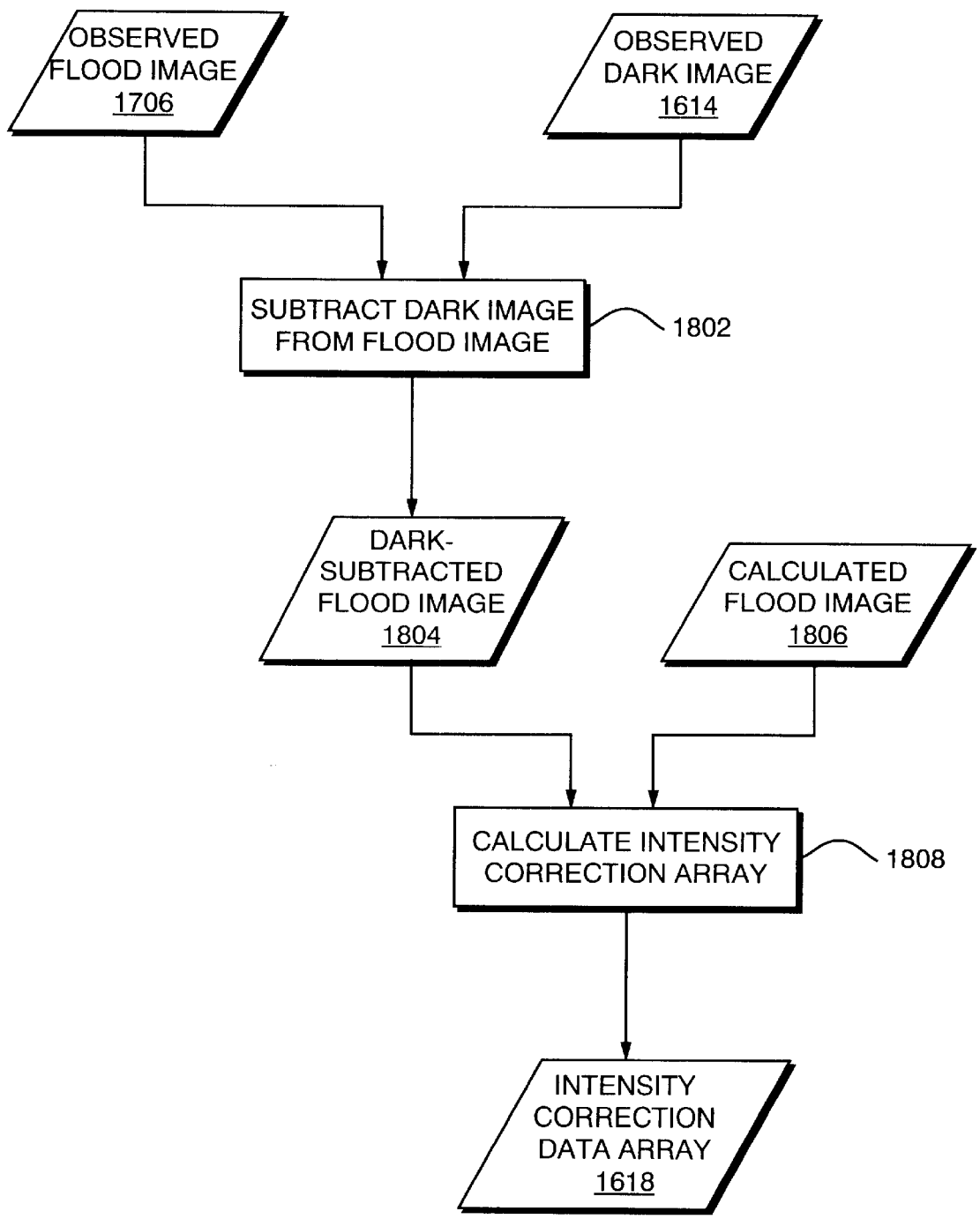
FIG. 18 is a flowchart of one embodiment of the processes performed by the intensity calibration module illustrated in FIG. 17 to generate the intensity correction data array illustrated in FIG. 16.

FIG. 18 is a flow chart of one embodiment of the processes performed by intensity calibration module 1702 to generate intensity correction data array 1618. Intensity correction data 1618 is generated by first observing a flood image 1706 and recording images in response thereto. A flood image is obtained by exposing image sensor 108 to an x-ray source having a known x-ray distribution with no target 106 present between x-ray source 102 and image sensor 108. A dark image 1614 is then produced at step 1806 by taking an image during a time when x-ray source 102 is not emitting x-ray radiation, as noted above. As with dark image data 1614, observed flood image 1706 may be the median values of multiple flood images. Dark image 1614 is subtracted from flood image 1706 at block 1802, resulting in a dark subtracted flood image 1804.

At block 1806, a calculated ideal flood image 1806 that would be created by x-ray source 102 given its known x-ray distribution field 104 is calculated. At block 1808, calculated ideal flood image 1806 is divided by dark-subtracted flood image 1804 resulting in the generation of an intensity correction data array 1618 of intensity distribution correction values for each pixel of CCD detectors 166.

The techniques to develop an ideal flood field are considered to be well known in the art. For example, for a point source, this ideal flood field may be determined from a $\cos^2$ function. This model is used to reflect the expected values in the dark-subtracted flood image in the absence of any detector distortions.

Optionally, at block 1808 the intensity correction data array 1618 may be multiplied by a constant and rounded to an integer value. This allows intensity correction data array 1618 to be stored as an integer array. This constant must be large enough to avoid errors being introduced by the rounding operation. In one embodiment, the constant multiplier is typically chosen to be a power of two, such as 4096. This allows fast scaling using bit shift operations to be used to multiply and divide. Next, intensity correction data array 1618 is examined by module 1704 to find values which are either too large or too small, indicating invalid detector data at these pixel locations. The intensity correction data array values at these positions are then replaced with an invalid pixel code.

During operations, intensity scaling module 1704 multiplies baseline corrected image data 1616 by intensity correction data array 1618 to generate intensity corrected image data 1620. In one embodiment of the present invention which uses integer representations of intensity correction data array 1618, integer math is used to multiply baseline corrected image data 1616 by intensity correction data array 1618. The result of this operation must be divided by the constant use to scale intensity correction data array 1618. This division can be performed as a bit shift if the constant is an integer power of 2. For example, division by the constant 4096 is accomplished by shifting 12 bits. Advantageously, this allows for the use of integer values and does not require floating point or division operations to be performed, thus reducing the processing time needed by image processor 146. In addition, intensity corrected image data 1620 resulting from shifting baseline corrected image data 1616 may be stored as integer values thus reducing not only the storage requirements, but also the number of memory read/write operations as well. In another embodiment of the resent invention, baseline corrected image data 1616 and intensity correction data array 618 may be multiplied together, pixel by pixel, in order to properly scale the image pixel data in order to remove the inherent intensity distortion therein.

F. Spatial Correction

As noted, spatial distortion correction system 1608 spatially corrects and convolves intensity corrected image data 1620 to correct spatial distortions in image sensor 108. The image received by spatial distortion correction system 1608 is spatially distorted due to the above-noted inherent characteristics of image sensor 108. This image is referred to generally as a spatially distorted image. In the illustrative embodiment wherein spatial distortion correction system 1608 receives image data produced by intensity distortion correction system 1606, intensity corrected image 1620 is a spatially distorted image. Accordingly, in the following description reference will be made to distorted image 1620. Specifically, and as will be described in detail below, spatial distortion correction system 1608 determines the intensity at each pixel location of a spatially undistorted image; that is, corrected image 1624. For each pixel in undistorted image 1624, spatial distortion correction system 1608 convolves the intensity of the pixels in a selected region surrounding the corresponding pixel location in the spatially distorted image 1620 to determine the intensity at the corresponding distorted image pixel location. The performance of this procedure for all pixels in the undistorted image results in corrected image 1624. Hence, corrected image 1624 is referred to herein as undistorted image 1624.

Figure 19:
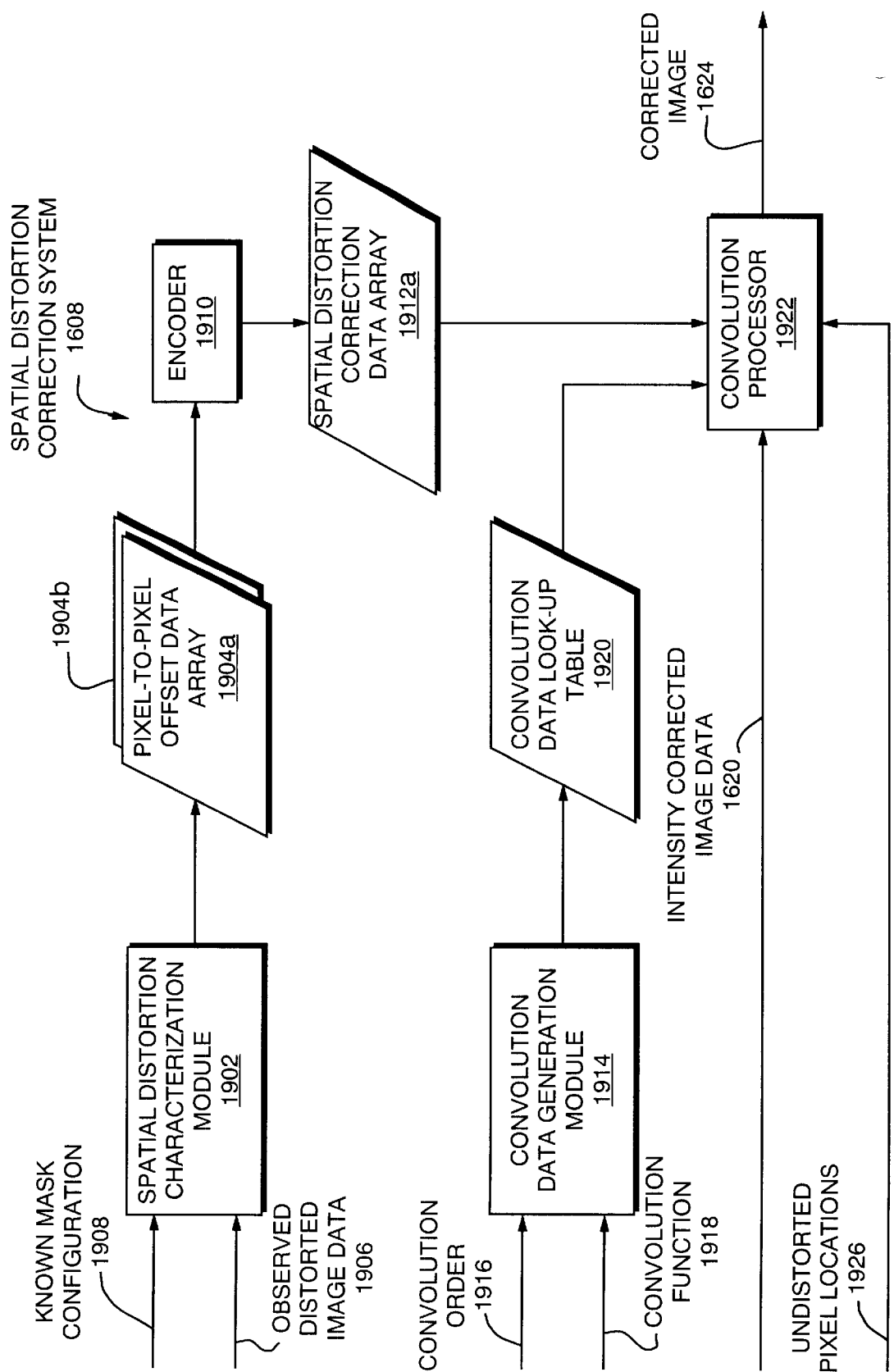
FIG. 19 is a functional block diagram of one embodiment of the spatial distortion correction system illustrated in FIG. 16.

FIG. 19 is a functional block diagram of one embodiment of spatial distortion correction system 1608. Spatial distortion correction system 1608 generally includes a spatial distortion characterization module 1902 that characterizes the spatial distortions of image sensor 108 and generates pixel-to-pixel offset data arrays 1904 representing such distortions. These data arrays are encoded by an encoder 1910 to create a spatial distortion correction data array 1912 utilized by a convolution processor 1922 to convolve intensity corrected image data 1620 to generate corrected image 1624. A convolution data generation module 1914 generates a convolution data look-up table 1920 utilized by convolution processor 1922 in its operations. Each of these components of spatial distortion correction system 1608 will be described in detail below.

As noted, spatial distortion characterization module 1902 characterizes the spatial distortions of image sensor 108. This characterization is represented by pixel-to-pixel offset data arrays 1904 containing transformation data for translating between a pixel location in a spatially distorted image produced by image sensor 108 ("distorted image pixel location") and the pixel location in the corresponding spatially undistorted image ("undistorted image pixel location"). Pixel-to-pixel data offset array 1904A provides transformation data for translating from pixel locations in a spatially undistorted image to pixel locations in the corresponding spatially distorted image. In the disclosed embodiment, data stored in pixel-to-pixel offset data array 1904A is the pixel location (integral and fractional component, if any) in spatially distorted image 1620 corresponding to pixels in spatially undistorted image 1624. Conversely, pixel-to-pixel data offset array 1904B provides transformation data for translating from pixel locations in the spatially distorted image to corresponding pixel locations in a spatially undistorted image. In the disclosed embodiment, data stored in pixel-to-pixel offset data array 1904B is the pixel location (integral and fractional component, if any) in spatially undistorted image 1624 corresponding to pixels in spatially distorted image 1620.

Pixel-to-pixel data offset arrays 1904 are obtained by spatial distortion characterization module 1902 as calibration data when CCD detector array 500 is assembled or a sensor module 200 is repaired or replaced. The characterization data is determined by comparing an image of an x-ray opaque mask having a known aperture pattern with information representing the actual mask pattern. The image of the mask is provided to spatial distortion characterization module 1902 as observed distorted image 1906, while the actual mask configuration is provided to spatial distortion characterization module 1902 as known mask configuration 1908.

As noted, the mask includes a plurality of apertures arranged in a known pattern. These apertures allow x-ray radiation to pass therethrough to create an exposure having areas of high concentrations of x-rays corresponding to the aperture location and areas of no x-rays corresponding to the remaining portions of the mask. In one embodiment, the apertures are arranged as a grid and the mask covers a substantial portion of surface 180 of image sensor 108. In one such embodiment, the apertures are arranged in lines that are parallel to a particular axis. In one particular embodiment, the apertures are substantially circular having a. 1 mm diameter and a center to center distance of 10 mm. It should be understood that other mask pattern configurations may be used for a given application.

The areas of high concentrations of x-rays in distorted mask x-ray image 1906 are compared by spatial distortion characterization module 1902 to the known mask pattern 1908. The differences between the actual position of a mask aperture and the position of a corresponding area of high concentration x-rays in the observed image 1906 are determined. Specifically, the intensity values at the integer pixel locations are determined by interpolating the observed distorted image data 1906. Image data is also interpolated to determine the offset data for pixels other than those associated with high x-ray concentration areas in observed distorted image 1906. The interpolation can be accomplished through the implementation of any well-known interpolation technique now or later developed. For example, spatial distortion characterization module 1902 implements a linear interpolation, spline based interpolation such as a B spline or cubic spline interpolation, or a local polynomial fit, among others. The resulting data is stored as pixel-to-pixel transformation or offset values in arrays 1904 by spatial distortion characterization module 1902.

An encoder 1910 is utilized in certain embodiments of spatial distortion correction system 1608 to compress the data in pixel-to-pixel offset data array 1904A. Encoder 1910 reduces the size of the memory required to store data array 1904A. Further, this optimizes the processing speed of image processor 146 by reducing the number of read/write memory cycles utilized to correct for spatial distortions. Preferably, the operations performed by spatial distortion characterization module 1902 and encoder 1910 are performed, and the results stored, prior to performing exposures; that is, spatial distortion characterization module 1902 preferably does not operate in real-time.

FIGS. 20A–20D illustrate data structures created to implement a run length encoding scheme in accordance with one embodiment of the encoder 1910 for encoding the pixel-to-pixel offset data stored in data array 1904A. The resulting encoded data is stored in spatial distortion correction array 1912. As will be described in detail below, spatial distortion correction data array 1912 provides data for convolving intensity corrected image data 1620. In this illustrative embodiment the "offset" data is simply the complete pixel location in the (distorted) image 1620 for each pixel in the undistorted image 1624. Thus, the format of each "offset" value is simply (X.I, Y.J) where X is the integer portion and I is the fractional portion of the horizontal position and Y is the integer portion and J is the fractional portion of the vertical position of the corresponding pixel location. In the embodiment described herein, all data words in data array 1912 are 16 bit (two byte) words.

Figure 20A:
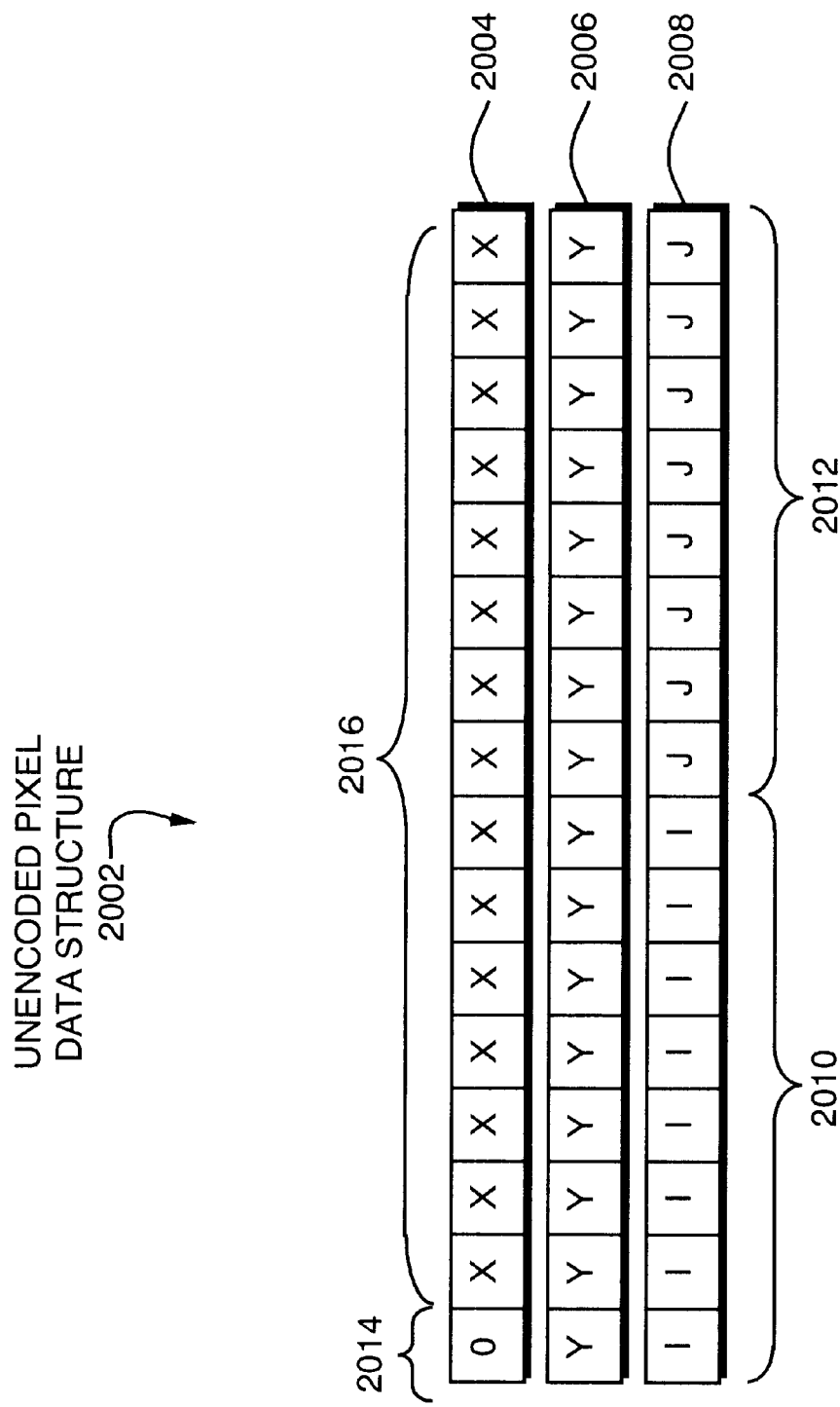
FIG. 20A is a schematic view of a data structure for storing discrete pixel data in accordance with one embodiment of the present invention.

FIG. 20A illustrates one format of pixel data stored in the spatial distortion correction data array 1912. As used herein, such pixels are referred to as discrete on-image pixels. A discrete on-image pixel is defined as a pixel in which all information necessary to perform the transformation is located in the series of adjacent words allocated to the particular pixel data structure 2002.

Discrete pixel data structure 2002 includes three words of data. The first two words 2004 and 2006 are allocated to store the integer components of the horizontal (X) and vertical (Y) pixel position, respectively. The fractional component of the horizontal pixel position (I) 2010 is stored in the first byte of word 2008 while the fractional component of the vertical pixel position (J) 2012 is stored in the second byte of word 2008. Together, the two fractional components 2010 and 2012 form the third word 2008 of unencoded pixel data structure 2002. Thus, a discrete pixel having the format (X.I, Y.J) requires 3 words of storage in this embodiment of the present invention. An identifier 2014 provides an indication of the type of pixel data structure. In the illustrative embodiment in FIG. 20A, a single high order bit of first word 2004 is allocated to type identifier 2014. The combination of this value and the value of the 15 low order bits 2016 are used to identify the type of data structure. As shown in FIG. 20A, a type identifier 2014 having a value of zero in combination with a non-zero value of the 15 low order bits 2016 indicates that data structure 2002 is allocated to storing a discrete pixel location value.

Figure 20B:
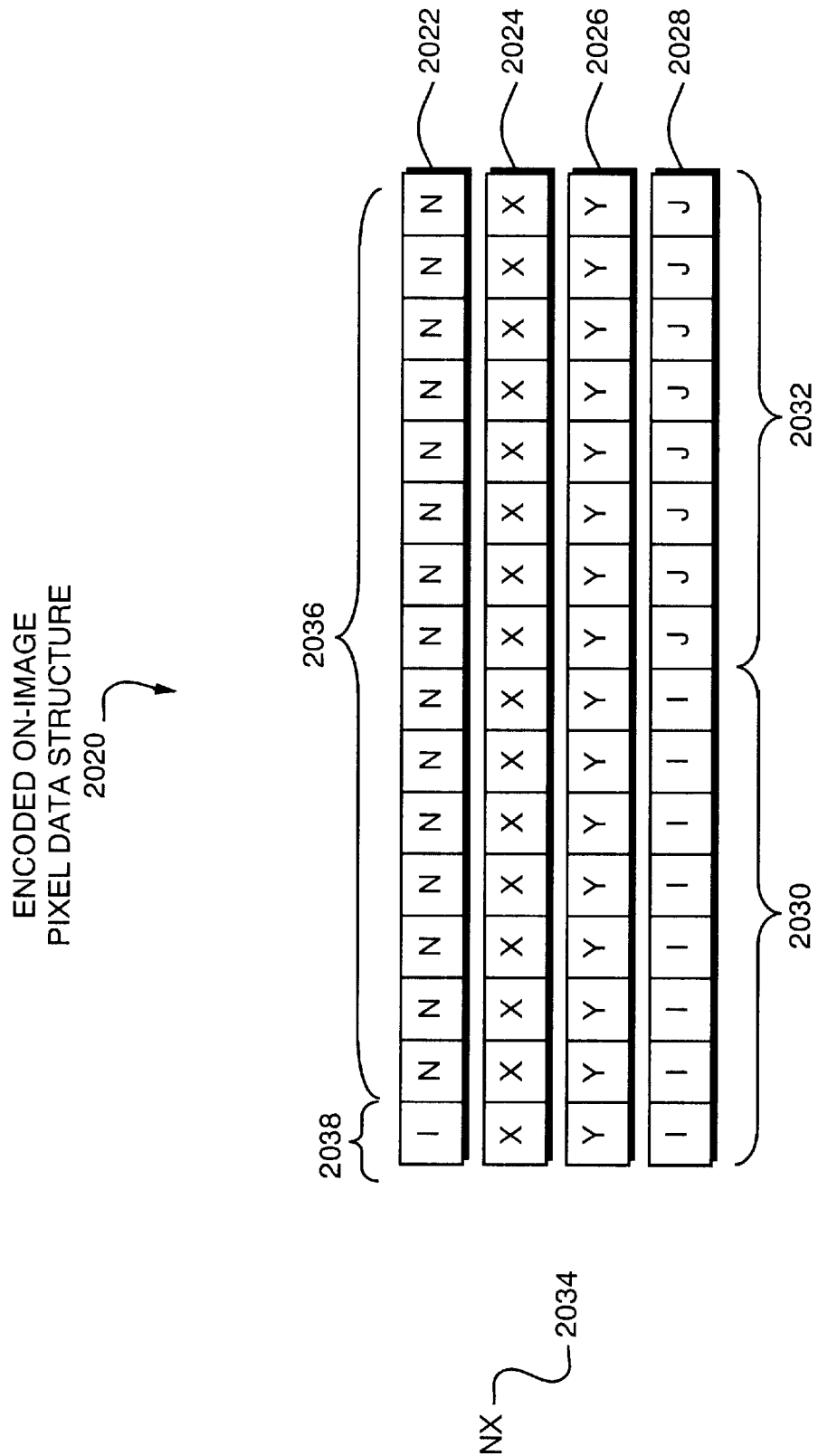
FIG. 20B is a schematic view of a data structure for storing encoded on-image pixel data in accordance with one embodiment of the present invention.

FIG. 20B illustrates one format in which pixel location data is stored in spatial distortion correction data array 1912, referred to herein as an encoded on-image pixel data structure 2020. As noted, in the illustrative embodiment, the pixel-to-pixel offset (location) data is run length encoded. As defined herein, a "run" is a series of pixel values where the horizontal (X) position is incremented by one and the vertical (Y) pixel position is unchanged. Referring to FIG. 20B, data structure 2020 includes two words 2024 and 2026 allocated to storing the integer components of the horizontal (X) and vertical (Y) position, respectively, of the initial pixel in a run of N pixels.

The fractional components of the horizontal position (I) 2030 and vertical position (J) 2032 of each of the N pixels in a "run" of pixels are stored in immediately adjacent N data words 2028. The first of such words is shown in FIG. 20B as word 2028, with an indicator 2032 that indicates that there are N number of such fractional words in data structure 2020. The 15 low order bits of a first word 2022 of data structure 2020 contain the value of the repeat count (N) 2036 that indicates the number of fractional words 2028 that are included in data structure 2020. Thus, for a repeat count of N, data structure 2020 includes N+3 words.

Type indicator 2038, located at the high order bit of the first word 2022 includes a value of 1. A non-zero value contained in the 15 low order bits 2036 of first word 2022 in combination with type indicator 2038 identify data structure 2020 as an encoded on-image pixel data structure.

A brief example of three pixel location values in accordance with the above-described technique are set forth in FIG. 20E. On the first line 2001 of FIG. 30E three pixel offset or location values are illustrated. Each of the three pixel locations have X and Y positions with integer and real portions. Shown below line 2001 at line 2003 are the unencoded pixel-to-pixel offset data values. As shown therein, the integer values are segregated from the fractional values as described above. For example, the fractional components of the pixel location (5.2, 9.8) are separated from their integer components to result in the unencoded value of (5, 9, 0.2, 0.8).

At line 2005 the contents of three unencoded pixel data structures 2002 are illustrated. Each data structure has three words as described above, with the first two words containing the integer values and the two bytes of the last word containing the fractional values for each of the pixel locations. At line 2007 the contents of an encoded on-image pixel data structure 2020 is illustrated. This data structure encodes the three pixel values illustrated at line 2005. The first data word 2009 is shown as two bytes for ease of description. The values in the two bytes are 128 and 3. The value of 3 is the count (N) value stored in the 15 low-order bits of the first data word 2022 shown in FIG. 20B. There are three pixel location values in this example; accordingly, the low-order byte has a value of 3 stored therein. The high-order byte has a value of 128 due to the type indicator 2038 having a value of 1 and the seven high-order bits of field 2036 (FIG. 20B) having a value of zero. The next two words 2011 and 2013 correspond to the data words 2024 and 2026 described above. These two data words include the integer components of the X and Y values of the first pixel location.

The three remaining data words 2015, 2017 and 2019 contain the fractional components of the three pixel locations. Referring to FIG. 20B there are three fractional data words 2028 in the data structure 2020, each of which contains the fractional components 2030, 2032 of the X and Y locations, respectively, for each pixel in the run. As shown in FIG. 20E, the three exemplary data words 2015, 2017 and 2019 are the same as the third data word 2021, 2023 and 2025 in the three data structures 2002 shown on line 2005.

Figure 20C:
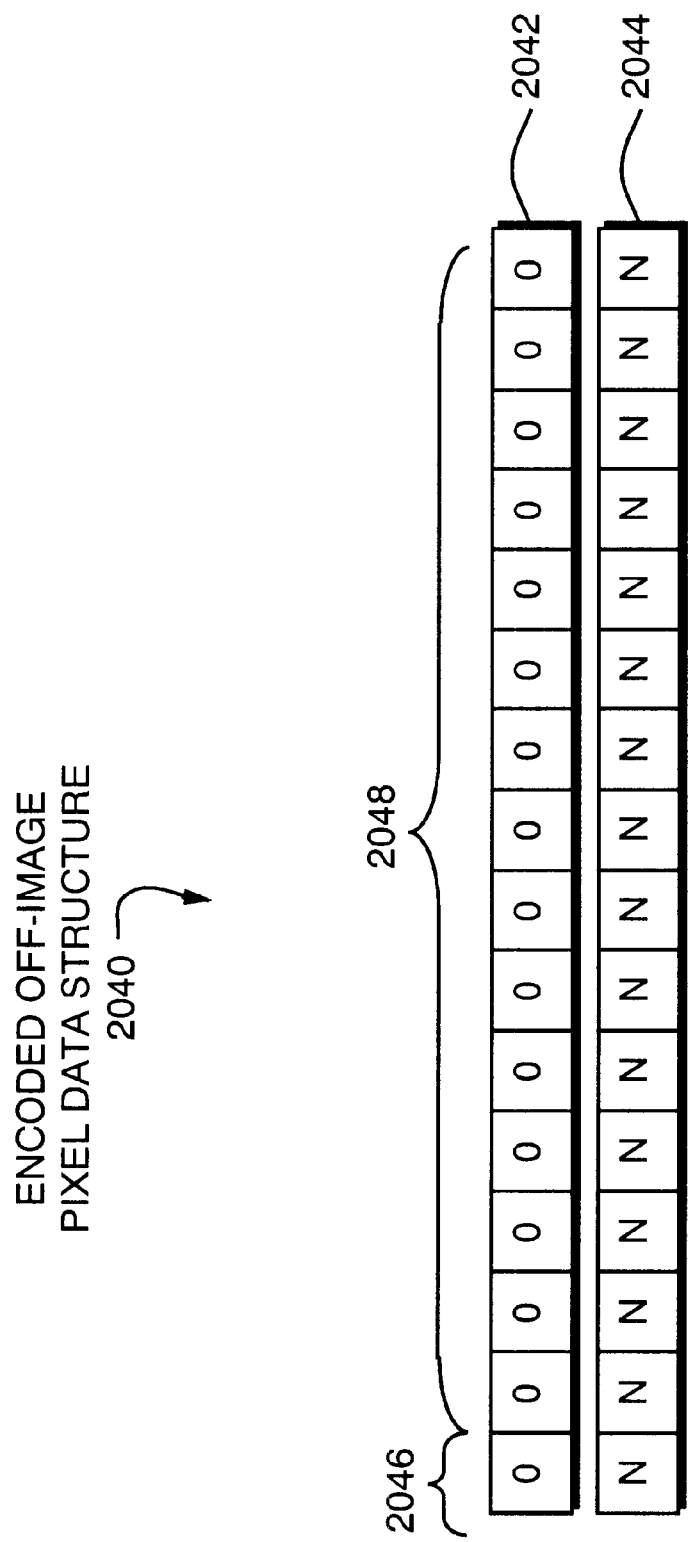
FIG. 20C is a schematic view of a data structure for storing encoded off-image pixel data in accordance with one embodiment of the present invention.

A data structure for storing a run of N off-image pixels is shown in FIG. 20C. Off-image pixels are pixels that are outside the imaging area of the detector. Off-image pixels are identified by a first word 2042 consisting of 0's followed by a word 2044 in which the repeat count (N) is stored. A type indicator 2046 located at the high-order bit of the first word 2042 has a value of zero. A zero value contained in the 15 low-order bits 2048 in combination with a type indicator 2046 of zero identified data structure 2040 as an encoded off-image data structure.

As noted above gaps 620 exist between each fiberoptic taper 164. Since light photons 704 fall within gap 620, the pixels located immediately adjacent and on opposing sides of gap 620 are convolved to approximate the lost intensity data. Such gap adjacent pixels are referred to herein as edge pixels and the data structure for storing the location of such pixels is referred to as an encoded on-image edge pixel data structure 2060. Data structure 2060 provides the pixel values used in the convolution operation described below to approximate the lost intensity data since the requisite pixel locations are not necessarily contiguous due to the presence of gaps 620. One such data structure 2060 is illustrated in FIG. 20D.

Data structure 2060 includes unencoded pixel location data for a number of pixels immediately adjacent to gap 620 to perform the desired convolution. Three words 2062, 2064 and 2066 of data structure 2060 are allocated for each such edge pixel. The format of these three data words are the same as described above for data words 2004–2008 included in data structure 2002. As shown by the "Cx" indicator 2068 in FIG. 20D, the number of words included in data structure 2060 is 2+(3×C), where C is the order of the convolution kernel.

The first word 2072 of data structure 2060 is utilized as a type indicator. Word 2072 includes a high order bit 2074 having a value of 1 followed by a 0 value in each of the lower 15 bits 2076 of word 2072. In certain embodiments of the invention, there may be multiple types of pixels which cannot be run length encoded. In such embodiments, a second word 2070 is included in data structure 2060 to store a special case code (S) to distinguish among such data structures.

There are significant benefits associated with encoding pixel offset data as described above. For example, for large run lengths, the encoded pixel data will use nearly 66% less memory and require nearly 66% few memory read/write operations as compared to unencoded on-image pixel data 2002. Advantageously, this increases the speed with which image processor 146 can operate.

To avoid having to sequentially trace through the entire array of encoded pixel offset (location) data in arrays 1912 to convolve pixels other than the starting pixel of the image, embodiments of the present invention include reference pointers to predetermined locations within spatial distortion correction data array 1912. In one particular embodiment, reference pointers to the starting pixel (for example, the left-most pixel) in each row of the source image are provided to enable the spatial distortion correction operations disclosed herein to be started at any row of pixels within the source image row and to be performed independently of other image row processing. Benefits associated with the use of such reference pointers include, for example, the use of multiple processors to correct the spatially distorted pixel location data wherein each processor operates on a different region of the image.

Figure 21:
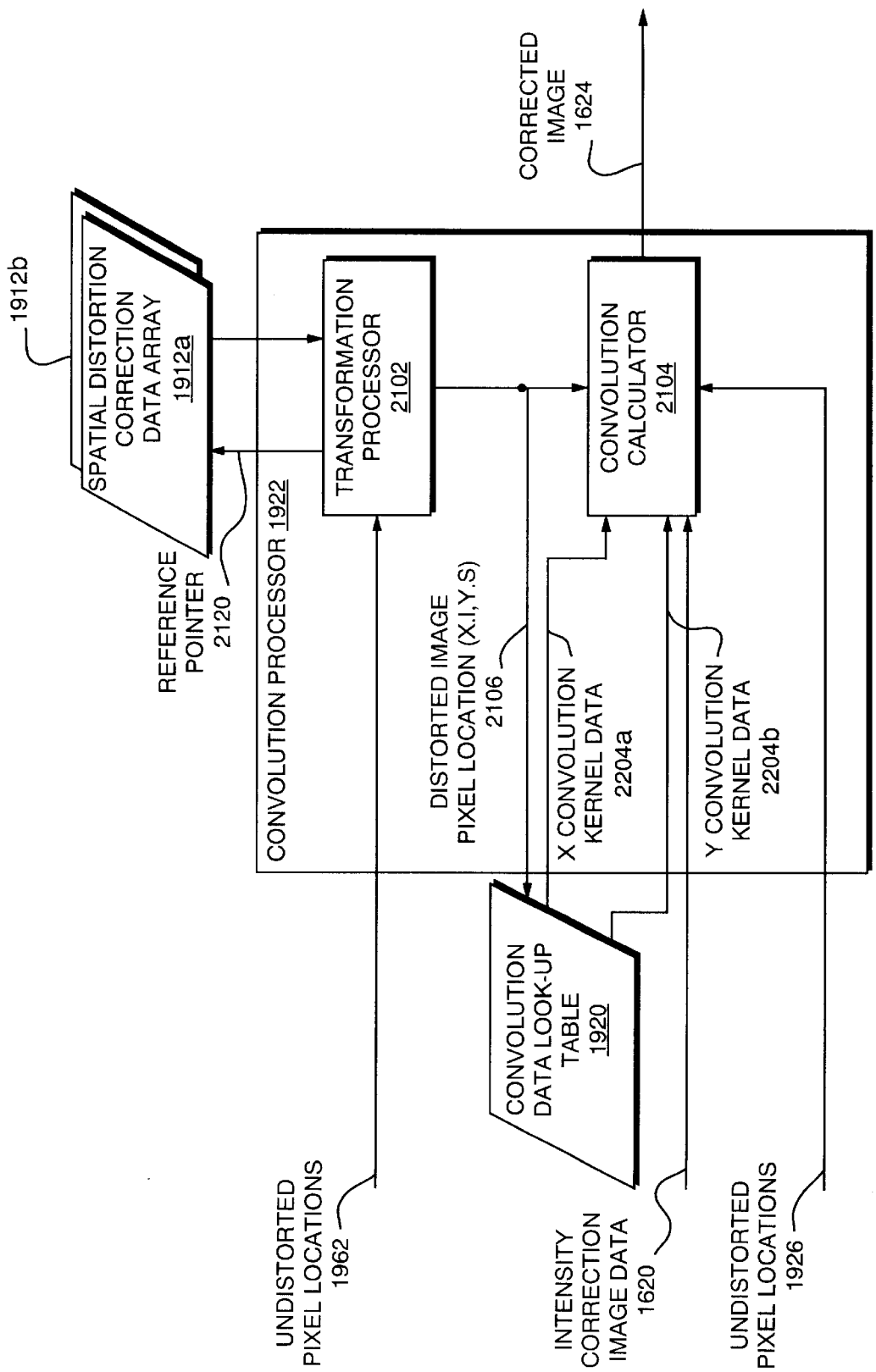
FIG. 21 is a functional block diagram of one embodiment of the convolution process illustrated in FIG. 19.

A convolution processor 1922 determines the intensity at each pixel location of a spatially undistorted (corrected) image 1624. FIG. 21 is a functional block diagram of one embodiment of convolution processor 1922. For each pixel in undistorted image 1624, a corresponding pixel location 2106 in the distorted image is determined by a transformation processor 2102. In the illustrative embodiment, the pixel locations in the spatially undistorted image 1624 are received by transformation processor 2102 as undistorted pixel locations 1926. Alternatively, they may be generated internally since they are simple sequential integer values. A pixel location 2106 in distorted image 1620 corresponding to a selected pixel location 1926 in undistorted image 1624 is determined by transformation processor 2102 using spatial distortion correction data array 1912. Specifically, transformation processor 2102 accesses array 1912 to retrieve the encoded distorted image pixel location (that is, the pixel-to-pixel offset value) that corresponds to the selected undistorted pixel 1926. In one embodiment, a predetermined reference pointer 2120 to the offset data is utilized to retrieve the encoded data from array 1912.

Convolution calculator 2104 applies a convolution kernel function to the intensity values for a predetermined number of pixels surrounding the corresponding pixel location 2106 in the distorted image. The resulting intensity value for the distorted image pixel location is then associated with the corresponding pixel in the undistorted image. Specifically, intensity values for the surrounding pixels are retrieved from intensity corrected image data array 1620. A convolution kernel function is applied to these pixel intensity values by convolution calculator 2104 to generate an intensity value for the corresponding pixel location 1926 in the undistorted image. The corresponding pixel in the undistorted image is then assigned this intensity value.

To accelerate the above process, the convolution kernel function is precalculated and the kernel values are stored in a look up table 1920 accessible by convolution calculator 2104 of convolution processor 1922. In one particular embodiment, the distance between adjacent pixels is divided into 256 increments and the convolution kernel data for each increment is determined and stored in table 1920. This enables table 1920 to be accessed by processor 1922 using the 8 bit fractional offset values stored in spatial distortion correction data array 1912. Referring again to FIGS. 20B–20D, fractional values 2030, 2032 and 2078, 2080 are used to access convolution data look-up table 1920.

A convolution data generation module 1914 generates a convolution data look-up table 1920 for convolving intensity corrected image data 1620. In accordance with one embodiment of the present invention, convolution data generation module 1914 includes many different convolution kernels that may be selected for a particular application. In the illustrative embodiment, generation module 1914 generates convolution data look-up table 1920 based on externally provided convolution order 1916 and convolution function 1918. Additional or fewer factors may be provided by an operation for determining the convolution kernel that is to be implemented. In the illustrative embodiment disclosed herein, a fourth order cubic spline function is selected. However, a cubic spline having additional or lesser terms or other interpolating functions may be used.

Figure 22:
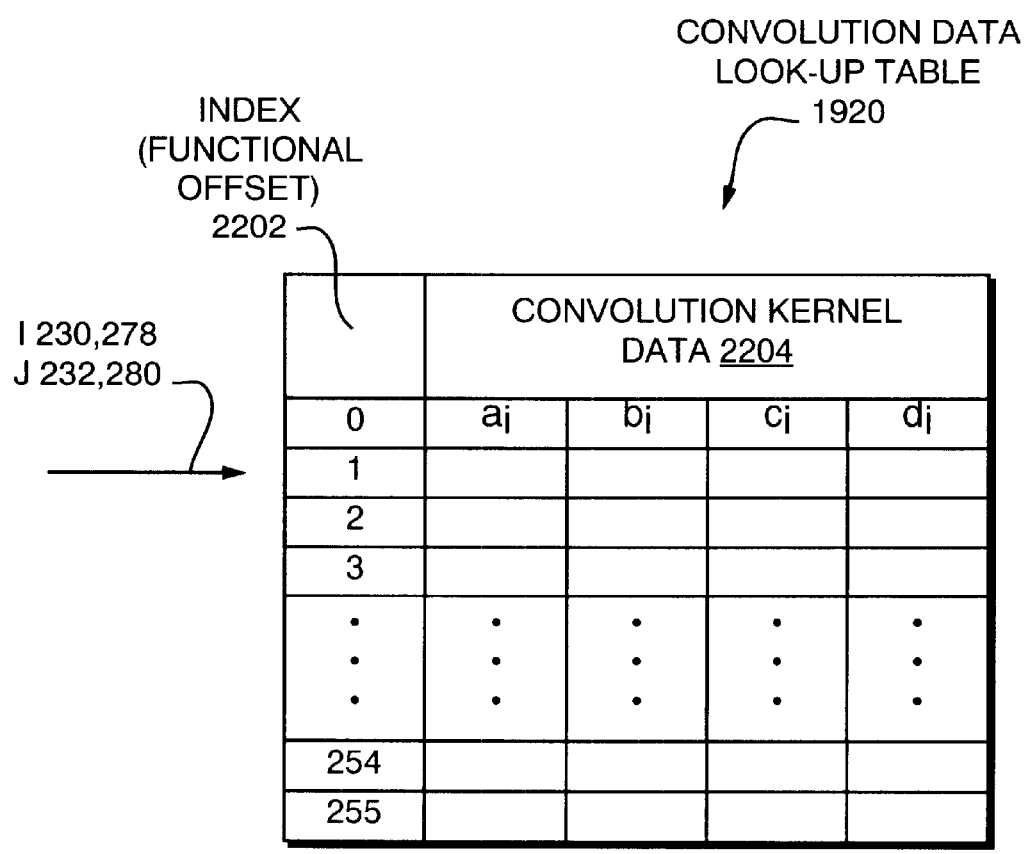
FIG. 22 is a schematic view of one embodiment of a convolution data look-up table utilized by the convolution processor illustrated in FIG. 21.

FIG. 22 is an illustration of an exemplary convolution kernel data look-up table 1920 in which kernel data for a fourth order cubic spline convolution kernel function is stored. As shown, 256 (0 through 255) indices 2102 are provided to enable access via fractional offset values 2030, 2078, 2032 and 2080. For each fractional offset value, four coefficients a–d are provided, each coefficient being a convolution kernel function value. Specifically, the convolution kernel data in table 1920 is calculated for adjacent pixel locations relative to the fractional offset value. For example, if the fractional component of the corresponding pixel location in the distorted image is 0.3, then in a fourth order cubic spline convolution kernel function, the convolution kernel function $f(x)$ is calculated for $f(-1.3)$, $f(-0.3)$, $f(0.7)$, and $f(1.7)$. Similarly, if the fractional component of the corresponding pixel location in the distorted image is 0.8, the function $f(x)$ is calculated for $f(-1.8)$, $f(-0.8)$, $f(0.2)$, $f(1.2)$.

Convolution calculator 2102 accesses 1920 using distorted image pixel location (x,y) 2106 to retrieve the x and y convolution kernel data 2204A, 2204B. Convolution calculator 2104 receives x convolution kernel data 2204A and Y convolution kernel data 2204B and convolves the surrounding image pixels. In accordance with one embodiment, intensity corrected image data 1620 is considered to be linearly separable, with the convolution of along the X and Y axes is performed separately using the same precharacterized kernel data. The above process is repeated for the opposing axis. In an alternative embodiment, a two dimensional convolution may be performed, or separate convolution calculations may be performed with different convolution lengths for each axis. The resulting intensity value of the distorted image pixel location is then associated with the corresponding undistorted pixel location 1926.

Figure 23:
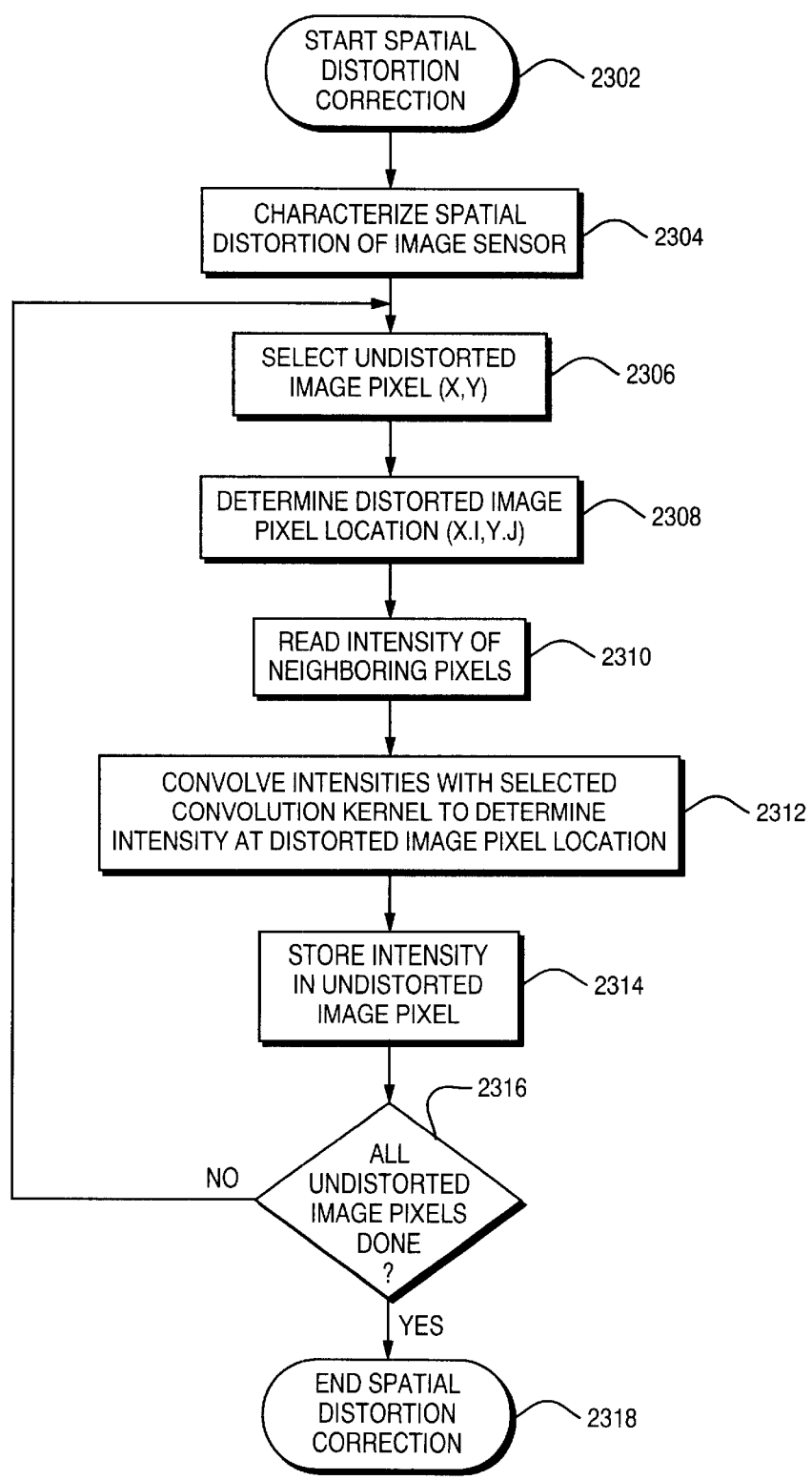
FIG. 23 is a flowchart of the processes performed by one embodiment of the spatial distortion correction system illustrated in FIG. 16.

FIG. 23 is a flowchart of the processes performed by spatial distortion correction system 1608 in accordance with one embodiment of the present invention. Process 2300 is invoked at start block 2302 in response to the completion of the intensity distortion correction process described above. At block 2304 spatial distortion correction system 1608 characterizes the spatial distortion of image sensor 108. As noted, this results in spatial distortion correction data arrays which are utilized by subsequent processes. In the above noted embodiment, spatial distortion correction data arrays 1912 include pixel location values. However, it should be understood that such data arrays may contain offset values in alternative embodiments.

A pixel in the undistorted image is selected at block 2306. The corresponding pixel location in the distorted image is determined at block 2308. As noted, the undistorted image may be divided into regions. In such an embodiment, the selected undistorted image pixel may be restricted to a particular region and the process 2300 performed by one of a plurality of processors. Alternatively, the undistorted image may be determined by selecting sequentially and processing each pixel in the undistorted array. The determination of the corresponding distorted image pixel location at block 2308 is achieved using the spatial distortion correction data arrays 1912. For each pixel in the undistorted image, a spatial distortion correction data array 1912 contains the location of the corresponding pixel in the distorted image.

At block 2310 the intensity of neighboring pixels are determined at block 2310. The number and relative location of the selected neighboring pixels is a function of the convolution kernel function and the order of that function. In one preferred embodiment described above, such convolution kernel function and its order are selected by the operator. The determination of which neighboring pixels are included based on the selected convolution kernel function is considered to be well known in the art.

At block 2312 the intensities of the neighboring pixels are convolved using the selected convolution kernel function. The result of this operation is the intensity at the distorted image pixel location. This intensity value is then stored at block 2314 as the intensity at the undistorted image pixel selected at block 2306. This process is repeated for all pixels in the undistorted image as shown by decision block 2316. Upon completion of the undistorted or region thereof, processing ceases at block 2318.

Figure 24:
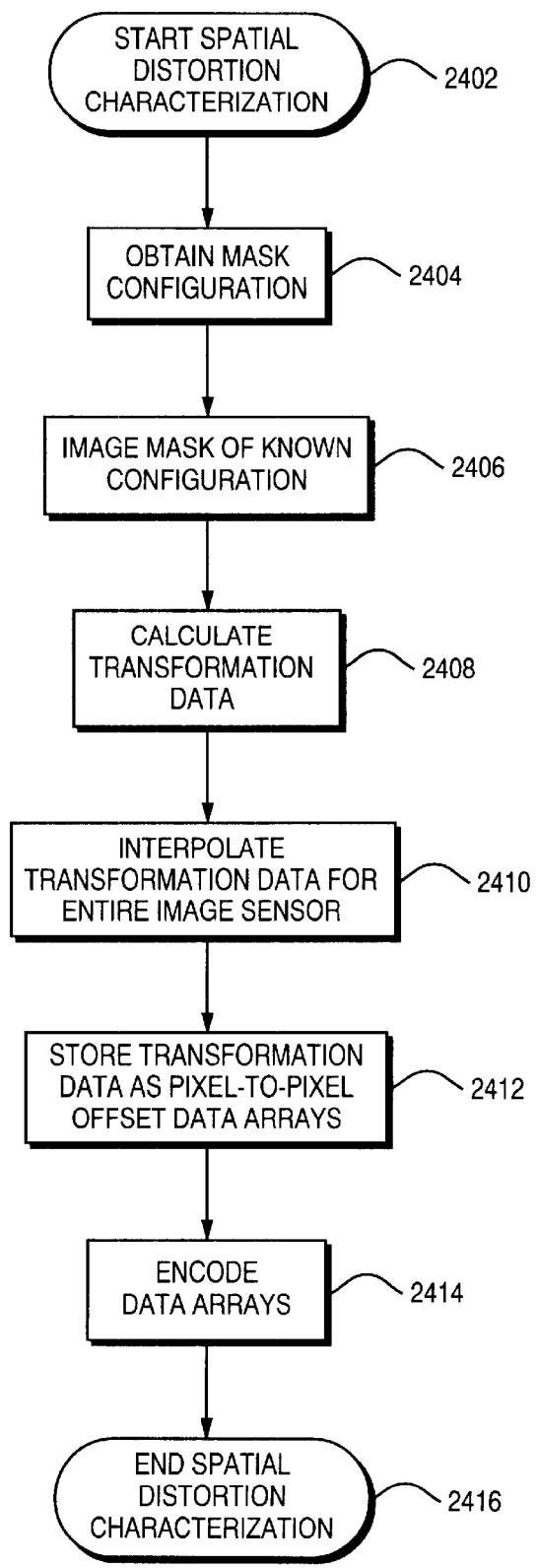
FIG. 24 is a flowchart of the processes performed by one embodiment of the spatial distortion correction system illustrated in FIG. 16 to characterize spatial distortions of the image sensor illustrated in FIG. 1A.

FIG. 24 is a flow chart of the processes performed by spatial distortion correction system 1608 to characterize the spatial distortions of image sensor 108 in accordance with one embodiment of the present invention. After start block 2402, the configuration of a selected mask is obtained. Such configuration information may be represented by a data array of values or by an mathematical model. At block 2406 the spatial distortions of image sensor 108 are characterized. In the above-disclosed embodiment, this characterization is represented by one or more pixel-to-pixel offset data arrays each containing transformation data between a pixel location in a distorted image produced by image sensor 108 and the pixel location in an undistorted image. The characterization data maybe obtained using any well known technique such as comparing an x-ray image of a mask having a known configuration with information representing the actual mask configuration, as noted above.

The differences between the observed distorted image and actual mask configuration are determined at block 2410. These pixel-to-pixel transformation or offset values are interpolated at block 2412 using any desired interpolation technique, such as those noted above. The resulting pixel-to-pixel data offset data array 1904 is stored for future use at block 2412. In certain embodiments, the operations depicted at block 2412 are also performed to generate a second pixel-to-pixel offset data array containing transformation data between a pixel location in a distorted image produced by image sensor 108 and the pixel location in an undistorted image.

In one embodiment of the present invention, the pixel-to-pixel offset data stored in arrays 1904 are encoded to increase the storage and processing efficiency of spatial distortion correction system 1608. The encoding of these data arrays is performed at block 2414. The result of such encoding is the formation of additional array referred to above as spatial distortion correction data arrays 1912. This data array is then available for use in convolving the distorted image data as described above. The processing then ceases at end block 2416.

While various embodiments of the present invention have been described above, it should be understood that they have been presented by way of example only, and not limitation. Thus, the breadth and the scope of the present invention are not limited by any of the above exemplary embodiments, but are defined only in accordance with the following claims and their equivalents.

What is claimed is:

1. A sensor array for implementation in an image sensor, the sensor array comprising:
   a mounting frame, and
   a plurality of sensor modules mounted in said mounting frame, each of said sensor modules comprising:
      a high demagnification fiberoptic taper,
      a photodetector array optically coupled to said fiberoptic taper, and
      a flange constructed and arranged to individually mount said fiberoptic taper to said mounting frame, said flange being flexibly attached to said fiberoptic taper using a flexible adhesive,
   wherein the high demagnification fiberoptic taper includes an input surface and an output surface, and the photodetector array is coupled to said fiberoptic taper output surface and is rigidly attached to said fiberoptic taper such that movement of said fiberoptic taper does not interfere with the photodetector array operation.

2. The sensor array of claim 1, wherein said photodetector is a CCD photodetector array.

3. The sensor array of claim 1, wherein said photodetector array is a CID photodetector array.

4. The sensor array of claim 1, wherein said flange mechanically supports said fiberoptic taper such that the orientation of said fiberoptic taper may be adjusted.

5. The sensor array of claim 1, wherein said flange comprises a plurality of threaded bores for attaching said flange to said mounting frame.

6. The sensor array of claim 1, wherein the flange of each sensor module mounts the fiberoptic taper of that module in the mounting frame such that no direct contact exists between the taper and the mounting frame.

* * * * *